US012803629B2

(12) United States Patent
Elshafie et al.

(10) Patent No.: US 12,803,629 B2
(45) Date of Patent: Nov. 17, 2026

(54) SECRET KEY EXTRACTION FOR LINE-OF-SIGHT COMMUNICATIONS

(71) Applicant: QUALCOMM Incorporated, San Diego, CA (US)

(72) Inventors: Ahmed Elshafie, San Diego, CA (US); Abdelrahman Mohamed Ahmed Mohamed Ibrahim, San Diego, CA (US); Muhammad Sayed Khairy Abdelghaffar, San Jose, CA (US); Danlu Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 849 days.

(21) Appl. No.: 17/747,587

(22) Filed: May 18, 2022

(65) Prior Publication Data

US 2023/0170956 A1 Jun. 1, 2023

Related U.S. Application Data

(63) Continuation-in-part of application No. 17/540,136, filed on Dec. 1, 2021.

(51) Int. Cl.

| | |
|---|---|
| ***H04B 7/06*** | (2006.01) |
| ***H04W 12/041*** | (2021.01) |
| ***H04W 12/106*** | (2021.01) |

(52) U.S. Cl.

CPC ........... *H04B 7/0617* (2013.01); *H04B 7/063* (2013.01); *H04B 7/0634* (2013.01); *H04W 12/041* (2021.01); *H04W 12/106* (2021.01)

(58) Field of Classification Search

CPC .... H04B 7/0617; H04B 7/063; H04B 7/0634; H04W 12/106; H04W 12/041

See application file for complete search history.

(56) References Cited

U.S. PATENT DOCUMENTS

| | | | | |
|---|---|---|---|---|
| 2018/0234236 | A1 | 8/2018 | Djordjevic et al. | |
| 2018/0262291 | A1* | 9/2018 | Doster | H04B 10/112 |
| 2019/0199465 | A1 | 6/2019 | Skertic et al. | |
| 2019/0342047 | A1 | 11/2019 | Kim et al. | |
| 2020/0162248 | A1* | 5/2020 | Qi | H04L 9/0852 |
| 2021/0133614 | A1* | 5/2021 | Ashrafi | G02F 3/00 |
| 2021/0318407 | A1 | 10/2021 | Ohara et al. | |
| 2022/0123782 | A1* | 4/2022 | Cheng | H04B 1/715 |
| 2022/0140900 | A1 | 5/2022 | Quintana Sanchez et al. | |
| 2023/0171595 | A1 | 6/2023 | Elshafie et al. | |

* cited by examiner

*Primary Examiner* — William R Korzuch
*Assistant Examiner* — Forrest L Carey
(74) *Attorney, Agent, or Firm* — Holland & Hart, LLP

(57) ABSTRACT

Methods, systems, and devices for wireless communications are described. Communication devices may perform secret key generation using a set of line-of-sight (LOS) communication modes to secure a physical channel. For example, a first device and a second device may communicate a set of reference signals over the physical channel using a set of LOS communication modes. The first device and the second device may generate a secret key based on the set of LOS communication modes, for example, by using information associated with the set of LOS communication modes to compute the secret key using a key derivation function that outputs the secret key. The first device and the second device may secure the physical channel by encrypting signaling between the first device and the second device with the secret key and communicating the signaling over the physical channel using LOS communications.

17 Claims, 23 Drawing Sheets

SECRET KEY EXTRACTION FOR LINE-OF-SIGHT COMMUNICATIONS

CROSS REFERENCE

The present application for patent is a Continuation-In-Part of U.S. patent application Ser. No. 17/540,136 by ELSHAFIE, et al., entitled "SECRET KEY EXTRACTION FOR LINE-OF-SIGHT COMMUNICATIONS," filed Dec. 1, 2021, assigned to the assignee hereof, and expressly incorporated herein.

FIELD OF TECHNOLOGY

The following relates to wireless communications, including secret key extraction for line-of-sight (LOS) communications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, communication devices may secure transmissions over a physical channel using a secret key to encrypt and decrypt messages. In some cases, however, an eavesdropping device may determine the secret key and may thus be able to intercept and decrypt the messages communicated over the physical channel. Accordingly, techniques for improving physical channel security, for example, by preventing eavesdropping devices from determining secret keys, may be desired.

SUMMARY

The described techniques relate to improved methods, systems, devices, and apparatuses that support secret key extraction for line-of-sight (LOS) communications. Generally, the techniques described herein provide for securing LOS communications between communication devices by generating a secret key for LOS communication encryption based on a set of LOS communication modes. For example, a first communication device and a second communication device may communicate signaling in accordance with various LOS communication modes. A quantity of available LOS communication modes for communicating the signaling may be based on LOS alignment characteristics between the first communication device and the second communication device. For example, as the alignment between the first communication and the second communication device increases (e.g., the devices are relatively aligned), the quantity of available LOS communication modes may increase, and vice versa. As a result, the first communication device and the second communication device may have relatively more available LOS communication modes than an eavesdropping device, for example, because the eavesdropping device may be misaligned with respect to the first communication device and the second communication device.

The first communication device and the second communication device may leverage the available LOS communication modes when generating a secret key in order to prevent the eavesdropping device from determining the secret key. For example, the first communication device and the second communication device may communicate a set of reference signals over a physical channel and in accordance with a set of LOS communication modes (e.g., of the quantity of available LOS communication modes) and may generate the secret key based on the set of LOS communication modes. For example, the first communication device and the second communication device may use information associated with the set of LOS communication modes (e.g., the indexes of the set LOS communication modes) to compute the secret key using a key derivation function (e.g., that outputs the secret key). Because the eavesdropping device may be misaligned with respect to the communication devices, the eavesdropping device may be unable to detect at least some of the LOS communication modes of the set of LOS communication modes used to communicate the reference signals. Thus, the eavesdropping device may be unable to generate the same secret key. Accordingly, the first communication device and the second communication device may secure the physical channel by encrypting (e.g., cyphering, encoding) signaling with the secret key and communicating the signaling over the physical channel using LOS communications.

A method for wireless communication at a first device is described. The method may include receiving, from a second device, a set of reference signals in accordance with a set of LOS communication modes, generating a secret key used for encrypting one or more messages communicated between the first device and the second device, the secret key being generated based on the set of LOS communication modes, and communicating signaling with the second device using LOS communications, the signaling including the one or more messages that are encrypted with the secret key.

An apparatus for wireless communication at a first device is described. The apparatus may include a memory and a processor coupled to the memory and configured to receive, from a second device, a set of reference signals in accordance with a set of LOS communication modes, generate a secret key used for encrypting one or more messages communicated between the first device and the second device, the secret key being generated based on the set of LOS communication modes, and communicate signaling with the second device using LOS communications, the signaling including the one or more messages that are encrypted with the secret key.

Another apparatus for wireless communication at a first device is described. The apparatus may include means for receiving, from a second device, a set of reference signals in accordance with a set of LOS communication modes, means for generating a secret key used for encrypting one or more messages communicated between the first device and the second device, the secret key being generated based on the set of LOS communication modes, and means for communicating signaling with the second device using LOS communications, the signaling including the one or more messages that are encrypted with the secret key.

A non-transitory computer-readable medium storing code for wireless communication at a first device is described. The code may include instructions executable by a processor to receive, from a second device, a set of reference signals in accordance with a set of LOS communication modes, generate a secret key used for encrypting one or more messages communicated between the first device and the second device, the secret key being generated based on the set of LOS communication modes, and communicate signaling with the second device using LOS communications, the signaling including the one or more messages that are encrypted with the secret key.

Some examples of the method, apparatuses, and non-transitory computer-readable medium described herein may further include operations, features, means, or instructions for receiving, from the second device, a secured control message that indicates a configuration of the set of reference signals and a quantity of LOS communication modes included in the set of LOS communication modes, where the set of reference signals may be received in accordance with the set of LOS communication modes based on the secured control message.

Some examples of the method, apparatuses, and non-transitory computer-readable medium described herein may further include operations, features, means, or instructions for receiving, from the second device, a control message that updates the configuration of the set of reference signals and the quantity of LOS communication modes, where the set of reference signals may be received in accordance with the set of LOS communication modes based on the control message.

In some examples of the method, apparatuses, and non-transitory computer-readable medium described herein, generating the secret key may include operations, features, means, or instructions for computing the secret key based on information associated with the set of LOS communication modes, where the secret key may be computed using a key derivation function that outputs the secret key.

In some examples of the method, apparatuses, and non-transitory computer-readable medium described herein, the information associated with the set of LOS communication modes includes indexes corresponding to respective LOS communication modes included in the set of LOS communication modes or a key obtained using the indexes corresponding to the respective LOS communication modes.

Some examples of the method, apparatuses, and non-transitory computer-readable medium described herein may further include operations, features, means, or instructions for receiving, from the second device, a second set of reference signals in accordance with the set of LOS communication modes, where a first number of the set of LOS communication modes for receiving the second set of reference signals may be different from a second number of the set of LOS communication modes for receiving the set of reference signals, the secret key being generated based on the first number and the second number of the set of LOS communication modes.

In some examples of the method, apparatuses, and non-transitory computer-readable medium described herein, the set of LOS communication modes may be based on a non-LOS portion of a channel estimate for a channel between the first device and the second device.

In some examples of the method, apparatuses, and non-transitory computer-readable medium described herein, the non-LOS portion of the channel estimate may be quantized and mapped to respective modes of the set of LOS communication modes and the set of LOS communication modes may be based on the quantized and mapped non-LOS portion of the channel estimate.

Some examples of the method, apparatuses, and non-transitory computer-readable medium described herein may further include operations, features, means, or instructions for transmitting, to the second device, a second set of reference signals in accordance with a second set of LOS communication modes including the set of LOS communication modes, where the set of LOS communication modes may be based on a respective channel measurement associated with each reference signal of the second set of reference signals.

Some examples of the method, apparatuses, and non-transitory computer-readable medium described herein may further include operations, features, means, or instructions for transmitting, to the second device, a message that may be indicative of the set of LOS communication modes used to receive the set of reference signals.

In some examples of the method, apparatuses, and non-transitory computer-readable medium described herein, transmitting the message that may be indicative of the set of LOS communication modes may include operations, features, means, or instructions for transmitting one or more reference signals using one or more LOS communication modes of the set of LOS communication modes, the one or more LOS communication modes selected based on a mapping between the set of LOS communication modes and the one or more LOS communication modes.

Some examples of the method, apparatuses, and non-transitory computer-readable medium described herein may further include operations, features, means, or instructions for communicating, with the second device and using a LOS communication mode of the set of LOS communication modes, a message indicating a seed for input into a key derivation function, where the secret key may be generated using the indicated seed.

Some examples of the method, apparatuses, and non-transitory computer-readable medium described herein may further include operations, features, means, or instructions for communicating, with the second device, artificial noise using one or more LOS communication modes of the set of LOS communication modes that may be unused for communicating the message indicating the seed.

In some examples of the method, apparatuses, and non-transitory computer-readable medium described herein, the set of LOS communication modes may be based on a distance between the first device and the second device.

In some examples of the method, apparatuses, and non-transitory computer-readable medium described herein, the set of LOS communication modes includes a set of orbital angular momentum (OAM) communication modes.

A method for wireless communication at a second device is described. The method may include transmitting, to a first device, a set of reference signals using a set of LOS communication modes, generating a secret key used for encrypting one or more messages communicated between the second device and the first device, the secret key being generated based on the set of LOS communication modes, and communicating signaling with the first device using LOS communications, the signaling including the one or more messages that are encrypted with the secret key.

An apparatus for wireless communication at a second device is described. The apparatus may include a memory and a processor coupled to the memory and configured to transmit, to a first device, a set of reference signals using a set of LOS communication modes, generate a secret key used for encrypting one or more messages communicated between the second device and the first device, the secret key being generated based on the set of LOS communication modes, and communicate signaling with the first device using LOS communications, the signaling including the one or more messages that are encrypted with the secret key.

Another apparatus for wireless communication at a second device is described. The apparatus may include means for transmitting, to a first device, a set of reference signals using a set of LOS communication modes, means for generating a secret key used for encrypting one or more messages communicated between the second device and the first device, the secret key being generated based on the set of LOS communication modes, and means for communicating signaling with the first device using LOS communications, the signaling including the one or more messages that are encrypted with the secret key.

A non-transitory computer-readable medium storing code for wireless communication at a second device is described. The code may include instructions executable by a processor to transmit, to a first device, a set of reference signals using a set of LOS communication modes, generate a secret key used for encrypting one or more messages communicated between the second device and the first device, the secret key being generated based on the set of LOS communication modes, and communicate signaling with the first device using LOS communications, the signaling including the one or more messages that are encrypted with the secret key.

Some examples of the method, apparatuses, and non-transitory computer-readable medium described herein may further include operations, features, means, or instructions for transmitting, to the first device, a secured control message that indicates a configuration of the set of reference signals and a quantity of LOS communication modes included in the set of LOS communication modes, where the set of reference signals may be transmitted using the set of LOS communication modes based on the secured control message.

Some examples of the method, apparatuses, and non-transitory computer-readable medium described herein may further include operations, features, means, or instructions for transmitting, to the first device, a control message that updates the configuration of the set of reference signals and the quantity of LOS communication modes, where the set of reference signals may be transmitted using the set of LOS communication modes based on the control message.

In some examples of the method, apparatuses, and non-transitory computer-readable medium described herein, generating the secret key may include operations, features, means, or instructions for computing the secret key based on information associated with the set of LOS communication modes, where the secret key may be computed using a key derivation function that outputs the secret key.

In some examples of the method, apparatuses, and non-transitory computer-readable medium described herein, the information associated with the set of LOS communication modes includes indexes corresponding to respective LOS communication modes included in the set of LOS communication modes or a key obtained using the indexes corresponding to the respective LOS communication modes.

Some examples of the method, apparatuses, and non-transitory computer-readable medium described herein may further include operations, features, means, or instructions for transmitting, to the first device, a second set of reference signals in accordance with the set of LOS communication modes, where a first number of the set of LOS communication modes for receiving the second set of reference signals may be different from a second number of the set of LOS communication modes for receiving the set of reference signals, the secret key being generated based on the first number and the second number of the set of LOS communication modes.

In some examples of the method, apparatuses, and non-transitory computer-readable medium described herein, the set of LOS communication modes may be based on a non-LOS portion of a channel estimate for a channel between the first device and the second device.

In some examples of the method, apparatuses, and non-transitory computer-readable medium described herein, the non-LOS portion of the channel estimate may be quantized and mapped to respective modes of the set of LOS communication modes and the set of LOS communication modes may be based on the quantized and mapped non-LOS portion of the channel estimate.

Some examples of the method, apparatuses, and non-transitory computer-readable medium described herein may further include operations, features, means, or instructions for receiving, from the first device, a second set of reference signals in accordance with a second set of LOS communication modes including the set of LOS communication modes and selecting the set of LOS communication modes from the second set of LOS communication modes for transmitting the set of reference signals based on a respective channel measurement associated with each reference signal of the second set of reference signals.

Some examples of the method, apparatuses, and non-transitory computer-readable medium described herein may further include operations, features, means, or instructions for receiving, from the first device, a message that may be indicative of the set of LOS communication modes used to receive the set of reference signals.

In some examples of the method, apparatuses, and non-transitory computer-readable medium described herein, receiving the message that may be indicative of the set of LOS communication modes may include operations, features, means, or instructions for receiving one or more reference signals using one or more LOS communication modes of the set of LOS communication modes, the one or more LOS communication modes selected based on a mapping between the set of LOS communication modes and the one or more LOS communication modes.

Some examples of the method, apparatuses, and non-transitory computer-readable medium described herein may further include operations, features, means, or instructions for communicating, with the second device and in accordance with a LOS communication mode of the set of LOS communication modes, a message indicating a seed for input into a key derivation function, where the secret key may be generated using the indicated seed.

Some examples of the method, apparatuses, and non-transitory computer-readable medium described herein may further include operations, features, means, or instructions for communicating, with the first device, artificial noise using one or more LOS communication modes of the set of LOS communication modes that may be unused in communicating the message indicating the seed.

In some examples of the method, apparatuses, and non-transitory computer-readable medium described herein, the set of LOS communication modes may be based on a distance between the first device and the second device.

In some examples of the method, apparatuses, and non-transitory computer-readable medium described herein, the set of LOS communication modes includes a set of OAM communication modes.

A method for wireless communication at a first device is described. The method may include receiving, from a second device, a set of reference signals in accordance with a set of LOS communication modes, the LOS communication modes associated with one or more azimuth modes, one or more radial modes, one or more polarization modes, one or more LOS MIMO modes, or a combination thereof, generating, based on the set of LOS communication modes, a secret key for encrypting one or more messages communicated between the first device and the second device, and communicating signaling with the second device using LOS communications, the signaling including the one or more messages that are encrypted with the secret key.

An apparatus for wireless communication at a first device is described. The apparatus may include a processor, memory coupled with the processor, and instructions stored in the memory. The instructions may be executable by the processor to cause the apparatus to receive, from a second device, a set of reference signals in accordance with a set of LOS communication modes, the LOS communication modes associated with one or more azimuth modes, one or more radial modes, one or more polarization modes, one or more LOS MIMO modes, or a combination thereof, generate, based on the set of LOS communication modes, a secret key for encrypting one or more messages communicated between the first device and the second device, and communicate signaling with the second device using LOS communications, the signaling including the one or more messages that are encrypted with the secret key.

Another apparatus for wireless communication at a first device is described. The apparatus may include means for receiving, from a second device, a set of reference signals in accordance with a set of LOS communication modes, the LOS communication modes associated with one or more azimuth modes, one or more radial modes, one or more polarization modes, one or more LOS MIMO modes, or a combination thereof, means for generating, based on the set of LOS communication modes, a secret key for encrypting one or more messages communicated between the first device and the second device, and means for communicating signaling with the second device using LOS communications, the signaling including the one or more messages that are encrypted with the secret key.

A non-transitory computer-readable medium storing code for wireless communication at a first device is described. The code may include instructions executable by a processor to receive, from a second device, a set of reference signals in accordance with a set of LOS communication modes, the LOS communication modes associated with one or more azimuth modes, one or more radial modes, one or more polarization modes, one or more LOS MIMO modes, or a combination thereof, generate, based on the set of LOS communication modes, a secret key for encrypting one or more messages communicated between the first device and the second device, and communicate signaling with the second device using LOS communications, the signaling including the one or more messages that are encrypted with the secret key.

Some examples of the method, apparatuses, and non-transitory computer-readable medium described herein may further include operations, features, means, or instructions for receiving the set of reference signals using a set of antenna circles that each include a number of antenna elements, where the set of LOS communication modes includes a set of multiple azimuth modes.

In some examples of the method, apparatuses, and non-transitory computer-readable medium described herein, generating the secret key may include operations, features, means, or instructions for generating the secret key based on at least one azimuth mode of the set of multiple azimuth modes and the respective discrete Fourier transform vector.

In some examples of the method, apparatuses, and non-transitory computer-readable medium described herein, generating the secret key may include operations, features, means, or instructions for generating the secret key based on at least one radial mode of the set of multiple radial modes.

In some examples of the method, apparatuses, and non-transitory computer-readable medium described herein, each of the first beamforming vector and the second beamforming vector may be orthogonal.

In some examples of the method, apparatuses, and non-transitory computer-readable medium described herein, generating the secret key may include operations, features, means, or instructions for generating the secret key based on at least the first polarization mode, the second polarization mode, or both.

Some examples of the method, apparatuses, and non-transitory computer-readable medium described herein may further include operations, features, means, or instructions for receiving the set of reference signals using a two-dimensional antenna array including a number of antenna elements, where the set of LOS communication modes include a set LOS MIMO modes.

Some examples of the method, apparatuses, and non-transitory computer-readable medium described herein may further include operations, features, means, or instructions for decomposing a LOS MIMO mode of the set LOS MIMO modes into a first set of components associated with a first directional dimension and a second set of components associated with a second directional dimension different than the first directional dimension, generating a first channel matrix associated with the first set of components and a second channel matrix associated with the second set of components, and generating the secret key used for encrypting the one or more messages based on the first channel matrix and the second channel matrix.

Some examples of the method, apparatuses, and non-transitory computer-readable medium described herein may further include operations, features, means, or instructions for transmitting, to the second device, a message that may be indicative of the set of LOS communication modes used to receive the set of reference signals.

In some examples of the method, apparatuses, and non-transitory computer-readable medium described herein, transmitting the message that may be indicative of the set of LOS communication modes may include operations, features, means, or instructions for transmitting one or more reference signals using one or more LOS communication modes of the set of LOS communication modes, the one or more LOS communication modes selected based on a pseudorandom mapping between the set of LOS communication modes and the one or more LOS communication modes.

Some examples of the method, apparatuses, and non-transitory computer-readable medium described herein may further include operations, features, means, or instructions for receiving a radio resource control signal indicating the pseudorandom mapping between the set of LOS communication modes and the one or more LOS communication modes.

A method for wireless communication at a second device is described. The method may include transmitting, to a first device, a set of reference signals using a set of LOS communication modes, the LOS communication modes associated with one or more azimuth modes, one or more radial modes, one or more polarization modes, one or more LOS MIMO modes, or a combination thereof, generating a secret key used for encrypting one or more messages communicated between the second device and the first device, the secret key being generated based on the set of LOS communication modes, and communicating signaling with the first device using LOS communications, the signaling including the one or more messages that are encrypted with the secret key.

An apparatus for wireless communication at a second device is described. The apparatus may include a processor, memory coupled with the processor, and instructions stored in the memory. The instructions may be executable by the processor to cause the apparatus to transmit, to a first device, a set of reference signals using a set of LOS communication modes, the LOS communication modes associated with one or more azimuth modes, one or more radial modes, one or more polarization modes, one or more LOS MIMO modes, or a combination thereof, generate a secret key used for encrypting one or more messages communicated between the second device and the first device, the secret key being generated based on the set of LOS communication modes, and communicate signaling with the first device using LOS communications, the signaling including the one or more messages that are encrypted with the secret key.

Another apparatus for wireless communication at a second device is described. The apparatus may include means for transmitting, to a first device, a set of reference signals using a set of LOS communication modes, the LOS communication modes associated with one or more azimuth modes, one or more radial modes, one or more polarization modes, one or more LOS MIMO modes, or a combination thereof, means for generating a secret key used for encrypting one or more messages communicated between the second device and the first device, the secret key being generated based on the set of LOS communication modes, and means for communicating signaling with the first device using LOS communications, the signaling including the one or more messages that are encrypted with the secret key.

A non-transitory computer-readable medium storing code for wireless communication at a second device is described. The code may include instructions executable by a processor to transmit, to a first device, a set of reference signals using a set of LOS communication modes, the LOS communication modes associated with one or more azimuth modes, one or more radial modes, one or more polarization modes, one or more LOS MIMO modes, or a combination thereof, generate a secret key used for encrypting one or more messages communicated between the second device and the first device, the secret key being generated based on the set of LOS communication modes, and communicate signaling with the first device using LOS communications, the signaling including the one or more messages that are encrypted with the secret key.

Some examples of the method, apparatuses, and non-transitory computer-readable medium described herein may further include operations, features, means, or instructions for transmitting the set of reference signals using a set of antenna circles that each include a number of antenna elements, where the set of LOS communication modes includes a set of multiple azimuth modes.

In some examples of the method, apparatuses, and non-transitory computer-readable medium described herein, generating the secret key may include operations, features, means, or instructions for generating the secret key based on at least one azimuth mode of the set of multiple azimuth modes and the respective discrete Fourier transform vector.

In some examples of the method, apparatuses, and non-transitory computer-readable medium described herein, generating the secret key may include operations, features, means, or instructions for generating the secret key based on at least one radial mode of the set of multiple radial modes.

In some examples of the method, apparatuses, and non-transitory computer-readable medium described herein, each of the first beamforming vector and the second beamforming vector may be orthogonal.

In some examples of the method, apparatuses, and non-transitory computer-readable medium described herein, generating the secret key may include operations, features, means, or instructions for generating the secret key based on at least the first polarization mode, the second polarization mode, or both.

Some examples of the method, apparatuses, and non-transitory computer-readable medium described herein may further include operations, features, means, or instructions for transmitting the set of reference signals using a two-dimensional antenna array including a number of antenna elements, where the set of LOS communication modes include a set LOS MIMO modes.

Some examples of the method, apparatuses, and non-transitory computer-readable medium described herein may further include operations, features, means, or instructions for decomposing a LOS MIMO mode of the set LOS MIMO modes into a first set of components associated with a first directional dimension and a second set of components associated with a second directional dimension different than the first directional dimension, generating a first channel matrix associated with the first set of components and a second channel matrix associated with the second set of components, and generating the secret key used for encrypting the one or more messages based on the first channel matrix and the second channel matrix.

Some examples of the method, apparatuses, and non-transitory computer-readable medium described herein may further include operations, features, means, or instructions for receiving, to the first device, a message that may be indicative of the set of LOS communication modes used to receive the set of reference signals.

In some examples of the method, apparatuses, and non-transitory computer-readable medium described herein, receiving the message that may be indicative of the set of LOS communication modes may include operations, features, means, or instructions for receiving one or more reference signals using one or more LOS communication modes of the set of LOS communication modes, the one or more LOS communication modes selected based on a pseudorandom mapping between the set of LOS communication modes and the one or more LOS communication modes.

Some examples of the method, apparatuses, and non-transitory computer-readable medium described herein may further include operations, features, means, or instructions for transmitting a radio resource control signal indicating the pseudorandom mapping between the set of LOS communication modes and the one or more LOS communication modes.

DETAILED DESCRIPTION

Figure 1:
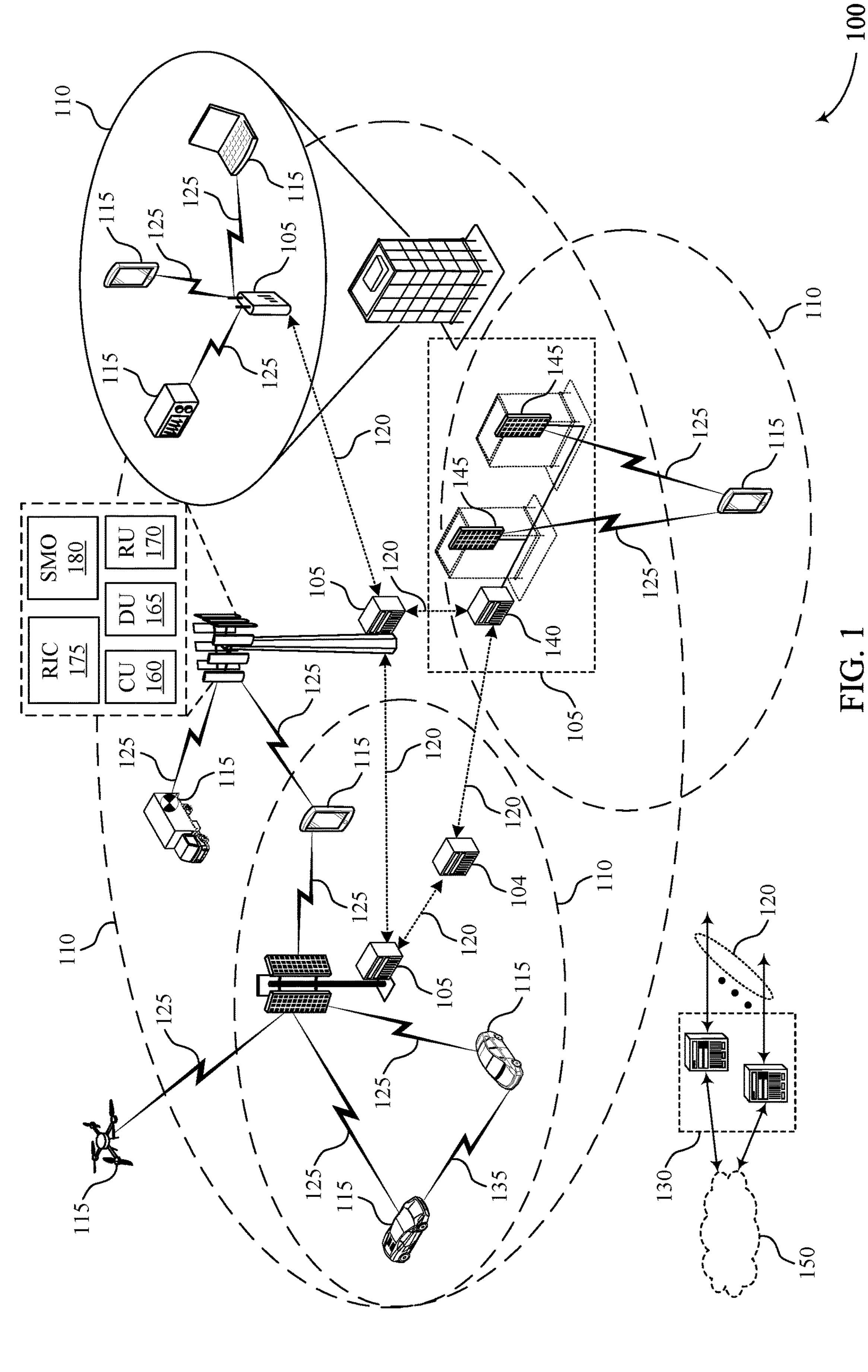
FIGS. 1 and 2 illustrate examples of wireless communications systems that support secret key extraction for line-of-sight (LOS) communications in accordance with aspects of the present disclosure.

Some wireless communications systems may support various types of line-of-sight (LOS) communications (e.g., where a signal from transmitter has a relatively direct path to a receiver), such as orbital angular momentum (OAM) communications, among other types of LOS communications. In some cases, LOS communication quality and reliability may be based on a degree of alignment and obstruction between communication devices (e.g., a user equipment (UE), a base station, an Integrated Access and Backhaul (IAB) node, or the like). For example, LOS communication quality and reliability may increase as the alignment between communication devices (e.g., between antenna arrays of the communication devices) increases and a view between the communication device becomes increasingly clear (e.g., unobstructed). In some examples, communication devices may communicate signaling in accordance with various LOS communication modes (e.g., OAM communication modes), where each LOS communication mode may be associated with a respective phase structure (e.g., to support multiplexing). For example, each LOS communication mode may correspond to a different phase offset between antenna elements of, for instance, a uniform circular array (UCA) used to communicate OAM signals.

In some wireless communications systems, communication devices may secure transmissions over a physical channel (e.g., a physical uplink control channel (PUCCH), a physical downlink control channel (PDCCH), a physical uplink shared channel (PUSCH), or a physical downlink shared channel (PDSCH), among other physical channels) to protect communication from eavesdroppers (e.g., other wireless devices or unintended receivers attempting to detect or decode data included in the physical channel). In some cases, communication devices may secure transmissions over a physical channel using a secret key, where the secret key may be based on a random parameter. For example, a first communication device and a second communication device may obtain a channel metric of the physical channel (e.g., a channel power, a reference signal received power (RSRP), a signal-to-interference-plus-noise ratio (SINR), among other channel metrics) and generate a secret key from the channel metric (e.g., by inputting the channel metric into a key derivation function that outputs the secret key). The first communication device and the second communication device may use the secret key to secure the physical channel for communications between the first communication device and the second communication device. For example, the first communication device and the second communication device may respectively encrypt and decrypt the communications over the physical channel with the secret key. In some cases, it may be desirable to generate the secret key based on the physical channel between the first communication device and the second communication device and/or other communication parameters. In the case of LOS communications, such techniques may be desirable to provide for enhanced security and protection from eavesdroppers who may otherwise be able to listen in on communications between the first communication device and the second communication device.

Techniques, systems, and devices are described herein to improve LOS communication security by generating a secret key based on LOS communication parameters. For example, a quantity of LOS communication modes (e.g., OAM modes) available to a first communication device and a second communication device for communicating signaling using LOS communications may be based on LOS alignment characteristics between the first communication device and the second communication device. For instance, the quantity of available LOS communication modes may decrease as the first communication device and the second communication device become increasingly misaligned, further apart, or a combination thereof. An eavesdropping device may have fewer available LOS communication modes than the first communication device and the second communication device due to being misaligned with respect to the first communication device and the second communication device. Accordingly, the first communication device and the second communication device may leverage the greater quantity of available LOS communication modes when generating a secret key to prevent the eavesdropping device from determining the secret key.

For example, the second communication device may transmit, to the first communication device, a set of reference signals over a physical channel and using a set of LOS communication modes (e.g., of the quantity of available LOS communication modes). The second communication device may receive the set of reference signals in accordance with the set of LOS communication modes, and each of the first communication device and the second communication device may generate the secret key based on the set of LOS communication modes. For example, the first communication device and the second communication device may use information associated with the set of LOS communication modes (e.g., the indexes of the set LOS communication modes) to compute the secret key using a key derivation function that outputs the secret key. The eavesdropping device may be unable to detect at least some of the LOS communication modes of the set of LOS communication modes, for example, due to being relatively misaligned with respect to the first communication device and the second communication device. Thus, the eavesdropping device may be unable to determine which LOS communication mode(s) to use to generate the same secret key and listen to (e.g., decrypt, decode) communications between the first communication device and the second communication device. Accordingly, the first communication device and the second communication device may encrypt (e.g., cypher, encode) signaling with the secret key and communicate the encrypted signaling using LOS communications over the physical channel in a secure manner.

Aspects of the subject matter described in this disclosure may be implemented to realize one or more of the following potential improvements, among others. The techniques employed by the described communication devices may enable secret key generation based on LOS communication parameters, which may improve physical channel security and reduce or eliminate a likelihood of an eavesdropping device accessing (e.g., intercepting, decrypting) communications between the communication devices. For example, generating a secret key based on a set of LOS communication modes may decrease the likelihood that an eavesdropping device is able to generate the same secret key, as the eavesdropping device may be unable to detect at least some of the LOS communication modes. In some examples, the communication devices may generate the secret key based on a randomly selected set of LOS communication modes (e.g., OAM modes), thereby increasing a degree of randomness associated with generating the secret key and further increasing physical channel security.

In some examples, the transmitter and receiver may use a set of antenna circles for communication of reference signals. As such the LOS modes may be examples of azimuth modes. In some examples, each azimuth mode may be associated with multiple radial modes, where each radial-azimuth combined mode may be associated with a polarization mode (e.g., vertical polarization, horizontal polarization, clockwise circular polarization, counter-clockwise circular polarization). By using an azimuth-radial-polarization mode combination, the network may increase the degrees of freedom or number of factors used for security key generation, and by extension enhance the overall security of the system. In some other examples, the transmitter and receiver may use a rectangular antenna array for communication (e.g., communication of reference signals). As such, the LOS modes may be examples of LOS multi-input multi-output (MIMO) modes. In some cases, the transmitter and receiver may generate the secret key based on decomposing a LOS-MIMO mode into multiple (e.g., two) sets of components, which may be associated with different (e.g., respective) directions or dimensions and may use the sets of components for generating channel matrices (e.g., channel matrices may be generated for each set of components).

Aspects of the disclosure are initially described in the context of wireless communications systems. Aspects of the disclosure are then described in the context of array diagrams and process flows. Aspects of the disclosure are further illustrated by and described with reference to apparatus diagrams, system diagrams, and flowcharts that relate to secret key extraction for LOS communications.

FIG. 1 illustrates an example of a wireless communications system 100 that supports secret key extraction for LOS communications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

A network entity 140 may include or refer to a base station 105, and one or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

In some examples, a network entity 140 may be implemented in a disaggregated architecture (e.g., a disaggregated base station architecture, a disaggregated RAN architecture), which may be configured to utilize a protocol stack that is physically or logically distributed among two or more network entities 140, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 140 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 140 in a disaggregated RAN architecture may be co-located, or one or more components of the network entities 140 may be located in distributed locations (e.g., separate physical locations). In some examples, one or more network entities 140 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending upon which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link (e.g., F1, F1-c, F1-u), and a DU 165 may be connected to one or more RUs 170 via a fronthaul communication link (e.g., open fronthaul (FH) interface). In some examples, a midhaul communication link or a fronthaul communication link may be implemented in accordance with an interface (e.g., a channel) between layers of a protocol stack supported by respective network entities 140 that are in communication over such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 140 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 140 (e.g., a donor base station 105). The one or more donor network entities 140 (e.g., IAB donors) may be in communication with one or more additional network entities 140 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max}\cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

In some cases, the wireless communications system 100 may support large-scale MIMO (LSM), massive MIMO (M-MIMO) communications, or both, where both LSM and M-MIMO systems facilitate scalable multi-user communication environments. In some examples, a physical channel of an LSM system or a M-MIMO system may be characterized (e.g., estimated) according to Equation 1 below:

$$H = aH_{LOS} + bH_{NLOS} \tag{1}$$

where H is a channel matrix of estimated transmission coefficients, $H_{LOS}$ corresponds to a LOS portion of the channel matrix, and $H_{NLOS}$ corresponds to a non-LOS (NLOS) portion of the channel matrix. Further, a and b may correspond to coefficients that represent a weight of the LOS portion and the NLOS portion of the estimate of the physical channel. In some examples, Equation 1 may be referred to as a Rician Channel model for estimating a physical channel. In some examples, the LOS portion of the channel matrix may be determined as $$H_{LOS} = \frac{\exp\left(-i2\pi\frac{r_{jk}}{\lambda}\right)}{r_{jk}/\lambda},$$

where $r_{jk}$ corresponds to a distance between a $k^{th}$ antenna element of a transmitting device and a $j^{th}$ antenna element of a receiving device and $\lambda$ may represent a wavelength of a signal communicated between the transmitting device and the receiving device. In some examples, the NLOS portion of the channel matrix may be determined according to a Rayleigh Channel model, a clustered delay line channel model, a tap delay line channel model, or some other model for estimating physical channels.

In some examples, LSM communications may have a relatively strong LOS dependency, where a is greater than b, and M-MIMO communications may have a weak LOS dependency, where a is less than b. That is, to varying degrees, both LSM and M-MIMO communication may rely on a LOS between devices.

In some cases, the wireless communications system 100 may support LOS MIMO communications. In some cases, a LOS MIMO channel structure may be exploited to achieve high multiplexing gain. LOS MIMO communications may be configured to support multiple communication scenarios. For example, LOS MIMO communications may be used to support a backhaul communication link between a base station 105 and a relay (e.g., an IAB node, a smart repeater, a customer premises equipment (CPE), etc.) and an access link between the base station 105 or the relay and the UE 115, among other communication scenarios that implement LOS communications (e.g., LOS MIMO communications). In some cases, LOS MIMO multiplexing gain may increase as a precoder accuracy associated with LOS MIMO communications increases. In some examples, the precoder accuracy may be dependent on various parameters, such as channel knowledge at a transmitting device (e.g., channel estimate accuracy), distance feedback, and alignment compensation, among other examples.

In some examples, LOS MIMO multiplexing gain may depend on a distance between a first communication device (e.g., a base station 105, a UE 115, an IAB node) and a second communication device (e.g., a UE 115, a base station 105, an IAB node). LOS MIMO multiplexing gain may decrease as the distance between the first communication device and the second device increases. In some cases, LOS MIMO communications may be associated with relatively high multiplexing gain if the distance between the first communication device and the second communication device is less than a threshold distance, where the threshold distance may be dependent on a carrier frequency and array apertures of the first communication device and the second communication device.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

In some examples, some layers of the layered protocol stack may be secured (e.g., protected), while other layers may be unsecured (e.g., unprotected). For example, RRC signaling communicated over a physical channel may be secured (e.g., layer 3 (L3) secured), while physical layer signaling (e.g., PUCCH transmissions, PDCCH transmissions, and the like) over the physical channel may be unsecured. In some examples, MAC layer signaling may be secured or unsecured. In some cases, an eavesdropping device may eavesdrop (e.g., listen in on, intercept, decrypt) unsecured signaling that is communicated between communication devices (e.g., base stations 105, UEs 115, IAB nodes). As such, the wireless communications system 100 may support various techniques to secure communications over a physical channel that implement unsecured layer protocols. For example, communication devices may secure such communications by encrypting the communications with a secret key.

The wireless communications system 100 may support various secret key extraction schemes to secure communications over a physical channel. In some examples, a first communication device (e.g., a base station 105, a UE 115, an IAB node) may transmit a set of reference signals to a second communication device (e.g., a UE 115, a base station 105, an IAB node) over a physical channel (e.g., a PUCCH, a PDCCH, a PUSCH, a PDSCH, and the like). The first communication device and the second communication device may estimate the physical channel to obtain a channel metric (e.g., a channel power, an RSRP, an SINR, among other channel metrics) based on the estimation. In some examples, the first communication and the second communication device may use the channel metric as an input to a key derivation function that outputs a secret key. In some examples, the first communication device and the second communication device may quantize the channel metric and map the quantized channel metric to the secret key. In some cases, the first communication device and the second communication device may perform further key refinement procedures, in which, for example, the first communication device may retransmit the set of reference signals one or more times to obtain additional channel metrics for secret key generation. The first communication device and the second devices may use the secret key to secure transmissions sent via the physical channel (e.g., transmission fields within a PUCCH, a PDCCH, a PDSCH, a PUSCH, and the like), for example, by encrypting the transmissions with the secret key.

Communication devices of the wireless communications system 100 may be configured to leverage LOS communication parameters to increase a security of secret key extraction schemes and to prevent eavesdropping devices may determining a secret key. For example, a first communication device (e.g., a base station 105, a UE 115, an IAB node) may (e.g., randomly) select a set of LOS communication modes from a quantity of available LOS communication modes to use to transmit a set of reference signals to a second communication device (e.g., a UE 115, a base station 105, an IAB node) over a physical channel. The second communication device may receive the set of reference signals and detect the set of LOS communication modes based on the set of reference signals. Using information associated with the set of LOS communication modes, the first communication device and the second communication device may generate the secret key (e.g., instead of using a channel metric of the physical channel). At least some of the set of LOS communication modes may be unavailable to, or undetectable by, an eavesdropping device, and thus, the eavesdropping device may be unable to determine the generated secret key. Accordingly, the first communication device and the second communication device may securely communicate signaling over the physical channel using LOS communications by encrypting the signaling with the generated secret key.

Figure 2:
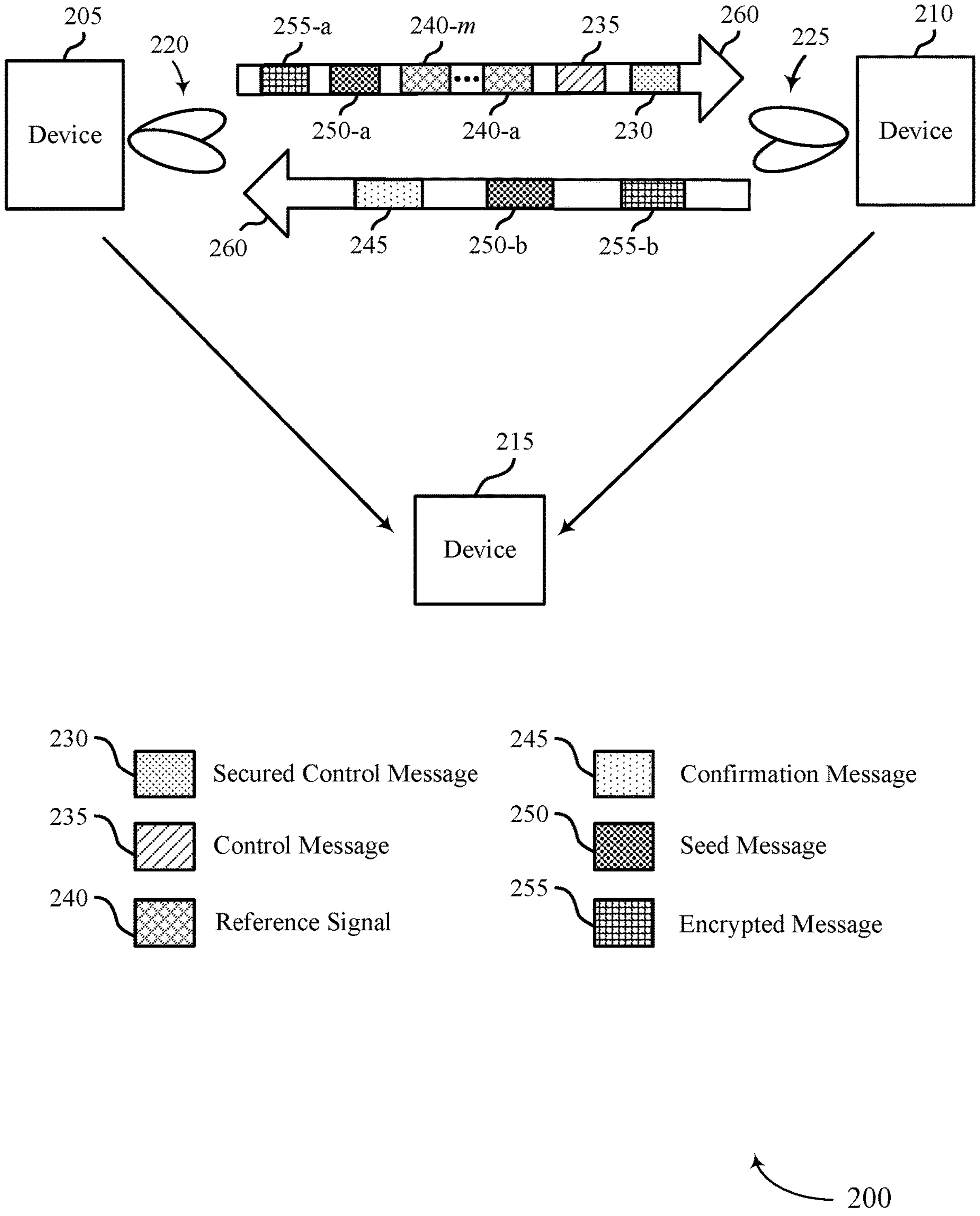

FIG. 2 illustrates an example of a wireless communications system 200 that supports secret key extraction for LOS communications in accordance with aspects of the present disclosure. In some examples, the wireless communications system 200 may implement or be implemented by aspects of wireless communications system 100. For example, the wireless communications system 200 may include a device 205 and a device 210, where the device 205 and the device 210 may be a same type of communication device or may be different types of communication devices as described herein. For example, the device 205 and the device 210 may be examples of a UE 115, a base station 105, or an IAB node, as described with reference to FIG. 1, among other communication devices. The wireless communications system 200 may support LOS communication mode-based secret key extraction schemes, which may provide improvements to communication security, eavesdropping prevention, reliability, data rates, latency, power consumption, resource usage efficiency, coordination between devices, and battery life, among other benefits.

The wireless communications system 200 may support communications between the device 205 and the device 210. For example, the device 205 and the device 210 may communicate messages (e.g., uplink messages, downlink messages, sidelink messages) over communication links 260. In some examples, the communication links 260 may be examples of a communication link 125 described with reference to FIG. 1. In some other example, the communication links 260 may be examples of a D2D communication link 135 described with reference to FIG. 1.

The wireless communications system 200 may support LOS communications between the device 205 and the device 210, such as OAM communications, among other types of LOS communications (e.g., visible light communications, light emitting diode (LED)-to-LED communications, among other of communications using an electromagnetic signal that may travel in a relatively direct path between a transmitted and a receiver). For example, respective antenna arrays of the device 205 and the device 210 may be aligned such that signals communicated between the device 205 and the device 210 may propagate in a LOS manner. In some examples, the device 205 and the device 210 may transmit and receive LOS communications using various beams. For example, the device 205 may transmit or receive LOS communications using one or more LOS beams 220 (e.g., an OAM beam), and the device 210 may transmit or receive LOS communications using one or more LOS beams 225 (e.g., an OAM beam). In some examples, the device 205 and the device 210 may transmit and receive LOS communications in accordance with various LOS communication modes (e.g., OAM modes described with reference to FIG. 3). For example, different LOS communication modes may correspond to different phase offsets between antenna elements of respective antenna arrays of the device 205 and the device 210 that may be used to transmit and receive LOS communications. As an example, an OAM mode may refer to a mode of a signal transmitted using OAM transmission techniques, such as using a UCA or spiral phase plate (SPP).

The wireless communications system 200 may support leveraging LOS communication parameters to secure LOS communications between the device 205 and the device 210. For example, the wireless communications system 200 may include a device 215, which may be an example of an eavesdropping device. That is, the device 215 may attempt to eavesdrop (e.g., listen in on, intercept, decrypt) communications between the device 205 and the device 210. To secure the communications between the device 205 and the device 210 and prevent the device 215 from eavesdropping the communications, the device 205 and the device 210 may generate a secret key based on the LOS communication parameters and may use the secret key to encrypt and secure the communications. For example, the device 205 and the device 210 may generate the secret key using information associated with a set of LOS communication modes used to communicate signaling between the device 205 and the device 210.

To support such secret key generation, the device 205 may be configured to transmit, to the device 210 and over a physical channel (e.g., a PUCCH, a PDCCH), a quantity of reference signals 240 using a set of LOS communication modes. For example, the device 205 and the device 210 may have a quantity of LOS communication modes available for communicating with each other that is based on a distance between the device 205 and the device 210, an alignment of the device 205 and the device 210, or a combination thereof. For example, the quantity of LOS communication modes available for communication may decrease as devices become increasingly misaligned and distances between devices increases. Accordingly, the device 205 and the device 210 may have a relatively large quantity of available LOS communication modes. For example, if a distance between the device 205 and the device 210 is 100λ (where λ is the wavelength of a signal communicated between the device 205 and the device 210), the device 205 and the device 210 may have fourteen available LOS communication modes, or some other quantity of available LOS communication modes. The device 215, however, may be misaligned with respect to the device 205 and the device 210. Thus, the device 215 may have fewer LOS communication modes that are detectable by the device 215 (e.g., fewer available LOS communication modes for communicating with the device 205 or the device 210. For example, due to misalignment, the device 215 may be able to detect eight out of the fourteen LOS communication modes, thereby leaving six LOS communication modes that are undetectable or unusable by the device 215.

The device 205 may transmit the reference signals 240 using the set of LOS communication modes, where at least some of the LOS communication modes are undetectable or unusable by the device 215. For example, the device 205 may (e.g., randomly) select a set of M LOS communication modes from the quantity of available LOS communication modes for transmitting a set of M reference signals 240 (e.g., a reference signal 240-*a* through a reference signal 240-*m*), where M is a positive integer. In some examples, higher order LOS communication modes (e.g., LOS communication modes having higher indexes) may be more likely to be undetectable or unusable by the device 215 (e.g., may be more difficult for the device 215 to detect). Accordingly, in some cases, the device 205 may select relatively higher order LOS communication modes from the quantity of available LOS communication modes to include in the set of M LOS communication modes. In this way, the device 205 may decrease a likelihood that the device 215 is able to detect the set of M LOS communication modes.

In some examples, the device 205 may indicate, to the device 210, a configuration of the reference signals 240 (e.g., a time and resource configuration of the reference signals 240) as well as the quantity of LOS communication modes for transmitting the reference signals 240 (e.g., may indicate the value of M). For example, the device 205 may transmit a secured control message 230 to the device 210 that indicates the configuration of the reference signals 240 and the value of M. The secured control message 230 may be a message that device 215 may be unable to decode, such as an RRC message that is L3 secured. Therefore, the device 215 may be unable to determine the quantity of reference signals 240 communicated between the device 205 and the device 210, the quantity of LOS communication modes used to communicate the reference signals 240, or the resources over which the reference signals 240 are communicated, or any combination thereof. Accordingly, the device 205 may transmit the set of M reference signals 240 to the device 210 in accordance with the secured control message 230, thus adding additional security to the communication of the reference signals 240 and further decreasing a likelihood that the device 215 is able to detect or estimate (e.g., guess) the set of M LOS communication modes.

In some examples, the device 205 may update the configuration of the reference signals 240, the value of M, or a combination thereof. For example, the device 205 may transmit a control message 235 that updates the configuration of the reference signals 240, the value of M, or a combination thereof. Here, the device 205 and the device 210 may communicate the reference signals 240 in accordance with the control message 235 (e.g., the updated configuration of the reference signals 240, the updated value of M, or a combination thereof). In some examples, the device 205 may transmit the control message 235 in a MAC-CE, which may be secured or unsecured.

The device 210 may determine the set of M LOS communication modes based on the reference signals 240. For example, the device 210 may receive the set of M reference signals 240 from the device 205 in accordance with the set of M LOS communication modes and determine (e.g., detect) the set of M LOS communication modes based on the LOS communication modes used to receive the set of M reference signals 240.

The device 205 and the device 210 may generate the secret key based on information associated with the set of M LOS communication modes. For example, the device 205 and the device 210 may hash or modify the set of M LOS communication modes to obtain a key. In some cases, the key may correspond to the respective indexes of the M LOS communication modes. In some other cases, the device 205 and the device 210 may hash or modify the respective indexes of the M LOS communication modes to obtain the key. The device 205 and the device 210 may compute the secret key using the key. For example, the device 205 and the device 210 may input the key into a key derivation function that outputs the secret key.

In some examples, the device 205 and the device 210 may use multiple sets of LOS communication modes to generate the secret key. For example, the device 205 may transmit multiple sets of M reference signals 240 (e.g., Z sets of M reference signals 240, where Z is a positive integer) and may use a random value of M for each set of M reference signals 240. Additionally, the device 205 may select different sets of M LOS communication modes to transmit each set of M reference signals 240 (e.g., select Z sets of M LOS communication modes). The device 210 may determine the Z sets of M LOS communication modes based on receiving the Z sets of M reference signals 240 in accordance with the Z sets of M LOS communication modes. The device 205 and the device 210 may use the Z sets of M LOS communication modes as to obtain the key for input into the key derivation function. For example, the device 205 and the device 210 may concatenate the indexes corresponding to each LOS communication mode of the Z sets of M LOS communication modes and may use (e.g., hash, modify) the concatenated indexes to obtain the key.

The device 205 and the device 210 may use the secret key to secure the physical channel (e.g., and another physical channel such as a PUSCH or a PDSCH). For example, the device 205 and the device 210 may encrypt messages with the secret key and may communicate encrypted messages 255 via the secured physical channel and using LOS communications. For instance, the device 205 may transmit an encrypted message 255-*a* to the device 210 using LOS communications (e.g., using an LOS communication mode). Additionally or alternatively, the device 210 may transmit an encrypted message 255-*b* to the device 205 using LOS communications. The device 205 and the device 210 may decode the encrypted messages 255 with the secret key. Because the device 215 may be unable to detect or determine at least some of the LOS communication modes used to generate the secret key, the device 215 may be unable to generate the secret key and decrypt the encrypted messages 255.

In some examples, the device 205 and the device 210 may communicate additional information to further secure the generation of the secret key. For example, in response to receiving the set of M reference signals 240, the device 210 may send a confirmation message 245 to the device 205 to indicate correct detection of the set of M LOS communication modes. The confirmation message 245 may include one or more reference signals that are indicative of the set of M LOS communication modes used by the device 210 to receive the set of M reference signals 240. For example, the device 210 may transmit the one or more reference signals to the device 205 using one or more LOS communication modes (e.g., OAM modes), where the one or more LOS communication modes may be determined from the set of M LOS communication modes detected by the device 210. For instance, in some examples, the device 210 may map the set of M LOS communication modes to the one or more LOS communication modes using a mapping between the set of M LOS communication modes and the one or more LOS communication modes. The mapping may be shared by the device 205 and the device 210 (e.g., configured via RRC signaling) and thus, the device 205 may be able to map the one or more LOS communication modes to the set of M LOS communication modes to confirm correct detection of the set of M LOS communication modes by the device 210.

In some other examples, the device 210 may transmit a reference signal using an LOS communication mode corresponding to the highest indexed LOS communication mode of the set of M LOS communication modes. In some examples, the device 210 may transmit the reference signal using an LOS communication mode corresponding to the lowest indexed LOS communication mode from the set of M LOS communication modes. In some examples, the device may transmit the reference signal using an LOS communication mode having index x, where x=mod(y, M), and y corresponds to a sum of the indexes of the set of M LOS communication modes. In some examples, the device 210 may transmit the reference signal using an LOS communication mode having the median index from the set of M LOS communication modes. The device 205 may receive the confirmation message 245 in accordance with the one or more LOS communication modes and confirm that the device 210 correctly detect the set of M LOS communication modes. Accordingly, by communicating the confirmation message 245, the device 205 and the device 210 may confirm that they will each generate the same secret key. In some examples, if the confirmation message 245 indicates a discrepancy between the used and detected LOS communication modes, the device 205 may be configured to retransmit the set of M reference signals (e.g., using the same or different LOS communication modes).

In some examples, the device 205 may and the device 210 may communicate a seed message 250 in response to the communicating the confirmation message 245. In some examples, the seed message 250 may include a key seed or a set of key seeds (e.g., key symbols) βs ($\beta_1$, $\beta_2$, $\beta_3$, . . . ) that the device 205 and the device 210 may use to generate the secret key. For example, the device 205 and the device 210 may input the key seed β or the set of key seeds βs (and/or other parameters) into the key derivation function to generate the secret key. In some examples, the key derivation function may be an example of a secure hash algorithm (SHA)-256 key generator for an HMAC (keyed-hash message authentication code or hash-based message authentication code) process; however, other types of key derivation functions may be used.

The device 205 and the device 210 may communicate the seed message 250 may using one or more LOS communication modes from the set of M LOS communication modes. For example, the device 205 and the device 210 may select L LOS communication modes from the set of M communication modes, where L is a positive integer less than or equal to M. In some examples, the device 205 and the device 210 may select the L LOS communication modes using a random-like procedure, for example, inputting the indexes of the set of M LOS communication modes into a pseudorandom generator that outputs the L LOS communication modes. The device 205 and the device 210 may then communicate the seed message 250 using L LOS communication modes. For example, the device 205 may transmit a seed message 250-*a* using the L LOS communication modes. Alternatively, the device 210 may transmit a seed message 250-*b* using the L LOS communication modes.

In some examples, the device 205 and the device 210 may communicate artificial noise using the remaining LOS communication modes of the set of M LOS communication modes (e.g., the non-L LOS communication modes). For example, the device 205 may transmit the seed message 250-*a* using the L LOS communication modes and the artificial noise using the remaining non-L LOS communication modes. Alternatively, the device 210 may transmit the seed message 250-*b* using the L LOS communication modes and the artificial noise using the remaining non-L LOS communication modes. Because the device 205 and the device 210 are aware of the L LOS communication modes prior to the communication of the seed message 250, the device 205 and the device 210 may recognize which LOS communication modes are used to communicate artificial noise and may successfully decode the seed message 250 using the L LOS communication modes.

Figure 3A:
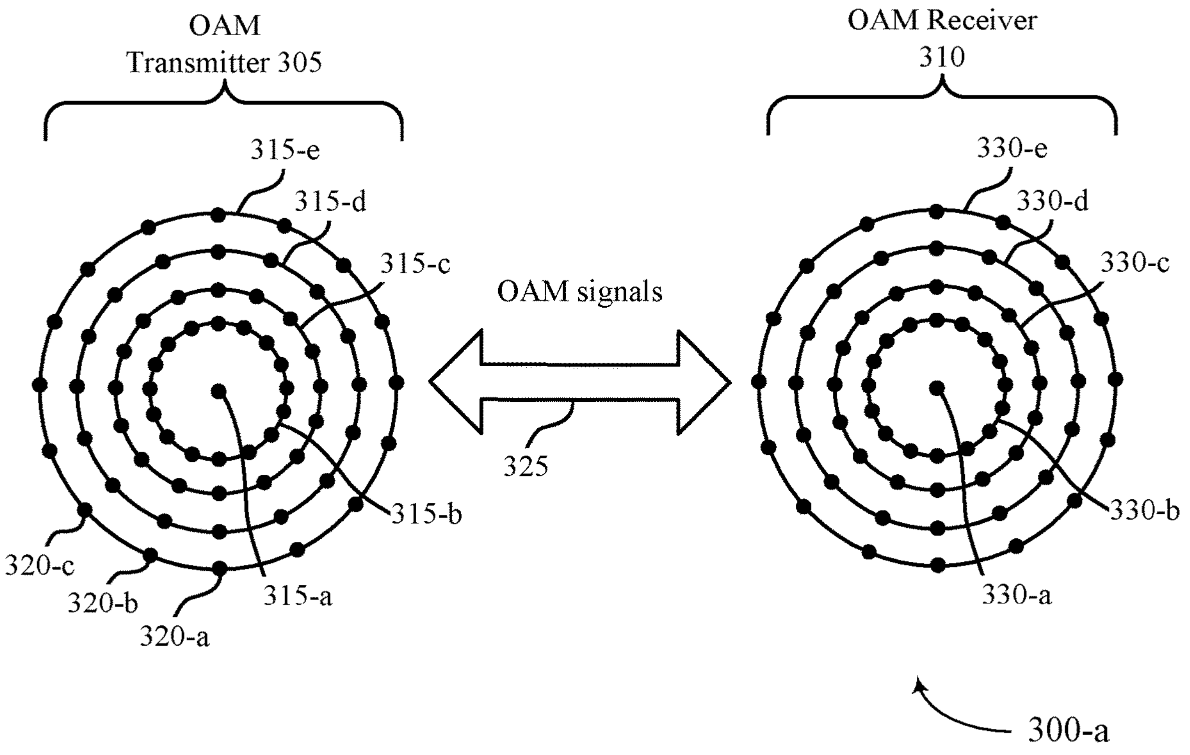
FIG. 3A illustrates an example of an array diagram that supports secret key extraction for LOS communications in accordance with aspects of the present disclosure.

FIG. 3A illustrates an example of an array diagram 300 that supports secret key extraction for LOS communications in accordance with aspects of the present disclosure. The array diagram 300 may implement or be implemented by aspects of the wireless communications systems 100 and 200 as described with reference to FIGS. 1 and 2, respectively. For example, the array diagram 300 depicts an OAM transmitter 305 and an OAM receiver 310. The OAM transmitter 305 may be implemented by a first communication device (e.g., a base station 105, a UE 115, an IAB mode, a device 205), and the OAM receiver 310 may be implemented by a second communication device (e.g., a UE 115, a base station 105, an IAB node, a device 210). The OAM transmitter 305 and the OAM receiver 310 may be implemented the first communication device and the second communication device, respectively, to communicate signaling using LOS communication modes and enable LOS communication mode-based secret key generation.

The OAM transmitter 305 may be an example of a multi-ring UCA with which the first communication device may be configured to transmit OAM communications. The OAM receiver 310 may be an example of a multi-ring UCA with which the second communication device may be configured to receive OAM communications. Additionally, the OAM transmitter 305 may be configured to operate as an OAM receiver 310, and the OAM receiver 310 may be configured to operate as an OAM transmitter 305. OAM communications may be an example of a type of LOS communications described herein.

In OAM communications, a transmitter (e.g., the first communication device) may transmit multiple coaxially-propagating and spatially-overlapping electromagnetic (EM) waves, each carrying a data stream, to a receiver (e.g., the second communication device). Each wave may be transmitted according to an OAM mode. For example, the waves may be transmitted by a transmit aperture and may propagate along one axis to the receiver. The wavefront of an OAM wave may have a helical shape, and the phases of an OAM wave in a transverse plane may have the form of $\exp(i\varphi l)$, where φ may represent an azimuthal angle and l may represent an unbounded integer (e.g., an OAM order, a mode index). In some examples, the helical wavefronts of OAM waves may be generated by a UCA panel, where the helical wave may be generated via distributed points. That is, received signals at antenna elements of a receiver UCA panel (e.g., a UCA ring) may have identical amplitude and progressive phases. As such, UCA-based OAM communications may be similar to UCA-based MIMO communications. In other examples, OAM waves may be generated using an SPP. Each OAM mode may be an element of orthogonal basis, and may be used for multiplexing different signals. As such, OAM communications may create a relatively high spatial multiplexing degree in an LOS channel, which may lead to enhanced data rates. In addition, OAM communications may enable the use of static transmit and receive beamforming vector weights, which may reduce the use of inter-mode equalization at a base band (e.g., under directional alignment) and reduce base band processing complexity.

The OAM transmitter 305 may include one or more UCA rings 315, and the OAM receiver 310 may include one or more UCA rings 330. In the example of FIG. 3A, the OAM transmitter 305 may include UCA rings 315-*a*, 315-*b*, 315-*c*, 315-*d*, and 315-*e*, and the OAM receiver 310 may include UCA rings 330-*a*, 330-*b*, 330-*c*, 330-*d*, and 330-*e*, although each of the OAM transmitter 305 and the OAM receiver 310 may include any quantity of UCA rings 330. A UCA ring 315 may be used to form phase-shifted received signal values at discrete element positions of a UCA ring 330. The UCA rings 315 and the UCA rings 330 may be co-axial, include the same number of antenna elements, and include the same radii or different radii. In some examples, signals transmitted between the OAM transmitter 305 and the OAM receiver 310 may be represented by a channel matrix H, where H may be a circulant matrix where its eigenvectors may be equal to DFT vectors. In some aspects, the propagation of the wave-form over a physical channel may be further represented by elements of the channel matrix H being modified by $h_{n,m}$ defined by Equation 2 below:

$$h_{n,m} = \frac{\sqrt{G}\lambda}{4\pi d_{m,n}} \exp\left(-j2\pi\frac{d_{m,n}}{\lambda}\right) \quad (2)$$

Here, G may represent a value relative to receive and transmit antennas, λ may represent a wavelength of an OAM wave communicated between the OAM transmitter 305 and the OAM receiver 310, and $d_{m,n}$ may represent a distance between the OAM transmitter 305 and the OAM receiver 310.

Each UCA ring 315 and UCA ring 330 may include a respective quantity of antenna elements 320. In some examples, different UCA rings 315 and UCA rings 330 may include a same quantity of antenna elements 320. In some other examples, different UCA rings 315 and UCA rings 330 may include different quantities of antenna elements 320.

The OAM transmitter 305 and the OAM receiver 310 may support communicating OAM signals 325 using different OAM communication modes. For example, different OAM communication modes may correspond to different phase offsets that are used between antenna elements 320 of a UCA ring (e.g., and using different combinations of UCA rings). For instance, a first OAM communication mode may correspond to no phase offset between antenna elements 320 of a UCA ring. For example, the first OAM communication mode may correspond to each antenna element 320 of a first combination of one or more UCA rings having a same phase (e.g., a phase of 0 degrees). A second OAM communication mode may correspond to a phase offset of 45 degrees between antenna elements of a second combination of one or more UCA rings. For example, the second OAM communication mode may correspond to a 45 degree offset between antenna elements 320 of an outer UCA ring (e.g., the UCA ring 315-*e* and the UCA ring 330-*e*). That is, if an antenna element 320-*a* has a phase offset of 45 degrees, an antenna element 320-*b* may have a phase offset of 90 degrees, an antenna element 320-*c* may have a phase offset of 135 degrees, and so on. It is noted that any phase offsets and any combination of UCA rings may be used for a respective OAM communication mode.

In some examples, the first communication device and the second communication device may use a set of OAM communication modes to communicate (e.g., to transmit or receive reference signals or other signals). For example, the set of OAM communication modes may be obtained in both the azimuth and radial directions. According to some aspects described herein, the transverse plane, which may have the form of exp(iφl), where φ may represent an azimuthal angle, may be associated with a set of azimuth modes. In some cases, each azimuth mode may correspond to a respective phase of the transverse plane.

Additionally or alternatively, multiple radial modes may be determined based on Laguerre polynomials, such as:

$$L_p^{|l|}\frac{2\rho^2}{w^2(0)}e^{i\varphi l}$$

where the Laguerre polynomials are modulated by a Gaussian profile, such as:

$$e^{-\rho^2}$$

where the signal waveform may be constrained to a finite width. In some examples, there may be partial separability between the azimuth and radial directions. For example, azimuth modes may be independent OAM modes, while radial modes may be dependent on each azimuth mode (e.g., and may therefore not be independent OAM modes). This radial dependency to azimuth modes may be due to the dependence of l in the Laguerre polynomials.

As such, multiple radial modes may be generated for each azimuth mode. In some examples, the multiple radial modes may be generated using a singular-vector based technique. For example, a radial mode for a given azimuth mode may represent a singular vector of a channel matrix, where each element of the channel matrix may include a singular value of a channel gain matrix. In some examples, the channel gain matrix may be associated with a set of UCA rings 315 at the OAM transmitter 305 and a set of UCA rings 330 at the OAM receiver 310 paired respectively. As such, the radial mode may define a beamforming vector of the OAM transmitter 305, and the weight vector used to obtain the beamforming vector (e.g., by a Kronecker product of the weight vector and the DFT vector defined by the azimuth mode) may be the singular vector associated with the radial mode associated with the azimuth mode.

Additionally or alternatively, the OAM transmitter 305 may use a codeword based technique to generate the radial modes. For example, the multiple OAM signals 325 may be referred to as separate spatial streams and may carry bits associated with the same data stream (e.g., the same codeword) or different data streams (e.g., different codewords). Different spatial layers may be associated with different antenna elements 320 used for channel measurement and reporting.

In some examples, the first communication device and the second communication device may use azimuth modes, azimuth-radial modes, or a combination thereof during communication of the OAM signals 325. Further, polarization of the OAM signals 325 may be another degree of freedom associated with the OAM modes. For example, polarization (e.g., linear, circular, or elliptical polarizations, or clockwise circular polarization, or counter-clockwise circular polarization) may be associated with each azimuth or azimuth-radial mode. As such, an azimuth mode may be associated with multiple azimuth-polarization modes and an azimuth-radial mode may be associated with multiple azimuth-radial-polarization modes.

The first communication device and the second communication device may use the set of OAM communication modes to generate a secret key with which the first communication device and the second communication device may encrypt OAM signals.

Figure 3B:
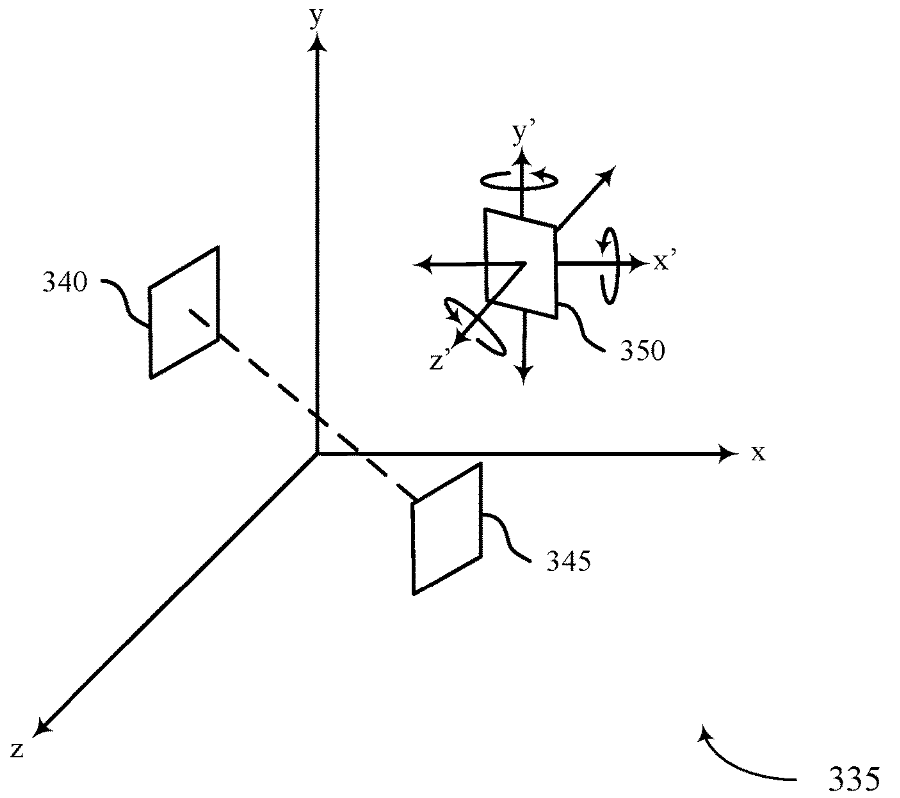
FIG. 3B illustrates an example of a wireless communications system that supports secret key extraction for LOS communications in accordance with aspects of the present disclosure.

FIG. 3B illustrates an example of a wireless communications system 335 that supports secret key extraction for LOS communications in accordance with aspects of the present disclosure. In some examples, the wireless communications system 335 may implement or be implemented by aspects of wireless communications systems 100 and 200, respectively. For example, the wireless communications system 200 may include a device 340, a device 345, and device 350. The device 340 and the device 350 may be a same type of communication device or may be different types of communication devices as described herein. For example, the device 340 and the device 345 may each be examples of a UE 115, a base station 105, or an IAB node, as described with reference to FIG. 1, among other communication devices. In some examples, the device 340 may be an example of a device 205, the device 345 may be an example of a device 345, and the device 350 may be an example of a device 215 as described with reference to FIG. 2.

The device 340 and the device 345 may support LOS communications using various LOS communication modes. Additionally, the device 340 and the device 345 may support secret key generation based on LOS communication modes used to communicate reference signals between the device 340 and the device 345. In some examples, a quantity of LOS communication modes that are available to the device 340 and the device 345 may be based on an alignment of respective antenna arrays of the device 340 and the device 345. For example, an antenna array of the device 340 and an antenna array of the device 345 may be relatively aligned, and thus, a relatively large quantity of LOS communication modes (e.g., OAM communication modes) may be available to the device 340 and the device 345 for communicating LOS signals.

The device 350 may attempt to eavesdrop communications between the device 340 and the device 345. However, an antenna array of the device 350 may be misaligned with the antenna arrays of the device 340 and the device 345. The antenna array of the device 350 may be misaligned in various ways. For example, the antenna array of the device 350 may suffer from rotational misalignment in which the antenna array of the device 350 is rotated with respect to the x-axis (e.g., rotated about the x'-axis), the y-axis (e.g., rotated about the y'-axis), the z-axis (e.g., rotated about the z'-axis), or a combination thereof. Additionally or alternatively, the antenna array of the device 350 may suffer from shift misalignment in which the antenna array of the device is shifted in the x-direction, the y-direction, the z-direction, or a combination thereof. Each of rotational misalignment and shift misalignment may reduce a quantity of LOS communication modes that the device 350 may be able to use to communicate with the device 340 and the device 345. Accordingly, due to the misalignment between the antenna array of the device 350 and the antenna arrays of the device 340 and the device 345, the device 350 may be able to detect a relatively smaller quantity of LOS communication modes than may be used by the device 340 and the device 345.

Based on the misalignment of the device 350, the device 340 and the device 345 may communicate reference signals using LOS communication modes that may be undetectable by the device 350. Accordingly, by generating a secret key based on the undetectable LOS communication modes, the device 340 and the device 345 may secure and protect LOS communications from eavesdropping by the device 350.

Figure 4:
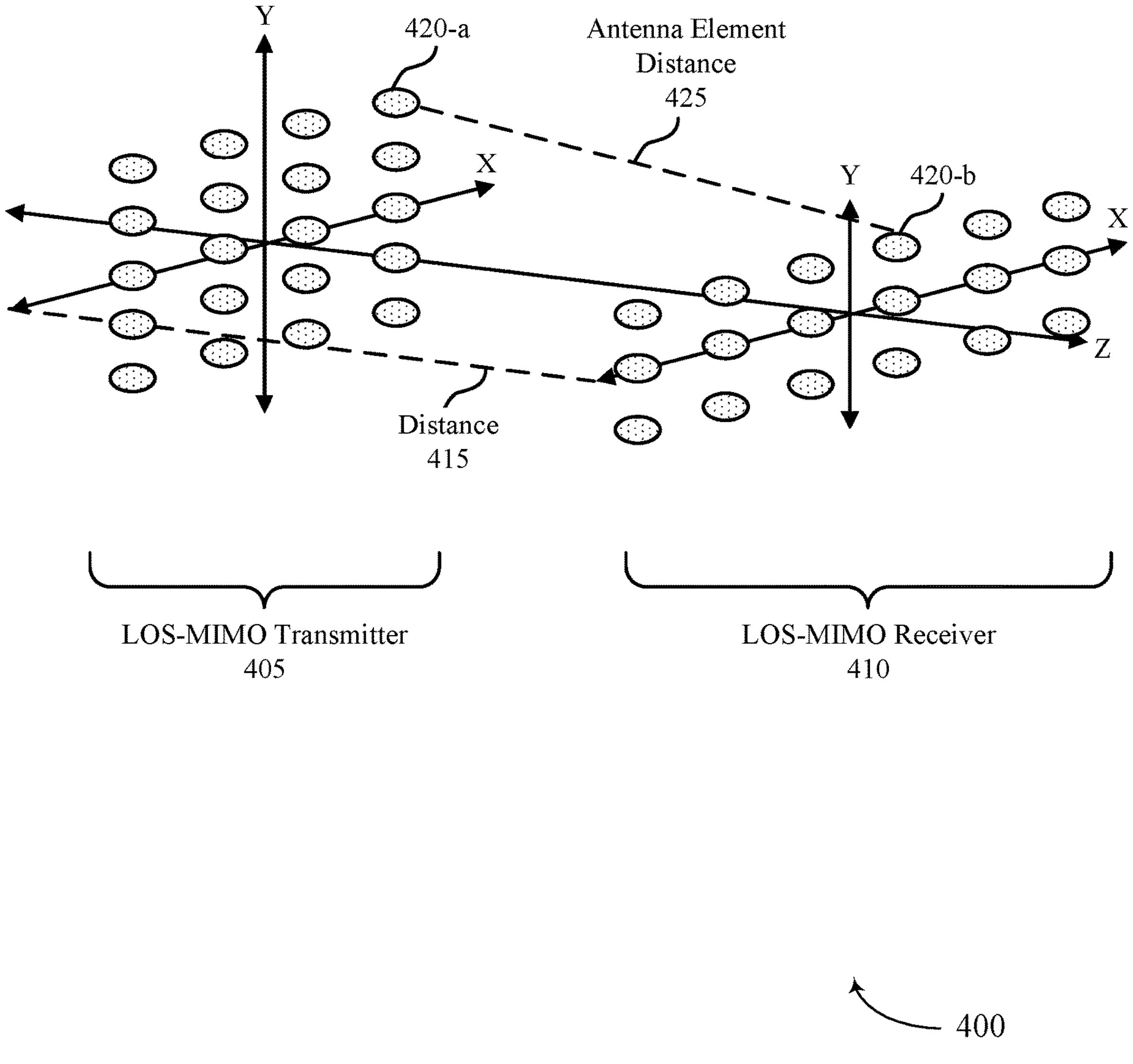
FIG. 4 illustrates an example of an array diagram in a system that supports secret key extraction for LOS communications in accordance with aspects of the present disclosure.

FIG. 4 illustrates an example of an array diagram 400 that supports secret key extraction for LOS communications in accordance with aspects of the present disclosure. The array diagram 400 may implement or be implemented by aspects of the wireless communications systems 100 and 200 as described with reference to FIGS. 1 and 2, respectively. For example, the array diagram 400 depicts a LOS-MIMO transmitter 405 and an LOS-MIMO receiver 410. The LOS-MIMO transmitter 405 may be implemented by a first communication device (e.g., a base station 105, a UE 115, an IAB mode, a device 205), and the LOS-MIMO receiver 410 may be implemented by a second communication device (e.g., a UE 115, a base station 105, an IAB node, a device 210). The LOS-MIMO transmitter 405 and the LOS-MIMO receiver 410 may be implemented the first communication device and the second communication device, respectively, to communicate signaling using LOS communication modes and enable LOS communication mode-based secret key generation.

The LOS-MIMO transmitter 405 may be an example of a rectangular antenna array with which the first communication device may be configured to transmit LOS-MIMO communications. The LOS-MIMO receiver 410 may be an example of a rectangular array with which the second communication device may be configured to receive LOS-MIMO communications. Additionally, the LOS-MIMO transmitter 405 may be configured to operate as an LOS-MIMO receiver 410, and the LOS-MIMO receiver 410 may be configured to operate as an LOS-MIMO transmitter 405. OAM communications may be an example of a type of LOS communications described herein. In some examples, LOS-MIMO communications may be used for rectangular antenna arrays in addition to or alternative to OAM communications.

The LOS-MIMO transmitter 405 may include one or more antenna elements 420 that may be configured in a rectangular array, and the LOS-MIMO receiver 410 may include antenna elements 420 that may be configured in a rectangular array. In the example of FIG. 4, the LOS-MIMO transmitter 405 may include 20 antenna elements 420 spaced (e.g., evenly) across four columns and five rows in the x-y plane and the LOS-MIMO receiver 410 may include 18 antenna elements 420 spaced (e.g., evenly) across six columns and three rows in the x-y plan, although each of the LOS-MIMO transmitter 405 and the LOS-MIMO receiver 410 may include any quantity of antenna elements 420 distributed across any number of antenna columns and antenna rows. As illustrated in FIG. 4, the LOS-MIMO transmitter 405 and the LOS-MIMO receiver 410 may be centered about the z-axis, in which the LOS-MIMO transmitter 405 and the LOS-MIMO receiver 410 may be separated along the z-axis by a distance 415.

In LOS-MIMO communications, a transmitter (e.g., the first communication device) may transmit, in accordance with one or more LOS-MIMO modes. For example, the LOS-MIMO transmitter 405 may transmit multiple coaxially-propagating and spatially-overlapping EM waves, each carrying a data stream, to a receiver (e.g., the second communication device). For example, with reference to FIG. 4, the LOS-MIMO transmitter 405 may transmit a set of LOS signals using antenna element 420-*a* and the LOS-MIMO receiver 410 may receive the set of LOS signals using the antenna element 420-*b*. In such examples, the set of LOS signals may travel from the antenna element 420-*a* to the antenna element 420-*b* across the antenna element distance 425. In some examples, the antenna element distance 425 may include multiple spatial components (e.g., includes an x-component and y-component of propagation). As such, the LOS-MIMO transmitter 405 and the LOS-MIMO receiver 410 may identify the one or more MIMO modes used for transmission of the set of LOS signals by separating the set of LOS signals into two dimensions (e.g., the x-dimension and the y-dimension) and generating a channel matrix for each dimension.

In some examples of dimensional separation, the LOS-MIMO transmitter 405 and the LOS-MIMO receiver 410 may use a singular-vector type method to generate and analyze the channel matrix for each dimension. For example, the wireless devices may operate in accordance with singular value decomposition (SVD), in which the channel matrix associated with the set of LOS signals may be decomposed into one or more component matrices, in which each of the component matrices is associated with a respective spatial dimension (e.g., a first channel matrix associated with the x-direction and a second channel matrix associated with the y-direction). Additionally or alternatively, the LOS-MIMO transmitter 405 and the LOS-MIMO receiver 410 may use a codeword based method to generate and analyze the channel matrix for each dimension. For example, each of the set of LOS signals may be referred to as a separate spatial stream and may carry bits associated with the same data stream (e.g., the same codeword) or different data streams (e.g., different codewords). Different spatial layers may be associated with different antenna ports used for channel measurement and reporting. By generating channel matrices for each dimension of signal propagation, the LOS-MIMO transmitter 405 and the LOS-MIMO receiver 410 may generate a secret key for encrypting one or more messages.

Additionally or alternatively, the LOS-MIMO transmitter 405 may use polarization in the construction of the set of LOS signals. As such, each of the set of LOS signals may be associated with a direction of polarization (e.g., linear, circular, or circular/elliptical polarizations), where the direction of polarization increases the number of modes associated with the array diagram 400. For example, polarization may introduce an additional degree of freedom such that polarization may be added to each LOS-MIMO mode. For instance, with reference to linear polarization, each LOS-MIMO mode may be associated with a horizontal polarization and a vertical polarization, which may increase the number of modes associated with the array diagram 400 by two.

Figure 5:
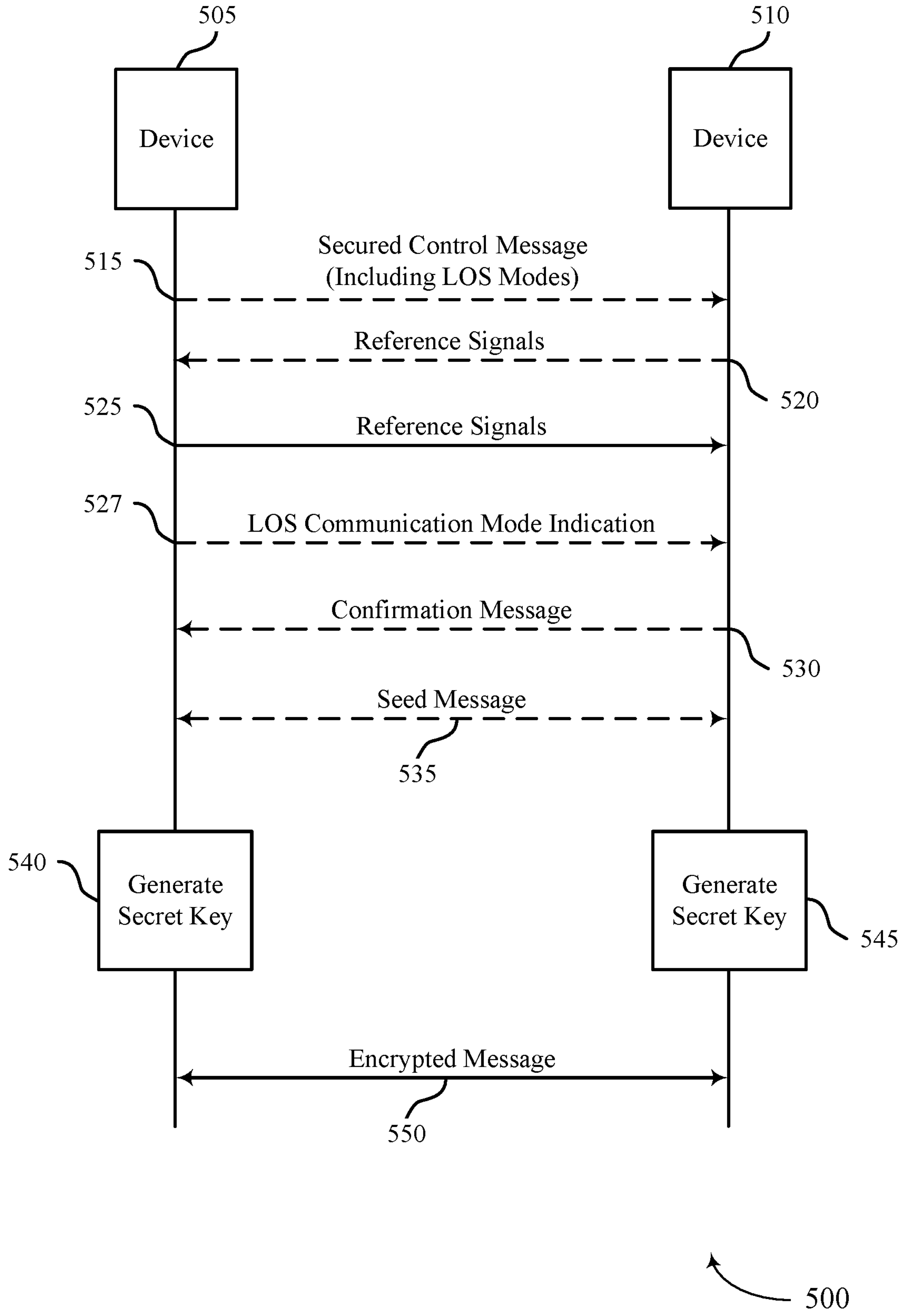
FIG. 5 illustrates an example of a process flow in a system that supports secret key extraction for LOS communications in accordance with aspects of the present disclosure.

FIG. 5 illustrates an example of a process flow 500 in a system that supports secret key extraction for LOS communications in accordance with aspects of the present disclosure. In some examples, the process flow 500 may implement or be implemented by aspects of a wireless communications system 100, 200, and 335 as described with reference to FIGS. 1, 2, and 3B, respectively. For example, the process flow 500 may be implemented by a device 505 and a device 510 to support secret key generation based on LOS communication modes.

The device 505 and the device 510 may be examples of communication devices as described with reference to FIGS. 1 through 3B. In the following description of the process flow 500, the operations between the device 505 and the device 510 may be communicated in a different order than the example order shown, or the operations performed by the device 505 and the device 510 may be performed in different orders or at different times. Some operations may also be omitted from the process flow 500, and other operations may be added to the process flow 500. Further, although some operations or signaling may be shown to occur at different times for discussion purposes, these operations may actually occur at the same time.

At 515, the device 505 may transmit a secured control message to the device 510. The secured control message may indicate a configuration of a first set of reference signals (e.g., a time and frequency configuration) that the device 505 may transmit to the device 510. The secured control message may also indicate a quantity of LOS communication modes included in a first set of LOS communication modes that the device 505 may use to transmit the first set of reference signals. The quantity of the first set of reference signals and the quantity of the first set of LOS communication modes may be a same quantity. In some examples, the secured control message may be an RRC message that is L3 secured. In some examples, the secured control message may configure multiple sets of reference signals.

At 520, the device 510 may train the device 505 with a second set of reference signals. For example, the device 510 may transmit a second set of reference signals to the device 505 using a second set of LOS communication modes. The device 505 may measure a channel metric associated with each reference signal. For example, the device 505 may measure an RSRP or an SINR of each reference signal of the second set of reference signals, among other channel metrics.

In some examples, the device 505 may receive the set of reference signals in accordance with a set of LOS communications modes, where the set of LOS communication modes may be associated with one or more azimuth modes, one or more radial modes, one or more polarization modes, one or more LOS-MIMO modes, or a combination thereof.

In some cases, the device 505 may receive the set of reference signals using a set of antenna circles that each include a number of antenna elements. In such cases, the set of LOS communication modes may include a set of azimuth modes. In some examples, each azimuth mode of the set of azimuth modes may be associated with a set of radial modes. For instance, the set of radial modes may include at least a first radial mode associated with a first beamforming vector and a second radial mode associated with a second beamforming vector, where each of the first beamforming vector and the second beamforming vector may be orthogonal. Additionally or alternatively, each radial mode of the set of radial modes may be associated with at least a first polarization mode and a second polarization mode orthogonal to the first polarization mode. For example the polarization modes may be linear polarization modes, circular polarization modes, elliptical polarization modes, or any combination thereof.

In some case, the device 505 may receive the set of reference signals using a two-dimensional antenna array including a number of antenna elements. In such cases, the set of LOS communication modes include a set of LOS-MIMO modes. Additionally or alternatively, each LOS-MIMO mode of the set of LOS-MIMO modes may be associated with at least a first polarization mode and a second polarization mode orthogonal to the first polarization mode. For example the polarization modes may be linear polarization modes, circular polarization modes, elliptical polarization modes, or any combination thereof.

At 525, the device 505 may transmit the first set of reference signals to the device 510 using the first set of LOS communication modes (e.g., an in accordance with the configuration of the first set of reference signals). In some examples, the device 505 may randomly select the first set of LOS communication modes from a set of LOS communication modes that are available to the device 505 and the device 510.

In some examples, the device 505 may select the first set of reference signals from the second set of reference signals. For example, the second set of reference signals may include the first set of reference signals, and the device 505 may select the first set of reference signals from the second set of reference signals based on the respectively measured channel metrics (e.g., select reference signals having relatively higher RSRP and SINR measurements). In some examples, the device 505 may select the first set of reference signals from the multiple sets of reference signals configured by the secured control message.

The device 510 may receive the first set of reference signals in accordance with the set of LOS communication modes and determine the first set of LOS communication modes based on the reception of the first set of reference signals. In some examples, the device 505 may select and the device 510 may determine the first set of LOS communication modes based on an NLOS portion of a channel estimate for a channel between the device 505 and the device 510. For example, the device 505 may transmit the first set of reference signals to the device 510 over the channel (e.g., a physical channel such as a PUCCH or a PDCCH). The device 505 and the device 510 may estimate the channel (e.g., based on the first set of reference signals or another set of reference signals) to determine the NLOS portion of the channel (e.g., using a Rayleigh channel estimation model, a cluster delay line channel estimation model, etc.). In some examples, device 505 and the device 510 may quantize the NLOS portion of the channel estimate and map the quantized NLOS portion to the first set of LOS communication modes. In some other examples, the device 505 and the device 510 may create a bitmap from the quantized NLOS portion that indicates the first set of LOS communication modes.

At 527, the device 505 may transmit to the device 510, a message that may be indicative of the set of LOS communication modes used to receive the set of reference signals. In some examples, the one or more LOC communication modes may be selected on a pseudorandom mapping between the set of LOS communication modes and the one or more LOS communication modes. In such examples, the device 505 may receive from the device 510, an RRC signal indicating the pseudorandom mapping between the set of LOS communication modes and the one or more LOS communication modes.

At 530, the device 510 may transmit a confirmation message to the device 505. The confirmation message may indicate the LOS communication modes that the device 510 detected from the first set of reference signals. In some examples, the confirmation message may include one or more reference signals that are transmitted using one or more LOS communication modes. The one or more LOS communication modes may be selected based on the detected LOS communication modes and may thus indicate which LOS communication modes were detected by the device 510.

At 535, the device 505 and the device 510 may communicate a seed message. For example, in response to transmitting the confirmation message, the device 505 and the device 510 may communicate the seed message. The seed message may indicate one or more key seeds the device 505 and the device 510 may use to generate a secret key. In some examples, the one or more key seeds may be selected from a codebook, such a quadrature amplitude modulation (QAM) codebook, a random codebook, among other types of codebooks). The one or more key seeds may be communicated using one or more LOS communication modes of the first set of LOS communication modes. Additionally, the device 505 and the device 510 may communicate artificial noise using remaining communication LOS modes of the first set of LOS communication modes that are not used to communicate the one or more key seeds.

At 540, the device 505 may use information associated with the first set of LOS communication modes (e.g., indexes of the first set of LOS communication modes, a key obtained using the indexes) to generate the secret key. For example, the device 505 may compute the secret key by inputting the information associated with the first set of LOS communication modes into a key derivation function that outputs the secret key.

At 545, the device 510 may use the information associated with the first set of LOS communication modes to generate the secret key. For example, the device 510 may compute the secret key by inputting the information associated with the first set of LOS communication modes into a key derivation function that outputs the secret key.

In some examples, the device 505 and 510 may generate the secret key using azimuth modes. For example, the device 505 and 510 may generate the secret key based on at least one azimuth mode of the set of azimuth modes and the respective DFT vector. Additionally or alternatively, the device 505 and 510 may generate the secret key using radial modes. For example, the device 505 and 510 may generate the secret key based on at least one radial mode of the set of radial modes. Additionally or alternatively, the device 505 and 510 may generate the secret key using polarization modes. For example, the device 505 and 510 may generate the secret key based on the first polarization mode, the second polarization mode, or both.

In examples where the device 505 and 510 are associated with a two-dimensional antenna array, the device 505 and 510 may decompose the associated LOS-MIMO modes into components. For example, the device 505 and 510 may decompose LOS-MIMO mode of the set of LOS-MIMO modes into a first set of components associated with a first directional dimension and a second set of components associated with a second directional dimension different than the first directional dimension. As such, the device 505 and 510 may generate a first channel matrix associated with the first set of components and a second channel matrix associated with the second set of components. In some examples, the device 505 and 510 may generate the secret key used for encrypting the one or more messages based on the first channel matrix and the second channel matrix.

At 550, the device 505 and the device 510 may communicate an encrypted message based on generating the secret key. For example, the device 505 or the device 510 may encrypt one or more messages with the secret key and transmit the encrypted one or more messages to the device 510 or the device 505. The device 510 or the device 505 may decrypt the one or more messages with the secret key in order to decode the information carried by the one or more encrypted messages.

Figure 6:
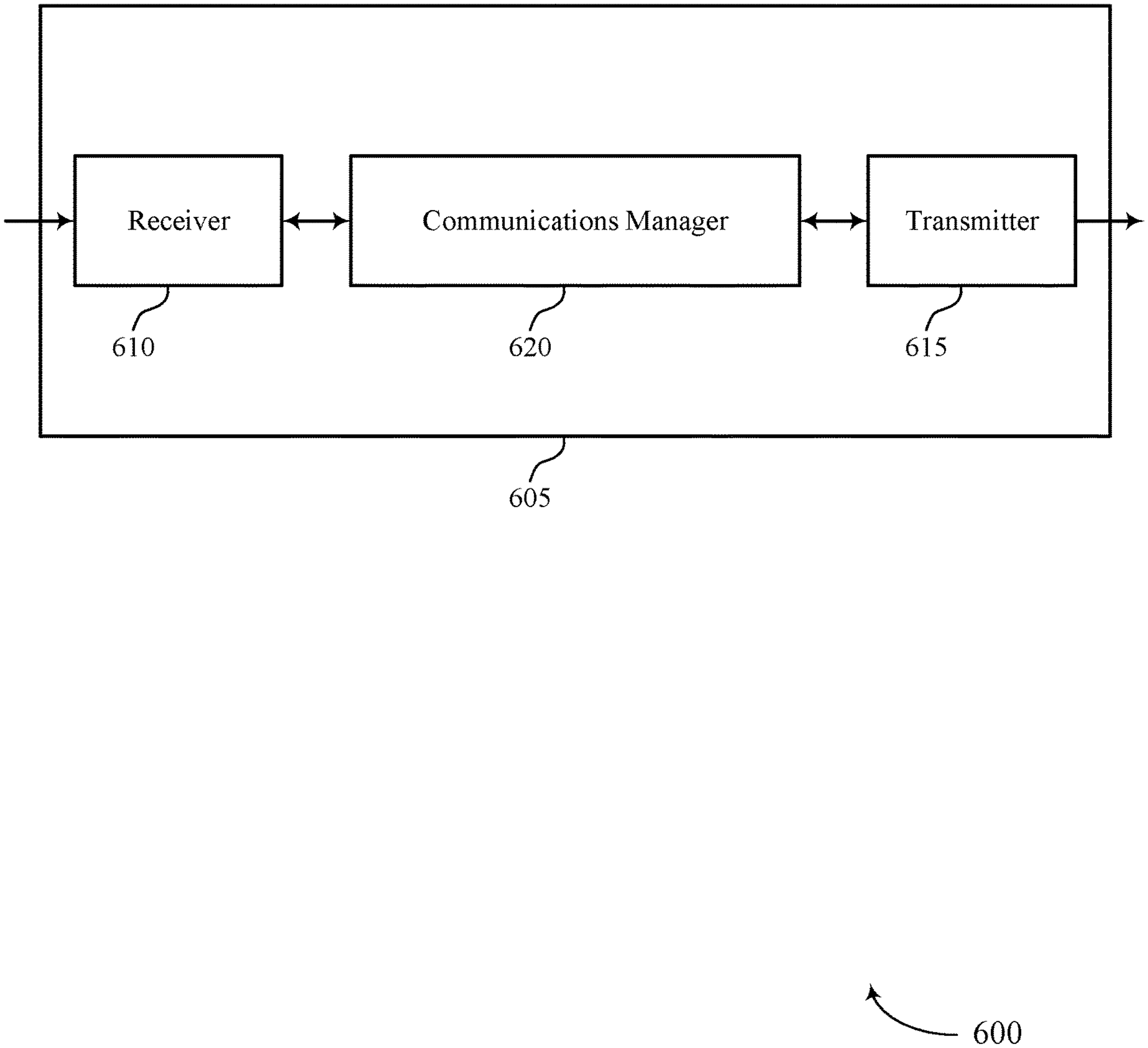
FIGS. 6 and 7 show block diagrams of devices that support secret key extraction for LOS communications in accordance with aspects of the present disclosure.

FIG. 6 shows a block diagram 600 of a device 605 that supports secret key extraction for LOS communications in accordance with aspects of the present disclosure. The device 605 may be an example of aspects of a communication device as described herein (e.g., a UE 115, a base station 105, an IAB node, a device 210, a device 510). The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to secret key extraction for LOS communications). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to secret key extraction for LOS communications). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of secret key extraction for LOS communications as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at a first device in accordance with examples as disclosed herein. For example, the communications manager 620 may be configured as or otherwise support a means for receiving, from a second device, a set of reference signals in accordance with a set of LOS communication modes. The communications manager 620 may be configured as or otherwise support a means for generating a secret key used for encrypting one or more messages communicated between the first device and the second device, the secret key being generated based on the set of LOS communication modes. The communications manager 620 may be configured as or otherwise support a means for communicating signaling with the second device using LOS communications, the signaling including the one or more messages that are encrypted with the secret key.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for reduced processing and more efficient utilization of communication resources, for example, by supporting secret key generation for LOS communications, which may increase communication security and prevent eavesdropping devices from negatively affecting the LOS communications.

Figure 7:
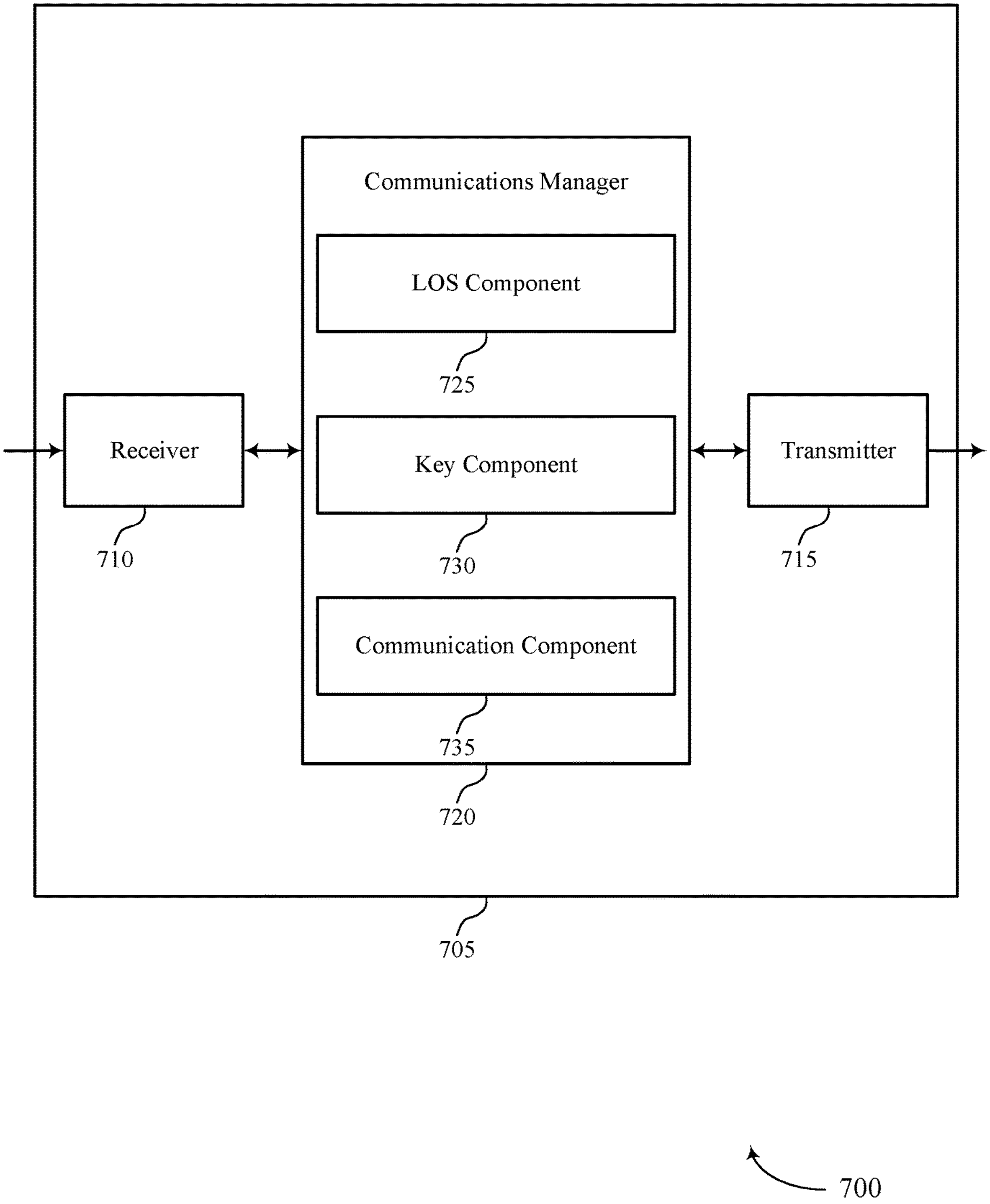

FIG. 7 shows a block diagram 700 of a device 705 that supports secret key extraction for LOS communications in accordance with aspects of the present disclosure. The device 705 may be an example of aspects of a device 605 or a communication device as described herein (e.g., a UE 115, a base station 105, an IAB node, a device 210, a device 510). The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to secret key extraction for LOS communications). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to secret key extraction for LOS communications). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of secret key extraction for LOS communications as described herein. For example, the communications manager 720 may include a LOS component 725, a key component 730, a communication component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at a first device in accordance with examples as disclosed herein. The LOS component 725 may be configured as or otherwise support a means for receiving, from a second device, a set of reference signals in accordance with a set of LOS communication modes. The key component 730 may be configured as or otherwise support a means for generating a secret key used for encrypting one or more messages communicated between the first device and the second device, the secret key being generated based on the set of LOS communication modes. The communication component 735 may be configured as or otherwise support a means for communicating signaling with the second device using LOS communications, the signaling including the one or more messages that are encrypted with the secret key.

Figure 8:
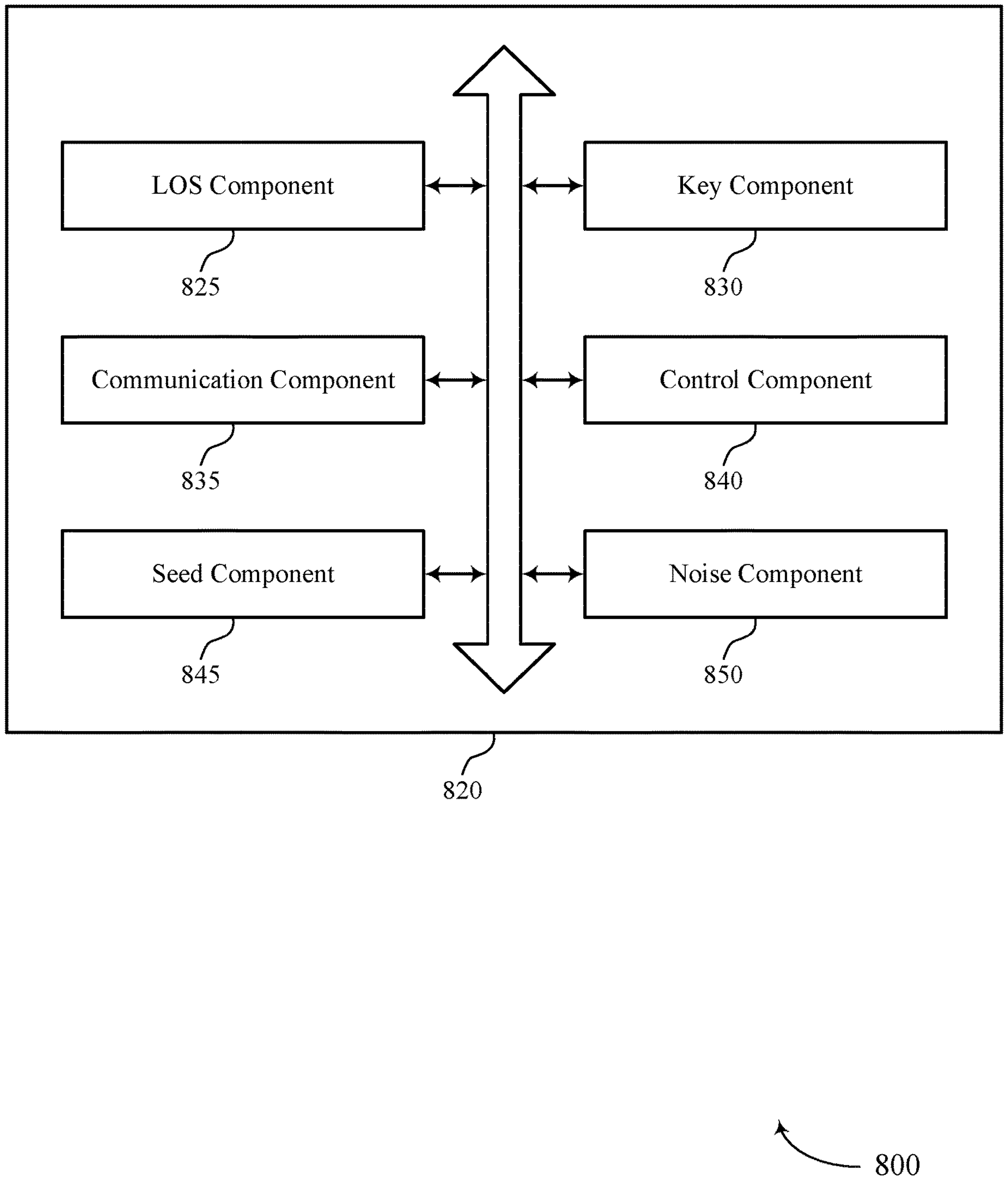
FIG. 8 shows a block diagram of a communications manager that supports secret key extraction for LOS communications in accordance with aspects of the present disclosure.

FIG. 8 shows a block diagram 800 of a communications manager 820 that supports secret key extraction for LOS communications in accordance with aspects of the present disclosure. The communications manager 820 may be an example of aspects of a communications manager 620, a communications manager 720, or both, as described herein. The communications manager 820, or various components thereof, may be an example of means for performing various aspects of secret key extraction for LOS communications as described herein. For example, the communications manager 820 may include a LOS component 825, a key component 830, a communication component 835, a control component 840, a seed component 845, a noise component 850, or any combination thereof. Each of these components may communicate, directly or indirectly, with one another (e.g., via one or more buses).

The communications manager 820 may support wireless communication at a first device in accordance with examples as disclosed herein. The LOS component 825 may be configured as or otherwise support a means for receiving, from a second device, a set of reference signals in accordance with a set of LOS communication modes. The key component 830 may be configured as or otherwise support a means for generating a secret key used for encrypting one or more messages communicated between the first device and the second device, the secret key being generated based on the set of LOS communication modes. The communication component 835 may be configured as or otherwise support a means for communicating signaling with the second device using LOS communications, the signaling including the one or more messages that are encrypted with the secret key.

In some examples, the control component 840 may be configured as or otherwise support a means for receiving, from the second device, a secured control message that indicates a configuration of the set of reference signals and a quantity of LOS communication modes included in the set of LOS communication modes, where the set of reference signals are received in accordance with the set of LOS communication modes based on the secured control message.

In some examples, the control component 840 may be configured as or otherwise support a means for receiving, from the second device, a control message that updates the configuration of the set of reference signals and the quantity of LOS communication modes, where the set of reference signals are received in accordance with the set of LOS communication modes based on the control message.

In some examples, to support generating the secret key, the key component 830 may be configured as or otherwise support a means for computing the secret key based on information associated with the set of LOS communication modes, where the secret key is computed using a key derivation function that outputs the secret key.

In some examples, the information associated with the set of LOS communication modes includes indexes corresponding to respective LOS communication modes included in the set of LOS communication modes or a key obtained using the indexes corresponding to the respective LOS communication modes.

In some examples, the LOS component 825 may be configured as or otherwise support a means for receiving, from the second device, a second set of reference signals in accordance with the set of LOS communication modes, where a first number of the set of LOS communication modes for receiving the second set of reference signals is different from a second number of the set of LOS communication modes for receiving the set of reference signals, the secret key being generated based on the first number and the second number of the set of LOS communication modes.

In some examples, the set of LOS communication modes are based on an NLOS portion of a channel estimate for a channel between the first device and the second device.

In some examples, the NLOS portion of the channel estimate is quantized and mapped to respective modes of the set of LOS communication modes. In some examples, the set of LOS communication modes are based on the quantized and mapped NLOS portion of the channel estimate.

In some examples, the LOS component 825 may be configured as or otherwise support a means for transmitting, to the second device, a second set of reference signals in accordance with a second set of LOS communication modes including the set of LOS communication modes, where the set of LOS communication modes is based on a respective channel measurement associated with each reference signal of the second set of reference signals.

In some examples, the LOS component 825 may be configured as or otherwise support a means for transmitting, to the second device, a message that is indicative of the set of LOS communication modes used to receive the set of reference signals.

In some examples, to support transmitting the message that is indicative of the set of LOS communication modes, the LOS component 825 may be configured as or otherwise support a means for transmitting one or more reference signals using one or more LOS communication modes of the set of LOS communication modes, the one or more LOS communication modes selected based on a mapping between the set of LOS communication modes and the one or more LOS communication modes.

In some examples, the seed component 845 may be configured as or otherwise support a means for communicating, with the second device and using a LOS communication mode of the set of LOS communication modes, a message indicating a seed for input into a key derivation function, where the secret key is generated using the indicated seed.

In some examples, the noise component 850 may be configured as or otherwise support a means for communicating, with the second device, artificial noise using one or more LOS communication modes of the set of LOS communication modes that are unused for communicating the message indicating the seed.

In some examples, the set of LOS communication modes is based on a distance between the first device and the second device.

In some examples, the set of LOS communication modes includes a set of orbital angular momentum communication modes.

Figure 9:
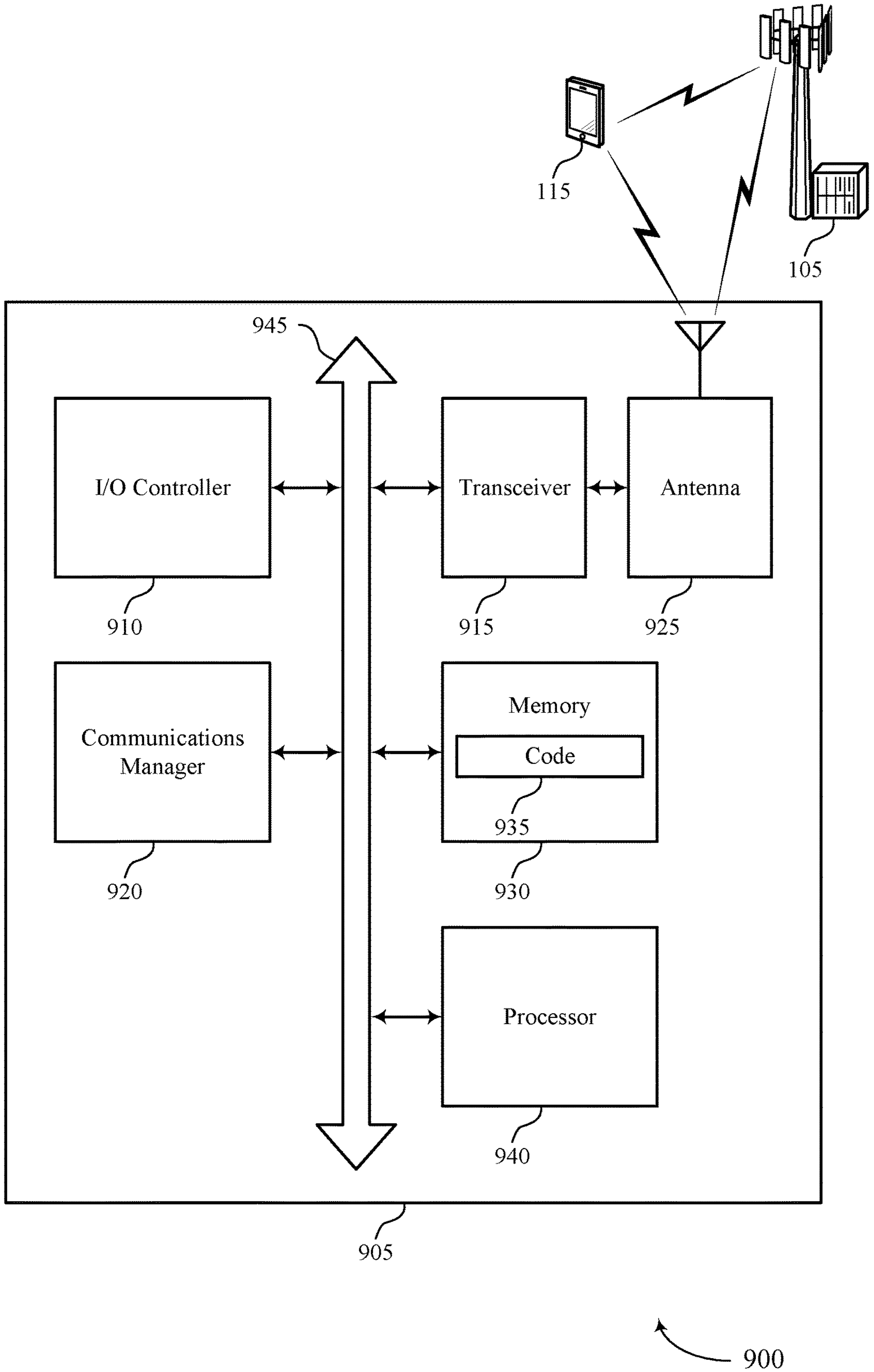
FIG. 9 shows a diagram of a system including a device that supports secret key extraction for LOS communications in accordance with aspects of the present disclosure.

FIG. 9 shows a diagram of a system 900 including a device 905 that supports secret key extraction for LOS communications in accordance with aspects of the present disclosure. The device 905 may be an example of or include the components of a device 605, a device 705, or communication device as described herein (e.g., a UE 115, a base station 105, an IAB node, a device 210, a device 510). The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting secret key extraction for LOS communications). For example, the device 905 or a component of the device 905 may include a processor 940 and memory 930 coupled to the processor 940, the processor 940 and memory 930 configured to perform various functions described herein.

The communications manager 920 may support wireless communication at a first device in accordance with examples as disclosed herein. For example, the communications manager 920 may be configured as or otherwise support a means for receiving, from a second device, a set of reference signals in accordance with a set of LOS communication modes. The communications manager 920 may be configured as or otherwise support a means for generating a secret key used for encrypting one or more messages communicated between the first device and the second device, the secret key being generated based on the set of LOS communication modes. The communications manager 920 may be configured as or otherwise support a means for communicating signaling with the second device using LOS communications, the signaling including the one or more messages that are encrypted with the secret key.

By including or configuring the communications manager 920 in accordance with examples as described herein, the device 905 may support techniques for increased communication security, eavesdropping prevention, increased reliability, increased data rates, reduced latency, reduced power consumption, more efficient utilization of communication resources, improved coordination between devices, and longer battery life, among other benefits.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of secret key extraction for LOS communications as described herein, or the processor 940 and the memory 930 may be otherwise configured to perform or support such operations.

Figure 10:
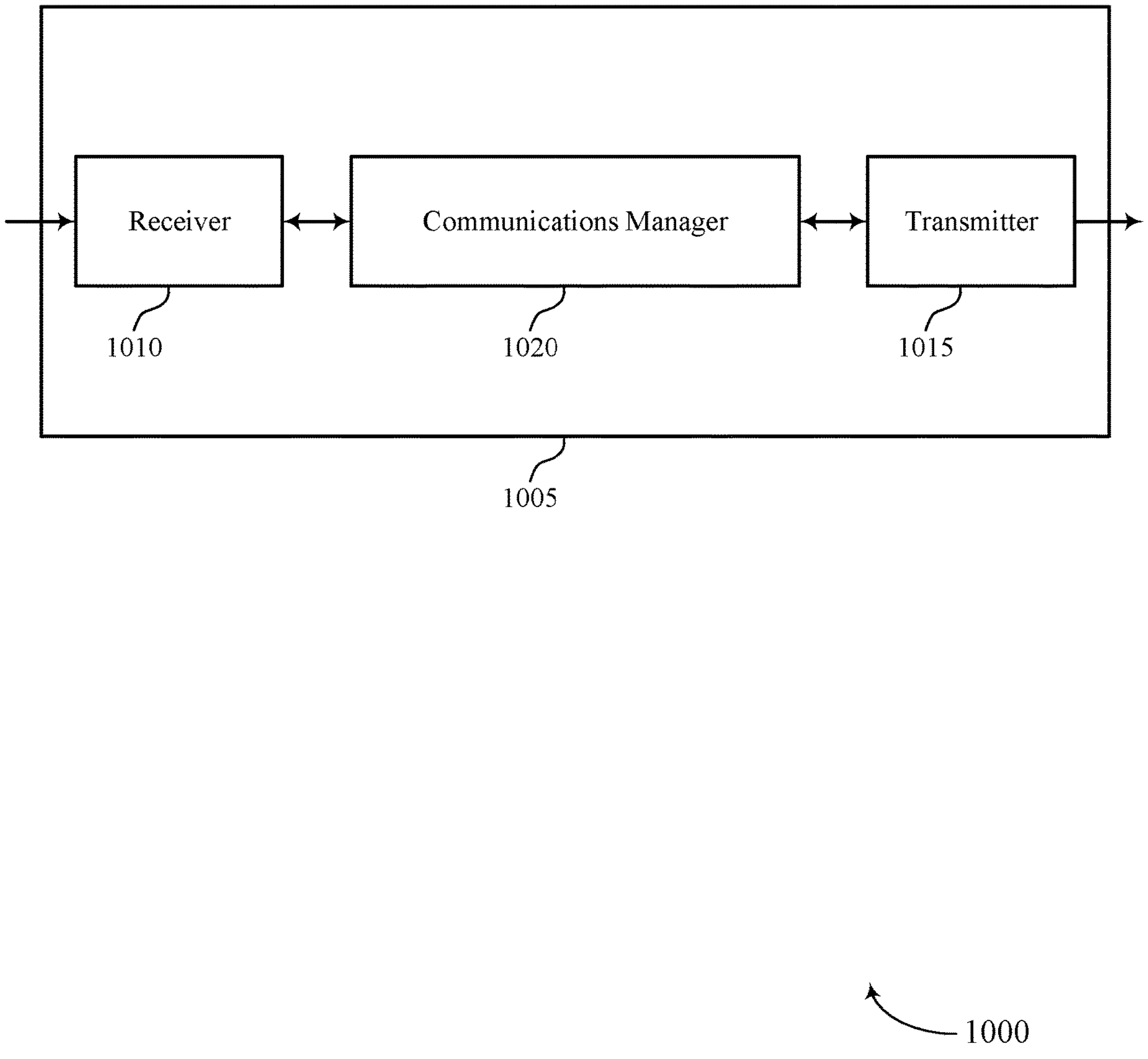
FIGS. 10 and 11 show block diagrams of devices that support secret key extraction for LOS communications in accordance with aspects of the present disclosure.

FIG. 10 shows a block diagram 1000 of a device 1005 that supports secret key extraction for LOS communications in accordance with aspects of the present disclosure. The device 1005 may be an example of aspects of a communication device as described herein (e.g., a base station 105, a UE 115, an IAB node, a device 205, a device 505). The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to secret key extraction for LOS communications). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to secret key extraction for LOS communications). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of secret key extraction for LOS communications as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at a second device in accordance with examples as disclosed herein. For example, the communications manager 1020 may be configured as or otherwise support a means for transmitting, to a first device, a set of reference signals using a set of LOS communication modes. The communications manager 1020 may be configured as or otherwise support a means for generating a secret key used for encrypting one or more messages communicated between the second device and the first device, the secret key being generated based on the set of LOS communication modes. The communications manager 1020 may be configured as or otherwise support a means for communicating signaling with the first device using LOS communications, the signaling including the one or more messages that are encrypted with the secret key.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for reduced processing and more efficient utilization of communication resources, for example, by supporting secret key generation for LOS communications, which may increase communication security and prevent eavesdropping devices from negatively affecting the LOS communications.

Figure 11:
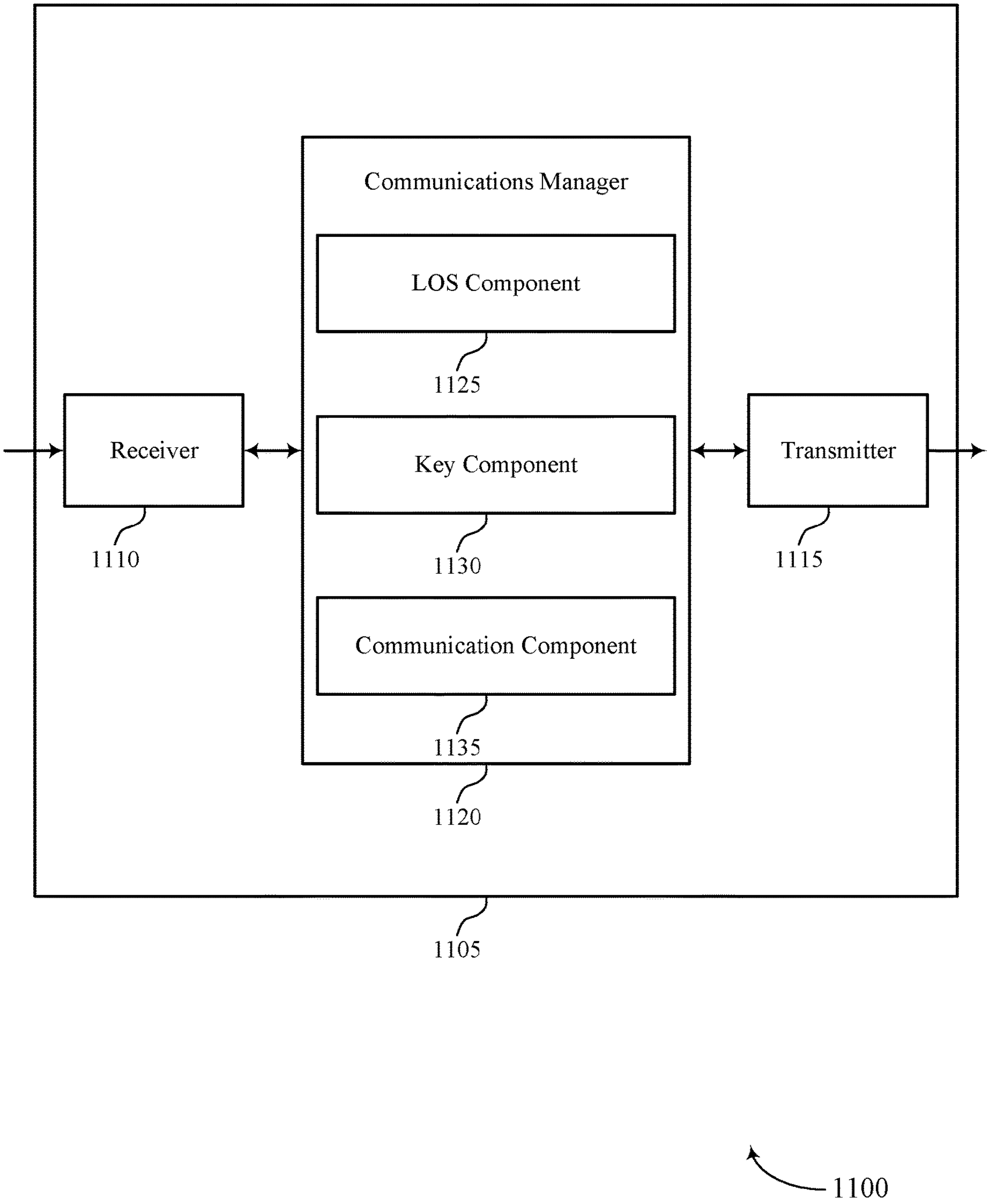

FIG. 11 shows a block diagram 1100 of a device 1105 that supports secret key extraction for LOS communications in accordance with aspects of the present disclosure. The device 1105 may be an example of aspects of a device 1005 or a communication device as described herein (e.g., a base station 105, a UE 115, an IAB node, a device 205, a device 505). The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to secret key extraction for LOS communications). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to secret key extraction for LOS communications). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of secret key extraction for LOS communications as described herein. For example, the communications manager 1120 may include a LOS component 1125, a key component 1130, a communication component 1135, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a second device in accordance with examples as disclosed herein. The LOS component 1125 may be configured as or otherwise support a means for transmitting, to a first device, a set of reference signals using a set of LOS communication modes. The key component 1130 may be configured as or otherwise support a means for generating a secret key used for encrypting one or more messages communicated between the second device and the first device, the secret key being generated based on the set of LOS communication modes. The communication component 1135 may be configured as or otherwise support a means for communicating signaling with the first device using LOS communications, the signaling including the one or more messages that are encrypted with the secret key.

Figure 12:
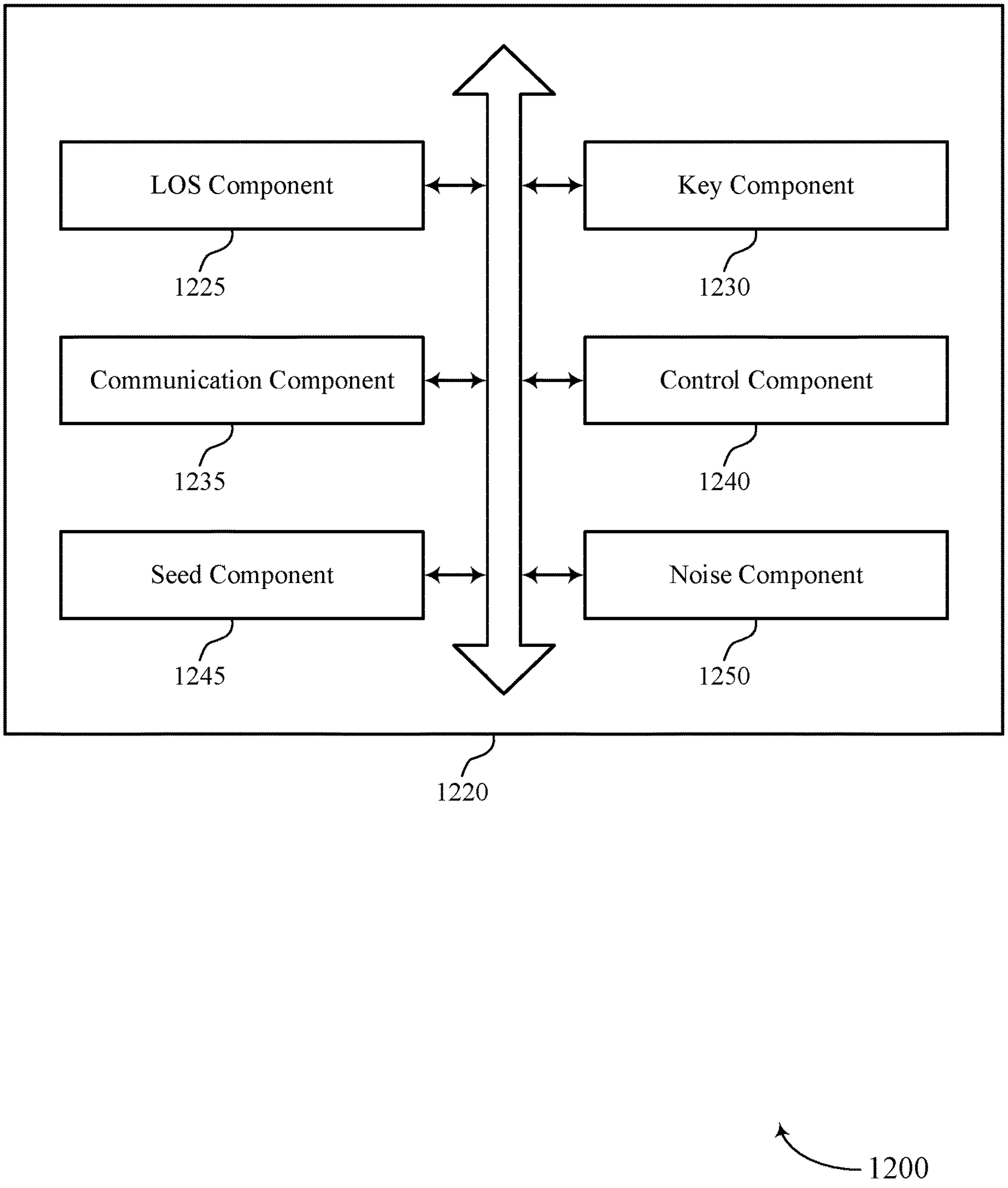
FIG. 12 shows a block diagram of a communications manager that supports secret key extraction for LOS communications in accordance with aspects of the present disclosure.

FIG. 12 shows a block diagram 1200 of a communications manager 1220 that supports secret key extraction for LOS communications in accordance with aspects of the present disclosure. The communications manager 1220 may be an example of aspects of a communications manager 1020, a communications manager 1020, or both, as described herein. The communications manager 1220, or various components thereof, may be an example of means for performing various aspects of secret key extraction for LOS communications as described herein. For example, the communications manager 1220 may include a LOS component 1225, a key component 1230, a communication component 1235, a control component 1240, a seed component 1245, a noise component 1250, or any combination thereof. Each of these components may communicate, directly or indirectly, with one another (e.g., via one or more buses).

The communications manager 1220 may support wireless communication at a second device in accordance with examples as disclosed herein. The LOS component 1225 may be configured as or otherwise support a means for transmitting, to a first device, a set of reference signals using a set of LOS communication modes. The key component 1230 may be configured as or otherwise support a means for generating a secret key used for encrypting one or more messages communicated between the second device and the first device, the secret key being generated based on the set of LOS communication modes. The communication component 1235 may be configured as or otherwise support a means for communicating signaling with the first device using LOS communications, the signaling including the one or more messages that are encrypted with the secret key.

In some examples, the control component 1240 may be configured as or otherwise support a means for transmitting, to the first device, a secured control message that indicates a configuration of the set of reference signals and a quantity of LOS communication modes included in the set of LOS communication modes, where the set of reference signals are transmitted using the set of LOS communication modes based on the secured control message.

In some examples, the control component 1240 may be configured as or otherwise support a means for transmitting, to the first device, a control message that updates the configuration of the set of reference signals and the quantity of LOS communication modes, where the set of reference signals are transmitted using the set of LOS communication modes based on the control message.

In some examples, to support generating the secret key, the key component 1230 may be configured as or otherwise support a means for computing the secret key based on information associated with the set of LOS communication modes, where the secret key is computed using a key derivation function that outputs the secret key.

In some examples, the information associated with the set of LOS communication modes includes indexes corresponding to respective LOS communication modes included in the set of LOS communication modes or a key obtained using the indexes corresponding to the respective LOS communication modes.

In some examples, the LOS component 1225 may be configured as or otherwise support a means for transmitting, to the first device, a second set of reference signals in accordance with the set of LOS communication modes, where a first number of the set of LOS communication modes for receiving the second set of reference signals is different from a second number of the set of LOS communication modes for receiving the set of reference signals, the secret key being generated based on the first number and the second number of the set of LOS communication modes.

In some examples, the set of LOS communication modes are based on an NLOS portion of a channel estimate for a channel between the first device and the second device.

In some examples, the NLOS portion of the channel estimate is quantized and mapped to respective modes of the set of LOS communication modes. In some examples, the set of LOS communication modes are based on the quantized and mapped NLOS portion of the channel estimate.

In some examples, the LOS component 1225 may be configured as or otherwise support a means for receiving, from the first device, a second set of reference signals in accordance with a second set of LOS communication modes including the set of LOS communication modes. In some examples, the LOS component 1225 may be configured as or otherwise support a means for selecting the set of LOS communication modes from the second set of LOS communication modes for transmitting the set of reference signals based on a respective channel measurement associated with each reference signal of the second set of reference signals.

In some examples, the LOS component 1225 may be configured as or otherwise support a means for receiving, from the first device, a message that is indicative of the set of LOS communication modes used to receive the set of reference signals.

In some examples, to support receiving the message that is indicative of the set of LOS communication modes, the LOS component 1225 may be configured as or otherwise support a means for receiving one or more reference signals using one or more LOS communication modes of the set of LOS communication modes, the one or more LOS communication modes selected based on a mapping between the set of LOS communication modes and the one or more LOS communication modes.

In some examples, the seed component 1245 may be configured as or otherwise support a means for communicating, with the second device and in accordance with a LOS communication mode of the set of LOS communication modes, a message indicating a seed for input into a key derivation function, where the secret key is generated using the indicated seed.

In some examples, the noise component 1250 may be configured as or otherwise support a means for communicating, with the first device, artificial noise using one or more LOS communication modes of the set of LOS communication modes that are unused in communicating the message indicating the seed.

In some examples, the set of LOS communication modes is based on a distance between the first device and the second device.

In some examples, the set of LOS communication modes includes a set of orbital angular momentum communication modes.

Figure 13:
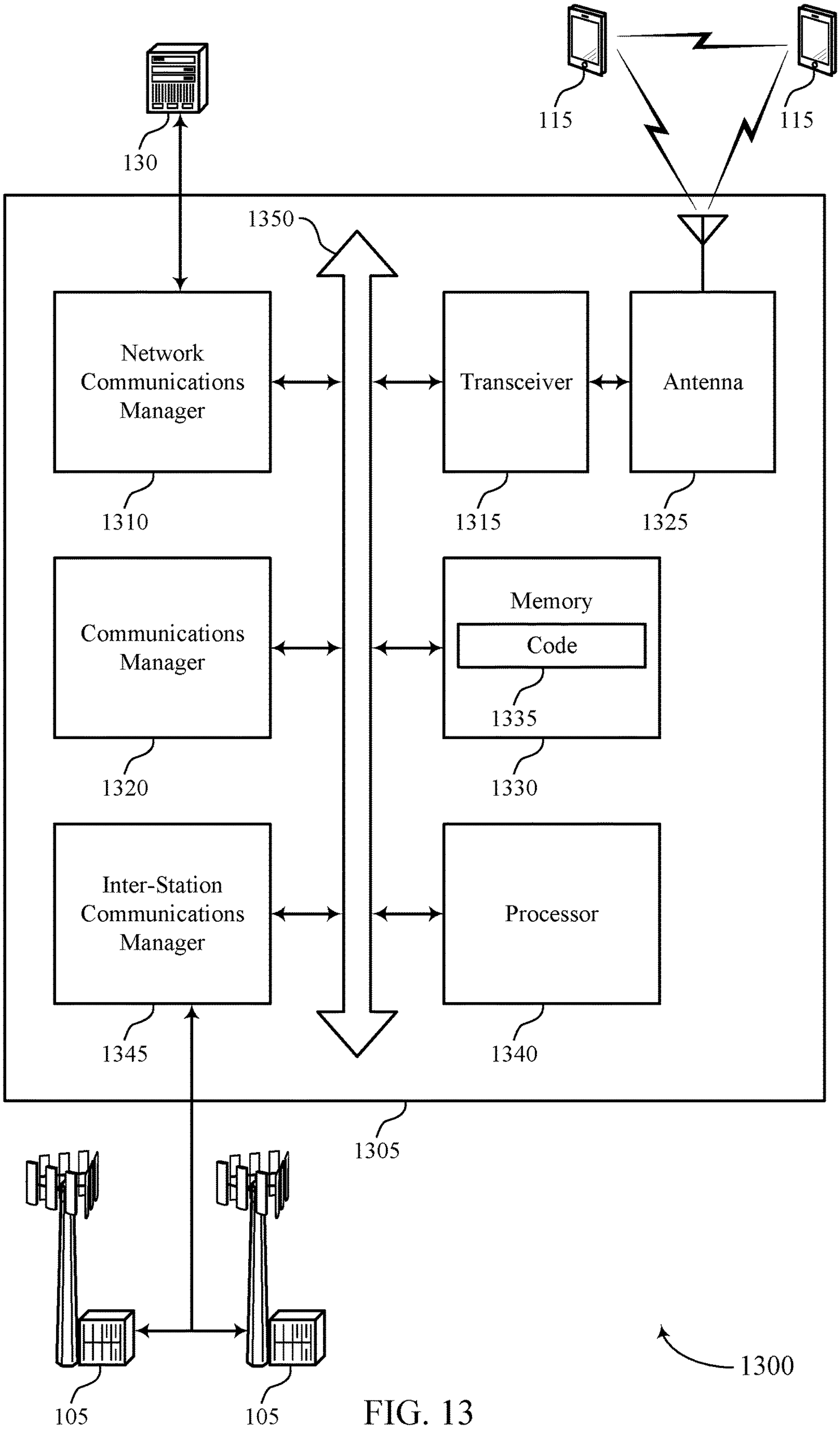
FIG. 13 shows a diagram of a system including a device that supports secret key extraction for LOS communications in accordance with aspects of the present disclosure.

FIG. 13 shows a diagram of a system 1300 including a device 1305 that supports secret key extraction for LOS communications in accordance with aspects of the present disclosure. The device 1305 may be an example of or include the components of a device 1005, a device 1005, or a communication device as described herein (e.g., a base station 105, a UE 115, an IAB node, a device 205, a device 505). The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1015, a receiver 1010, a receiver 1010, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting secret key extraction for LOS communications). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at a second device in accordance with examples as disclosed herein. For example, the communications manager 1320 may be configured as or otherwise support a means for transmitting, to a first device, a set of reference signals using a set of LOS communication modes. The communications manager 1320 may be configured as or otherwise support a means for generating a secret key used for encrypting one or more messages communicated between the second device and the first device, the secret key being generated based on the set of LOS communication modes. The communications manager 1320 may be configured as or otherwise support a means for communicating signaling with the first device using LOS communications, the signaling including the one or more messages that are encrypted with the secret key.

By including or configuring the communications manager 1320 in accordance with examples as described herein, the device 1305 may support techniques for may support techniques for increased communication security, eavesdropping prevention, increased reliability, increased data rates, reduced latency, reduced power consumption, more efficient utilization of communication resources, improved coordination between devices, and longer battery life, among other benefits.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of secret key extraction for LOS communications as described herein, or the processor 1340 and the memory 1330 may be otherwise configured to perform or support such operations.

Figure 14:
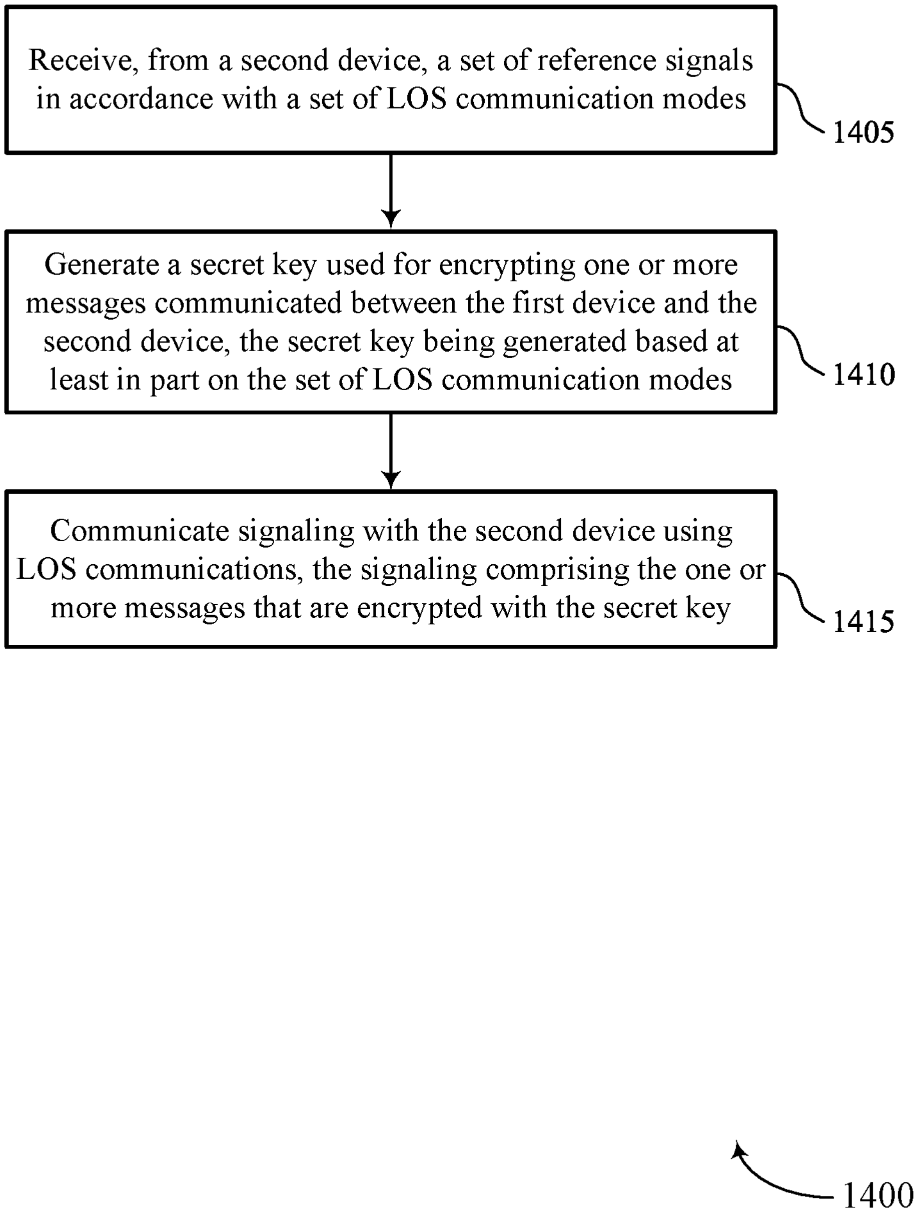
FIGS. 14 through 23 show flowcharts illustrating methods that support secret key extraction for LOS communications in accordance with aspects of the present disclosure.

FIG. 14 shows a flowchart illustrating a method 1400 that supports secret key extraction for LOS communications in accordance with aspects of the present disclosure. The operations of the method 1400 may be implemented by a first device or its components as described herein. For example, the operations of the method 1400 may be performed by a first device (e.g., a UE 115, a base station 105, an IAB node, a device 210, a device 510) as described with reference to FIGS. 1 through 9. In some examples, a first device may execute a set of instructions to control the functional elements of the first device to perform the described functions. Additionally or alternatively, the first device may perform aspects of the described functions using special-purpose hardware.

At 1405, the method may include receiving, from a second device, a set of reference signals in accordance with a set of LOS communication modes. The operations of 1405 may be performed in accordance with examples as disclosed herein. In some examples, aspects of the operations of 1405 may be performed by a LOS component 825 as described with reference to FIG. 8.

At 1410, the method may include generating a secret key used for encrypting one or more messages communicated between the first device and the second device, the secret key being generated based on the set of LOS communication modes. The operations of 1410 may be performed in accordance with examples as disclosed herein. In some examples, aspects of the operations of 1410 may be performed by a key component 830 as described with reference to FIG. 8.

At 1415, the method may include communicating signaling with the second device using LOS communications, the signaling including the one or more messages that are encrypted with the secret key. The operations of 1415 may be performed in accordance with examples as disclosed herein. In some examples, aspects of the operations of 1415 may be performed by a communication component 835 as described with reference to FIG. 8.

Figure 15:
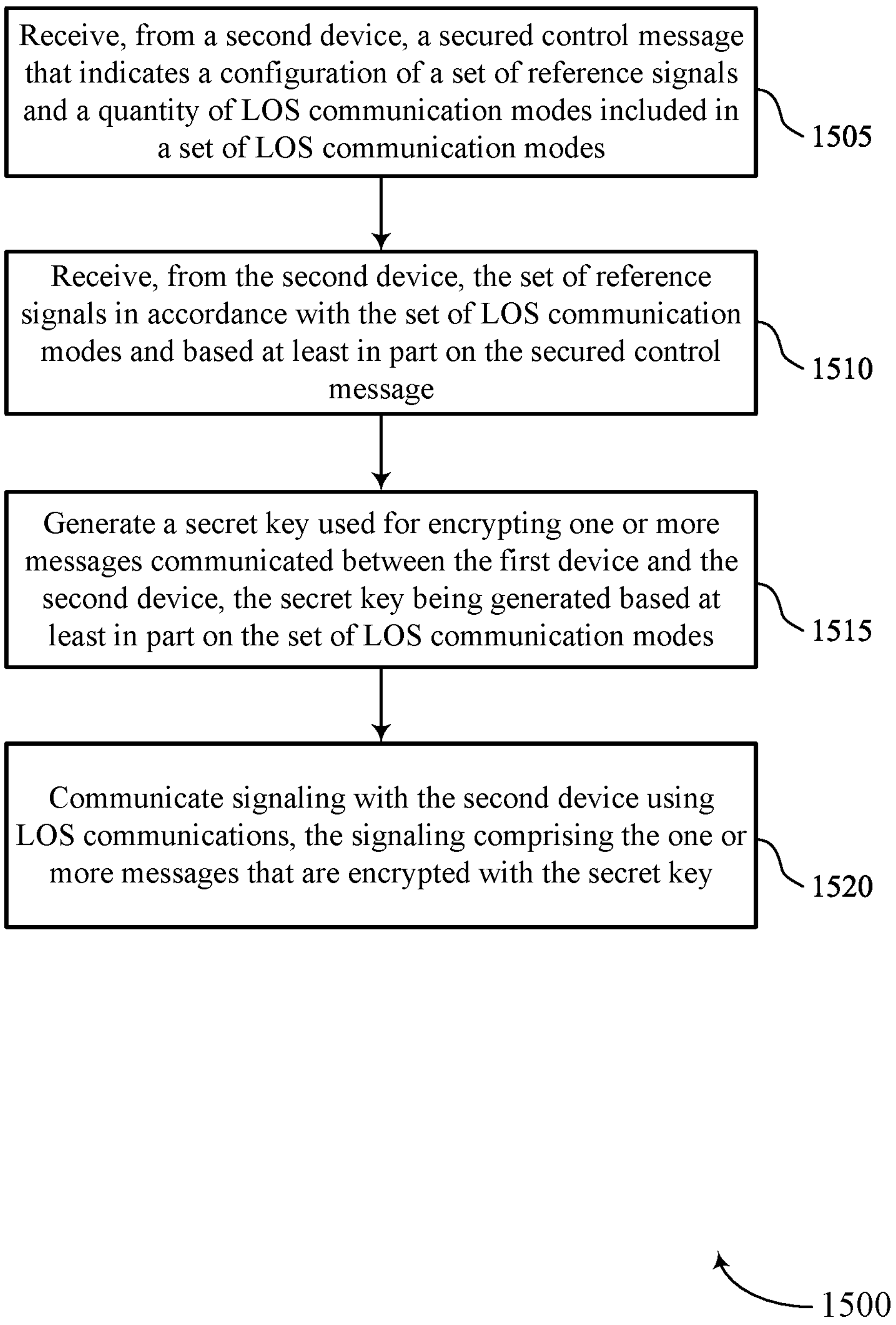

FIG. 15 shows a flowchart illustrating a method 1500 that supports secret key extraction for LOS communications in accordance with aspects of the present disclosure. The operations of the method 1500 may be implemented by a first device or its components as described herein. For example, the operations of the method 1500 may be performed by a first device (e.g., a UE 115, a base station 105, an IAB node, a device 210, a device 510) as described with reference to FIGS. 1 through 9. In some examples, a first device may execute a set of instructions to control the functional elements of the first device to perform the described functions. Additionally or alternatively, the first device may perform aspects of the described functions using special-purpose hardware.

At 1505, the method may include receiving, from a second device, a secured control message that indicates a configuration of a set of reference signals and a quantity of LOS communication modes included in a set of LOS communication modes. The operations of 1505 may be performed in accordance with examples as disclosed herein. In some examples, aspects of the operations of 1505 may be performed by a control component 840 as described with reference to FIG. 8.

At 1510, the method may include receiving, from the second device, the set of reference signals in accordance with a set of LOS communication modes and based on the secured control message. The operations of 1510 may be performed in accordance with examples as disclosed herein. In some examples, aspects of the operations of 1510 may be performed by a LOS component 825 as described with reference to FIG. 8.

At 1515, the method may include generating a secret key used for encrypting one or more messages communicated between the first device and the second device, the secret key being generated based on the set of LOS communication modes. The operations of 1515 may be performed in accordance with examples as disclosed herein. In some examples, aspects of the operations of 1515 may be performed by a key component 830 as described with reference to FIG. 8.

At 1520, the method may include communicating signaling with the second device using LOS communications, the signaling including the one or more messages that are encrypted with the secret key. The operations of 1520 may be performed in accordance with examples as disclosed herein. In some examples, aspects of the operations of 1520 may be performed by a communication component 835 as described with reference to FIG. 8.

Figure 16:
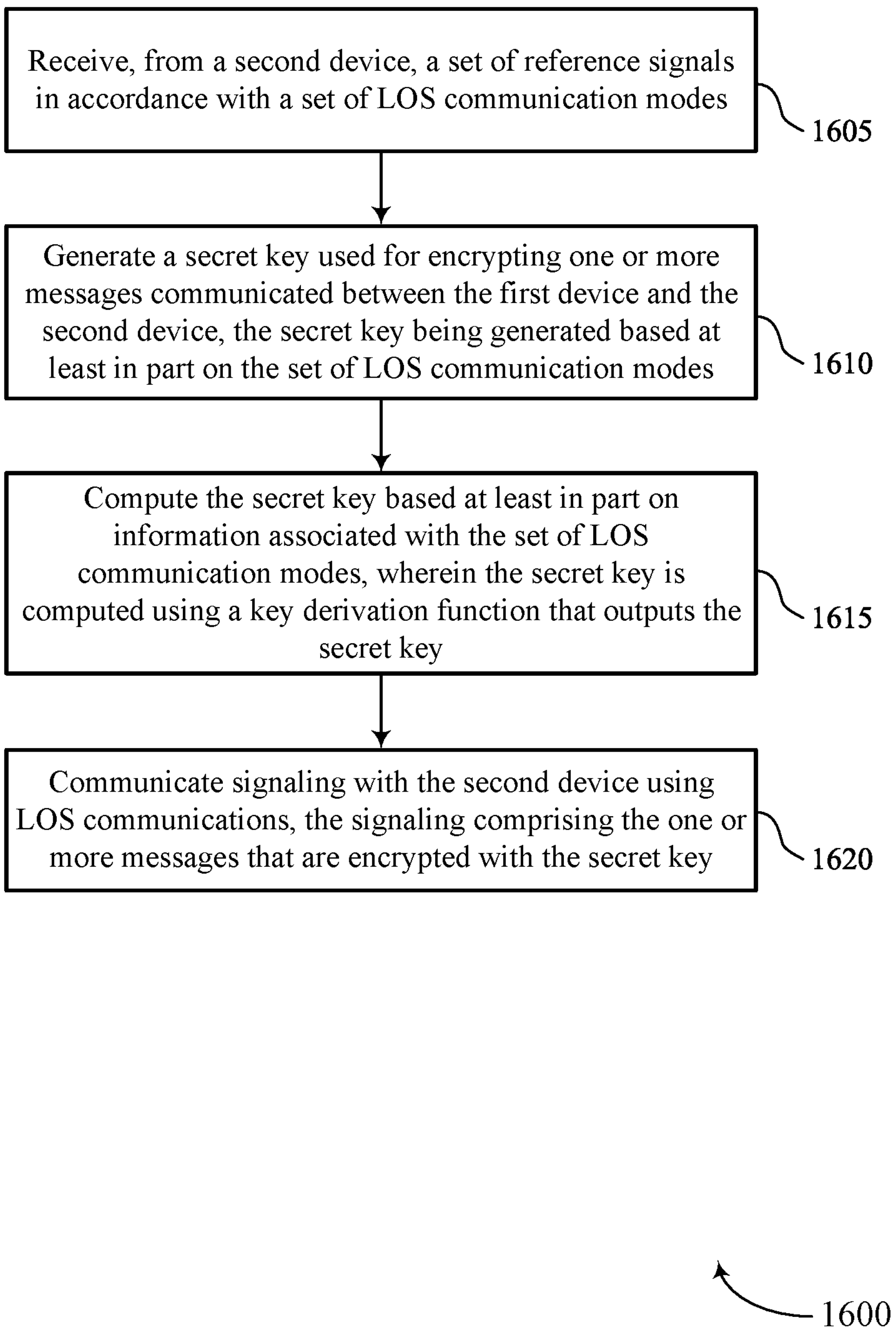

FIG. 16 shows a flowchart illustrating a method 1600 that supports secret key extraction for LOS communications in accordance with aspects of the present disclosure. The operations of the method 1600 may be implemented by a first device or its components as described herein. For example, the operations of the method 1600 may be performed by a first device (e.g., a UE 115, a base station 105, an IAB node, a device 210, a device 510) as described with reference to FIGS. 1 through 9. In some examples, a first device may execute a set of instructions to control the functional elements of the first device to perform the described functions. Additionally or alternatively, the first device may perform aspects of the described functions using special-purpose hardware.

At 1605, the method may include receiving, from a second device, a set of reference signals in accordance with a set of LOS communication modes. The operations of 1605 may be performed in accordance with examples as disclosed herein. In some examples, aspects of the operations of 1605 may be performed by a LOS component 825 as described with reference to FIG. 8.

At 1610, the method may include generating a secret key used for encrypting one or more messages communicated between the first device and the second device, the secret key being generated based on the set of LOS communication modes. The operations of 1610 may be performed in accordance with examples as disclosed herein. In some examples, aspects of the operations of 1610 may be performed by a key component 830 as described with reference to FIG. 8.

At 1615, to generate the secret key, the method may include computing the secret key based on information associated with the set of LOS communication modes, where the secret key is computed using a key derivation function that outputs the secret key. The operations of 1615 may be performed in accordance with examples as disclosed herein. In some examples, aspects of the operations of 1615 may be performed by a key component 830 as described with reference to FIG. 8.

At 1620, the method may include communicating signaling with the second device using LOS communications, the signaling including the one or more messages that are encrypted with the secret key. The operations of 1620 may be performed in accordance with examples as disclosed herein. In some examples, aspects of the operations of 1620 may be performed by a communication component 835 as described with reference to FIG. 8.

Figure 17:
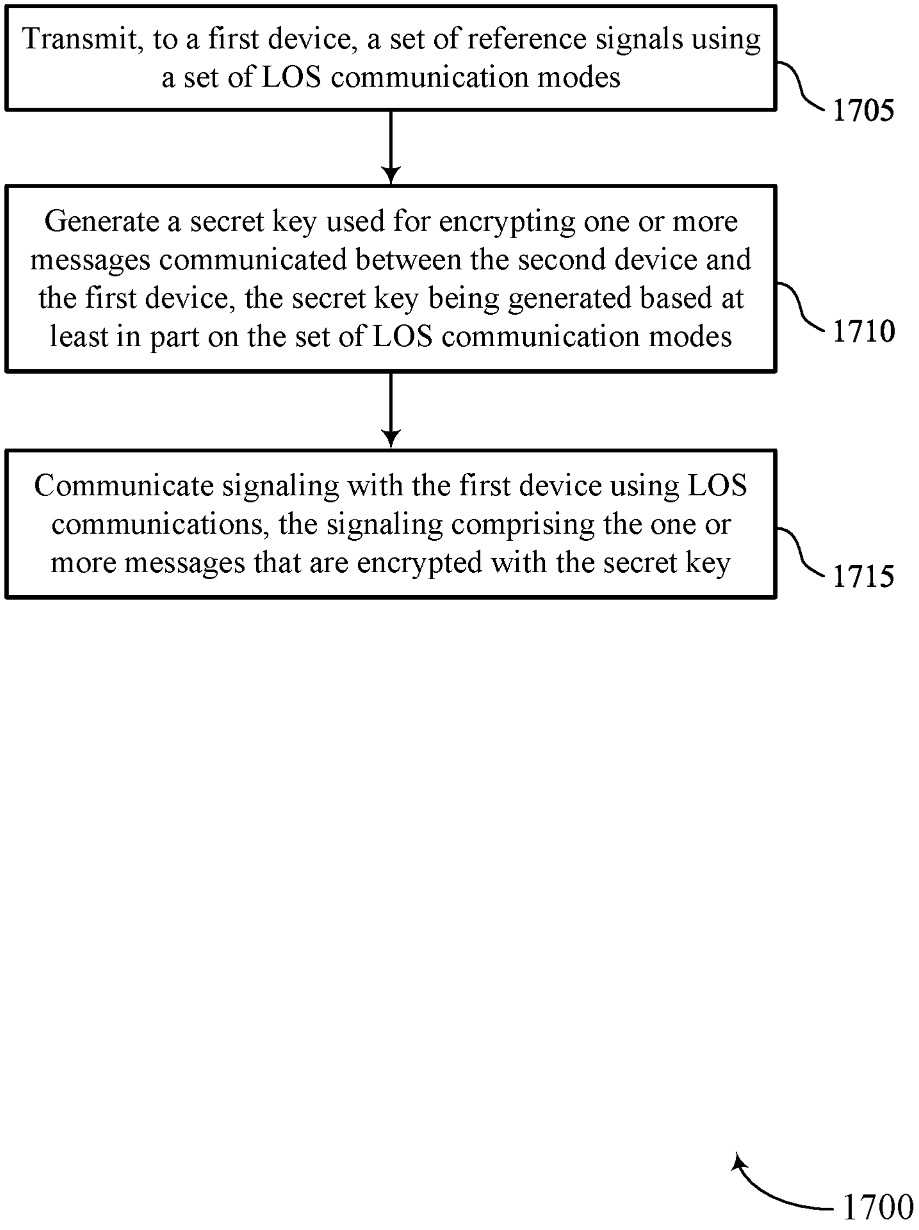

FIG. 17 shows a flowchart illustrating a method 1700 that supports secret key extraction for LOS communications in accordance with aspects of the present disclosure. The operations of the method 1700 may be implemented by a second device or its components as described herein. For example, the operations of the method 1700 may be performed by a second device (e.g., a base station 105, a UE 115, an IAB node, a device 205, a device 505) as described with reference to FIGS. 1 through 5 and 11 through 13. In some examples, a second device may execute a set of instructions to control the functional elements of the second device to perform the described functions. Additionally or alternatively, the second device may perform aspects of the described functions using special-purpose hardware.

At 1705, the method may include transmitting, to a first device, a set of reference signals using a set of LOS communication modes. The operations of 1705 may be performed in accordance with examples as disclosed herein. In some examples, aspects of the operations of 1705 may be performed by a LOS component 1125 as described with reference to FIG. 11.

At 1710, the method may include generating a secret key used for encrypting one or more messages communicated between the second device and the first device, the secret key being generated based on the set of LOS communication modes. The operations of 1710 may be performed in accordance with examples as disclosed herein. In some examples, aspects of the operations of 1710 may be performed by a key component 1130 as described with reference to FIG. 11.

At 1715, the method may include communicating signaling with the first device using LOS communications, the signaling including the one or more messages that are encrypted with the secret key. The operations of 1715 may be performed in accordance with examples as disclosed herein. In some examples, aspects of the operations of 1715 may be performed by a communication component 1135 as described with reference to FIG. 11.

Figure 18:
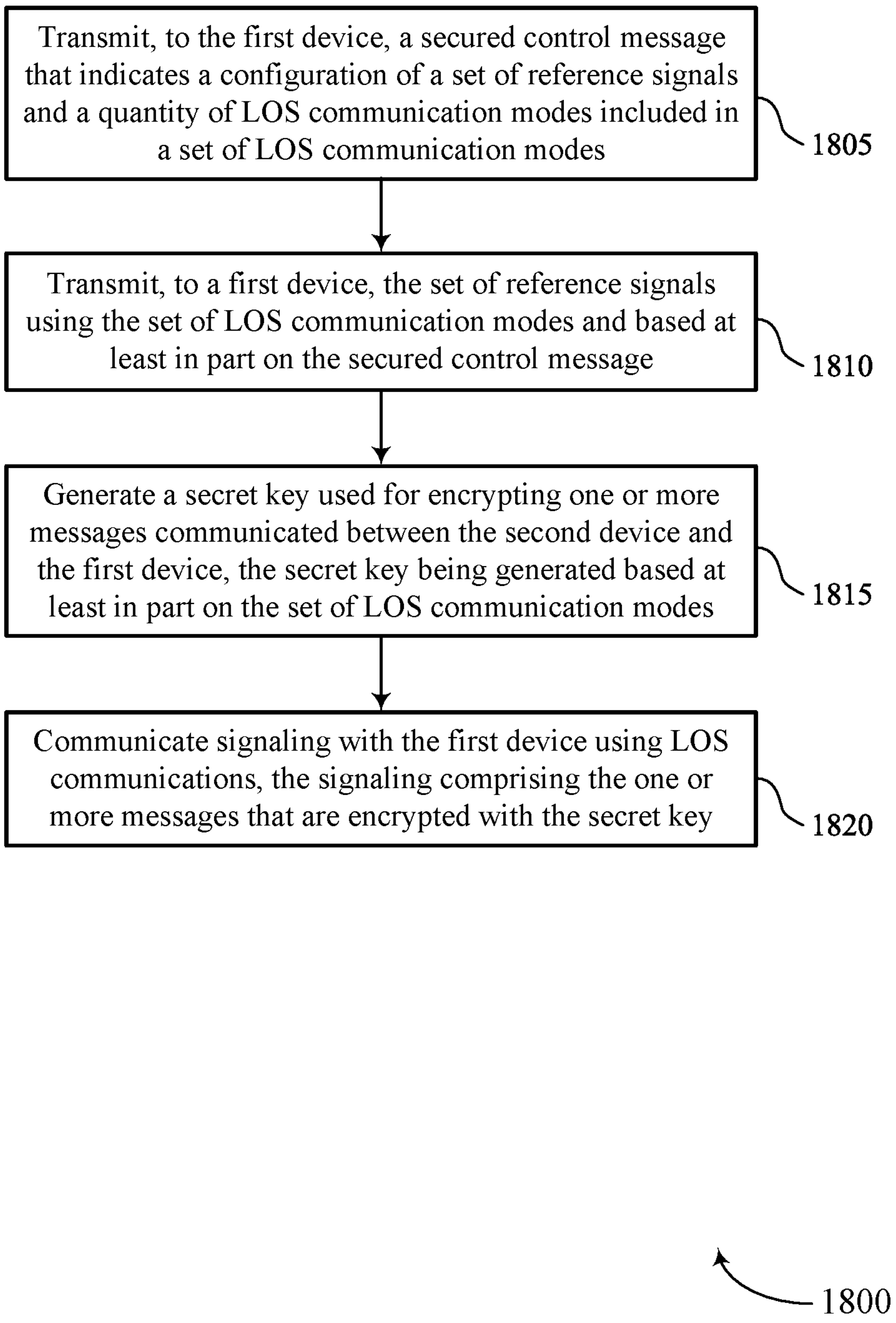

FIG. 18 shows a flowchart illustrating a method 1800 that supports secret key extraction for LOS communications in accordance with aspects of the present disclosure. The operations of the method 1800 may be implemented by a second device or its components as described herein. For example, the operations of the method 1800 may be performed by a second device (e.g., a base station 105, a UE 115, an IAB node, a device 205, a device 505) as described with reference to FIGS. 1 through 5 and 11 through 13. In some examples, a second device may execute a set of instructions to control the functional elements of the second device to perform the described functions. Additionally or alternatively, the second device may perform aspects of the described functions using special-purpose hardware.

At 1805, the method may include transmitting, to a first device, a secured control message that indicates a configuration of a set of reference signals and a quantity of LOS communication modes included in a set of LOS communication modes. The operations of 1805 may be performed in accordance with examples as disclosed herein. In some examples, aspects of the operations of 1805 may be performed by a control component 1240 as described with reference to FIG. 11.

At 1810, the method may include transmitting, to the first device, the set of reference signals using the set of LOS communication modes and based on the secured control message. The operations of 1810 may be performed in accordance with examples as disclosed herein. In some examples, aspects of the operations of 1810 may be performed by a LOS component 1125 as described with reference to FIG. 11.

At 1815, the method may include generating a secret key used for encrypting one or more messages communicated between the second device and the first device, the secret key being generated based on the set of LOS communication modes. The operations of 1815 may be performed in accordance with examples as disclosed herein. In some examples, aspects of the operations of 1815 may be performed by a key component 1130 as described with reference to FIG. 11.

At 1820, the method may include communicating signaling with the first device using LOS communications, the signaling including the one or more messages that are encrypted with the secret key. The operations of 1820 may be performed in accordance with examples as disclosed herein. In some examples, aspects of the operations of 1820 may be performed by a communication component 1135 as described with reference to FIG. 11.

Figure 19:
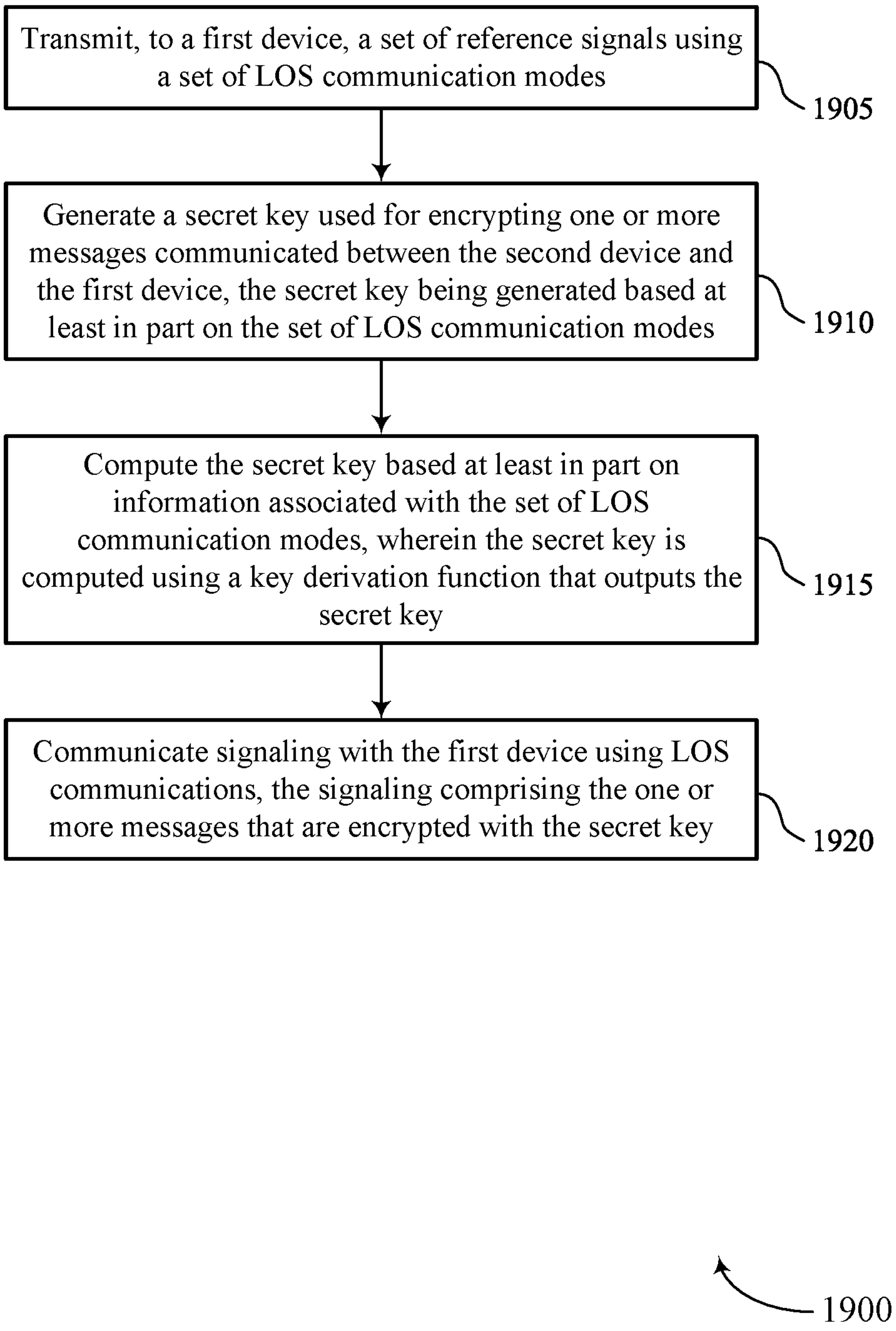

FIG. 19 shows a flowchart illustrating a method 1900 that supports secret key extraction for LOS communications in accordance with aspects of the present disclosure. The operations of the method 1900 may be implemented by a second device or its components as described herein. For example, the operations of the method 1900 may be performed by a second device (e.g., a base station 105, a UE 115, an IAB node, a device 205, a device 505) as described with reference to FIGS. 1 through 5 and 11 through 13. In some examples, a second device may execute a set of instructions to control the functional elements of the second device to perform the described functions. Additionally or alternatively, the second device may perform aspects of the described functions using special-purpose hardware.

At 1905, the method may include transmitting, to a first device, a set of reference signals using a set of LOS communication modes. The operations of 1905 may be performed in accordance with examples as disclosed herein. In some examples, aspects of the operations of 1905 may be performed by a LOS component 1125 as described with reference to FIG. 11.

At 1910, the method may include generating a secret key used for encrypting one or more messages communicated between the second device and the first device, the secret key being generated based on the set of LOS communication modes. The operations of 1910 may be performed in accordance with examples as disclosed herein. In some examples, aspects of the operations of 1910 may be performed by a key component 1130 as described with reference to FIG. 11.

At 1915, to generate the secret key, the method may include computing the secret key based on information associated with the set of LOS communication modes, where the secret key is computed using a key derivation function that outputs the secret key. The operations of 1915 may be performed in accordance with examples as disclosed herein. In some examples, aspects of the operations of 1915 may be performed by a key component 1130 as described with reference to FIG. 11.

At 1920, the method may include communicating signaling with the first device using LOS communications, the signaling including the one or more messages that are encrypted with the secret key. The operations of 1920 may be performed in accordance with examples as disclosed herein. In some examples, aspects of the operations of 1920 may be performed by a communication component 1135 as described with reference to FIG. 11.

Figure 20:
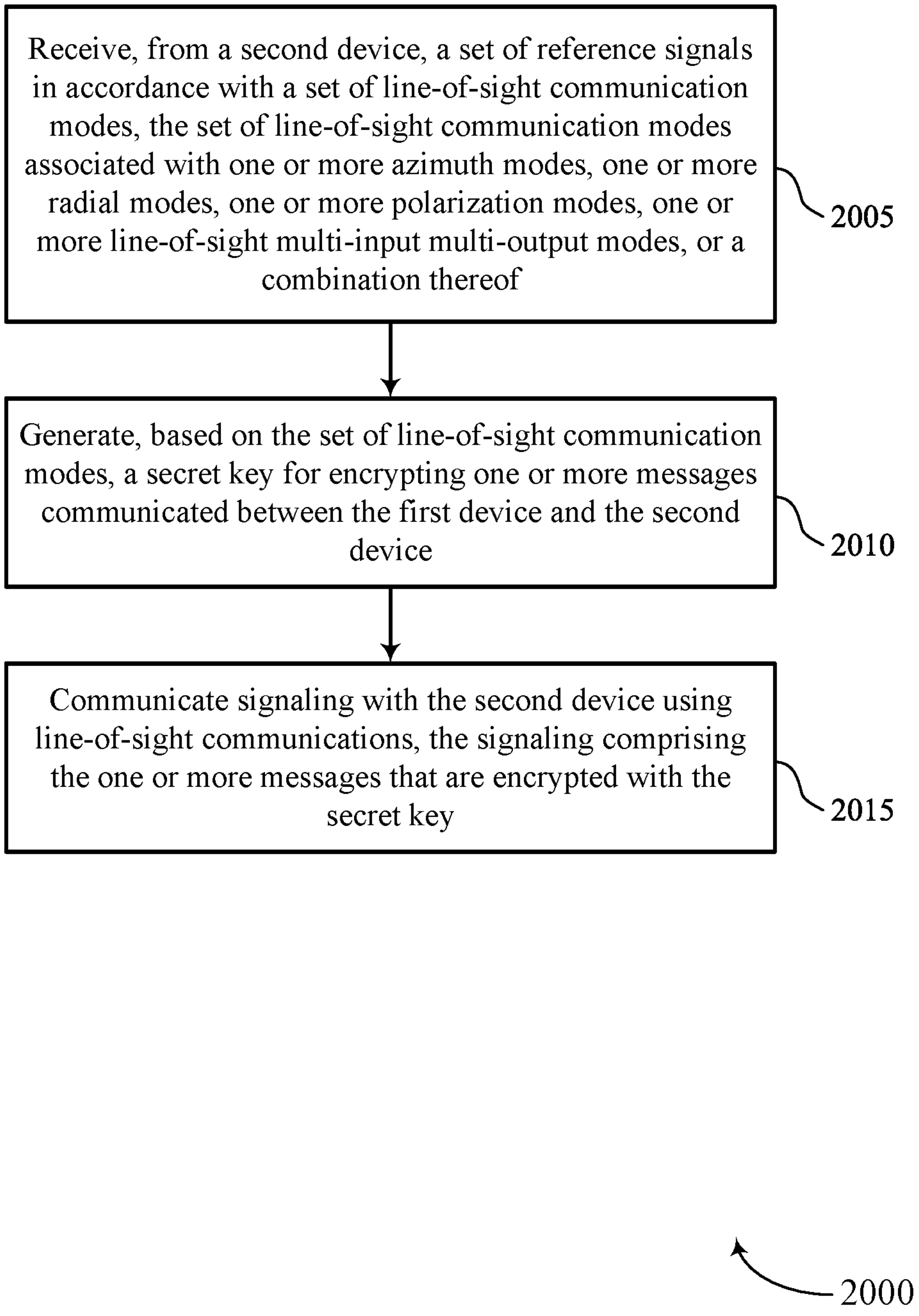

FIG. 20 shows a flowchart illustrating a method 2000 that supports secret-key extraction for LOS communications in accordance with one or more aspects of the present disclosure. The operations of the method 2000 may be implemented by a first device or its components as described herein. For example, the operations of the method 2000 may be performed by a base station 105, a UE 115, an IAB node, a device 205, a device 505 as described with reference to FIGS. 1 through 5 and 11 through 13. In some examples, a first device may execute a set of instructions to control the functional elements of the first device to perform the described functions. Additionally, or alternatively, the first device may perform aspects of the described functions using special-purpose hardware.

At 2005, the method may include receiving, from a second device, a set of reference signals in accordance with a set of LOS communication modes, the set of LOS communication modes associated with one or more azimuth modes, one or more radial modes, one or more polarization modes, one or LOS-MIMO modes, or a combination thereof. The operations of 2005 may be performed in accordance with examples as disclosed herein. In some examples, aspects of the operations of 2005 may be performed by a LOS component 825 as described with reference to FIG. 8.

At 2010, the method may include generating, based on the set of LOS communication modes, a secret key for encrypting one or more messages communicated between the first device and the second device. The operations of 2010 may be performed in accordance with examples as disclosed herein. In some examples, aspects of the operations of 2010 may be performed by a key component 830 as described with reference to FIG. 8.

At 2015, the method may include communicating signaling with the second device using LOS communications, the signaling including the one or more messages that are encrypted with the secret key. The operations of 2015 may be performed in accordance with examples as disclosed herein. In some examples, aspects of the operations of 2015 may be performed by a communication component 835 as described with reference to FIG. 8.

Figure 21:
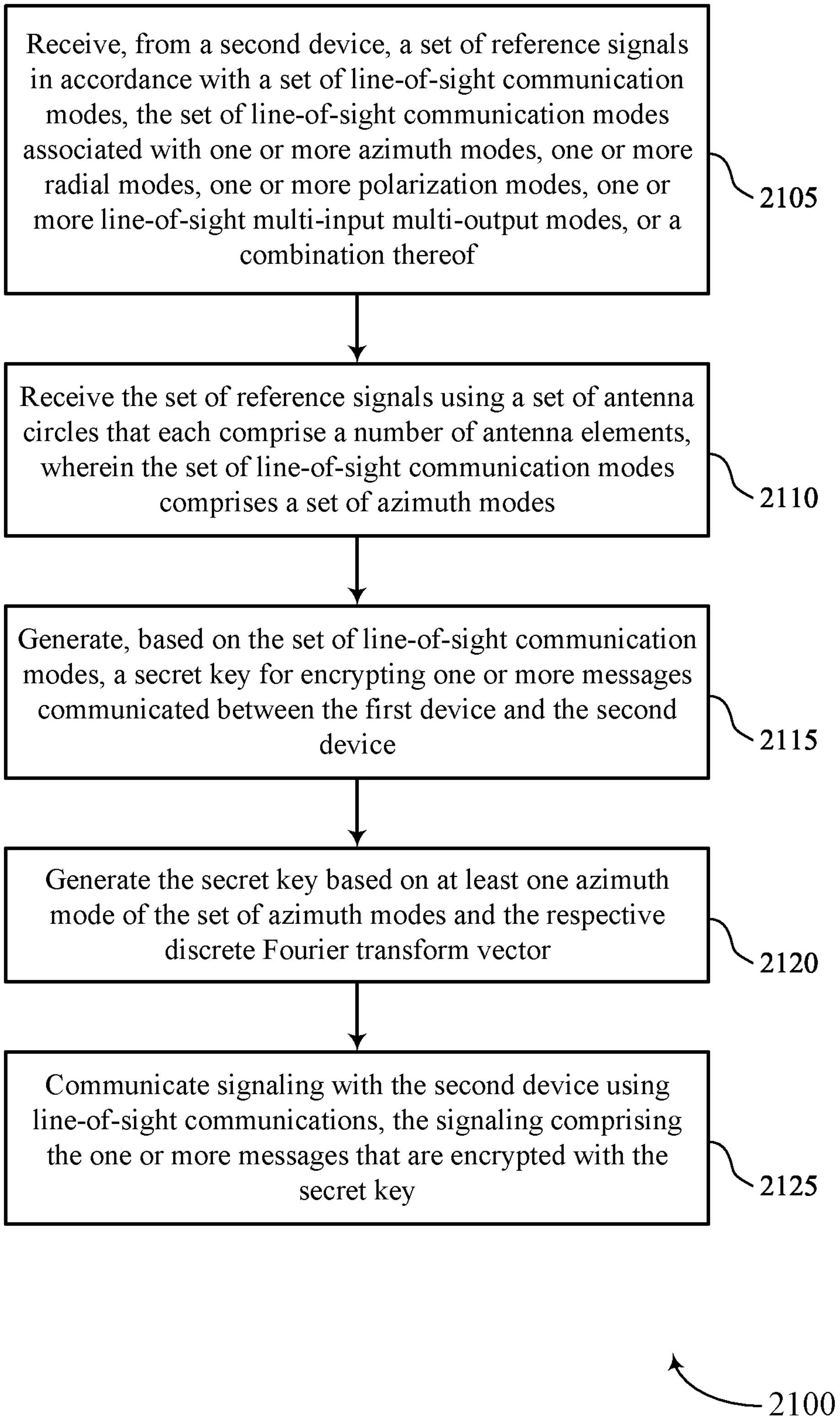

FIG. 21 shows a flowchart illustrating a method 2100 that supports secret-key extraction for LOS communications in accordance with one or more aspects of the present disclosure. The operations of the method 2100 may be implemented by a first device or its components as described herein. For example, the operations of the method 2100 may be performed by a base station 105, a UE 115, an IAB node, a device 205, a device 505 as described with reference to FIGS. 1 through 5 and 11 through 13. In some examples, a first device may execute a set of instructions to control the functional elements of the first device to perform the described functions. Additionally, or alternatively, the first device may perform aspects of the described functions using special-purpose hardware.

At 2105, the method may include receiving, from a second device, a set of reference signals in accordance with a set of LOS communication modes, the set of LOS communication modes associated with one or more azimuth modes, one or more radial modes, one or more polarization modes, one or more LOS-MIMO modes, or a combination thereof. The operations of 2105 may be performed in accordance with examples as disclosed herein. In some examples, aspects of the operations of 2105 may be performed by the LOS component 825 as described with reference to FIG. 14.

At 2110, the method may include receiving the set of reference signals using a set of antenna circles that each include a number of antenna elements, where the set of LOS communication modes includes a set of multiple azimuth modes. The operations of 2110 may be performed in accordance with examples as disclosed herein. In some examples, aspects of the operations of 2110 may be performed by the communication component 835 as described with reference to FIG. 8.

At 2115, the method may include generating, based on the set of LOS communication modes, a secret key for encrypting one or more messages communicated between the first device and the second device. The operations of 2115 may be performed in accordance with examples as disclosed herein. In some examples, aspects of the operations of 2115 may be performed by a key component 835 as described with reference to FIG. 8.

At 2120, the method may include generating the secret key based on at least one azimuth mode of the set of multiple azimuth modes and the respective DFT vector. The operations of 2120 may be performed in accordance with examples as disclosed herein. In some examples, aspects of the operations of 2120 may be performed by a key component 830 as described with reference to FIG. 8.

At 2125, the method may include communicating signaling with the second device using LOS communications, the signaling including the one or more messages that are encrypted with the secret key. The operations of 2125 may be performed in accordance with examples as disclosed herein. In some examples, aspects of the operations of 2125 may be performed by a communication component 835 as described with reference to FIG. 8.

Figure 22:
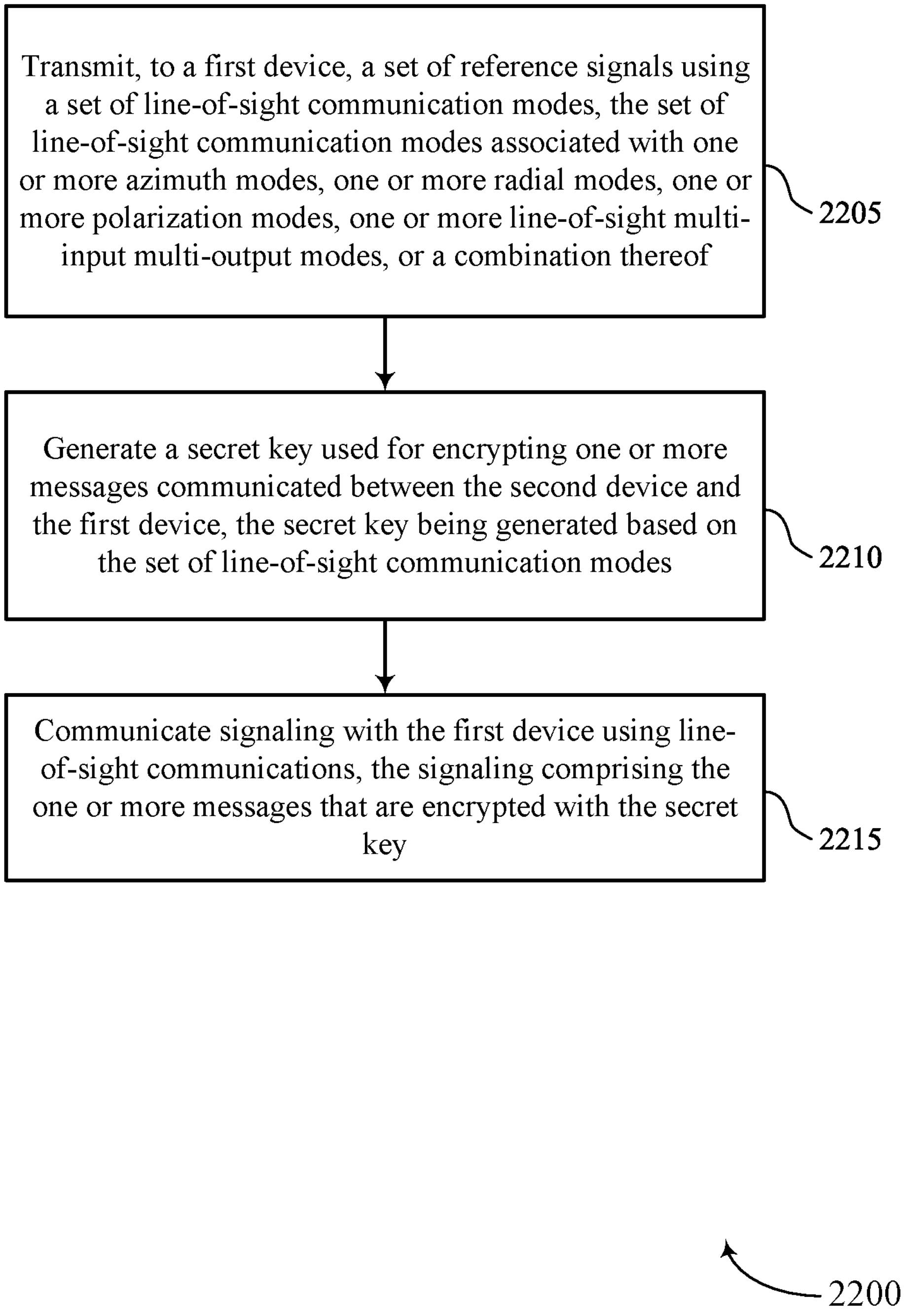

FIG. 22 shows a flowchart illustrating a method 2200 that supports secret-key extraction for LOS communications in accordance with one or more aspects of the present disclosure. The operations of the method 2200 may be implemented by a second device or its components as described herein. For example, the operations of the method 2200 may be performed by a base station 105, a UE 115, an IAB node, a device 205, a device 505 as described with reference to FIGS. 1 through 5 and 16 through 19. In some examples, a second device may execute a set of instructions to control the functional elements of the second device to perform the described functions. Additionally, or alternatively, the second device may perform aspects of the described functions using special-purpose hardware.

At 2205, the method may include transmitting, to a first device, a set of reference signals using a set of LOS communication modes, the set of LOS communication modes associated with one or more azimuth modes, one or more radial modes, one or more polarization modes, one or more LOS-MIMO modes, or a combination thereof. The operations of 2205 may be performed in accordance with examples as disclosed herein. In some examples, aspects of the operations of 2205 may be performed by a LOS component 1225 as described with reference to FIG. 12.

At 2210, the method may include generating a secret key used for encrypting one or more messages communicated between the second device and the first device, the secret key being generated based on the set of LOS communication modes. The operations of 2210 may be performed in accordance with examples as disclosed herein. In some examples, aspects of the operations of 2210 may be performed by a key component 1230 as described with reference to FIG. 12.

At 2215, the method may include communicating signaling with the first device using LOS communications, the signaling including the one or more messages that are encrypted with the secret key. The operations of 2215 may be performed in accordance with examples as disclosed herein. In some examples, aspects of the operations of 2215 may be performed by a communication component 1235 as described with reference to FIG. 12.

Figure 23:
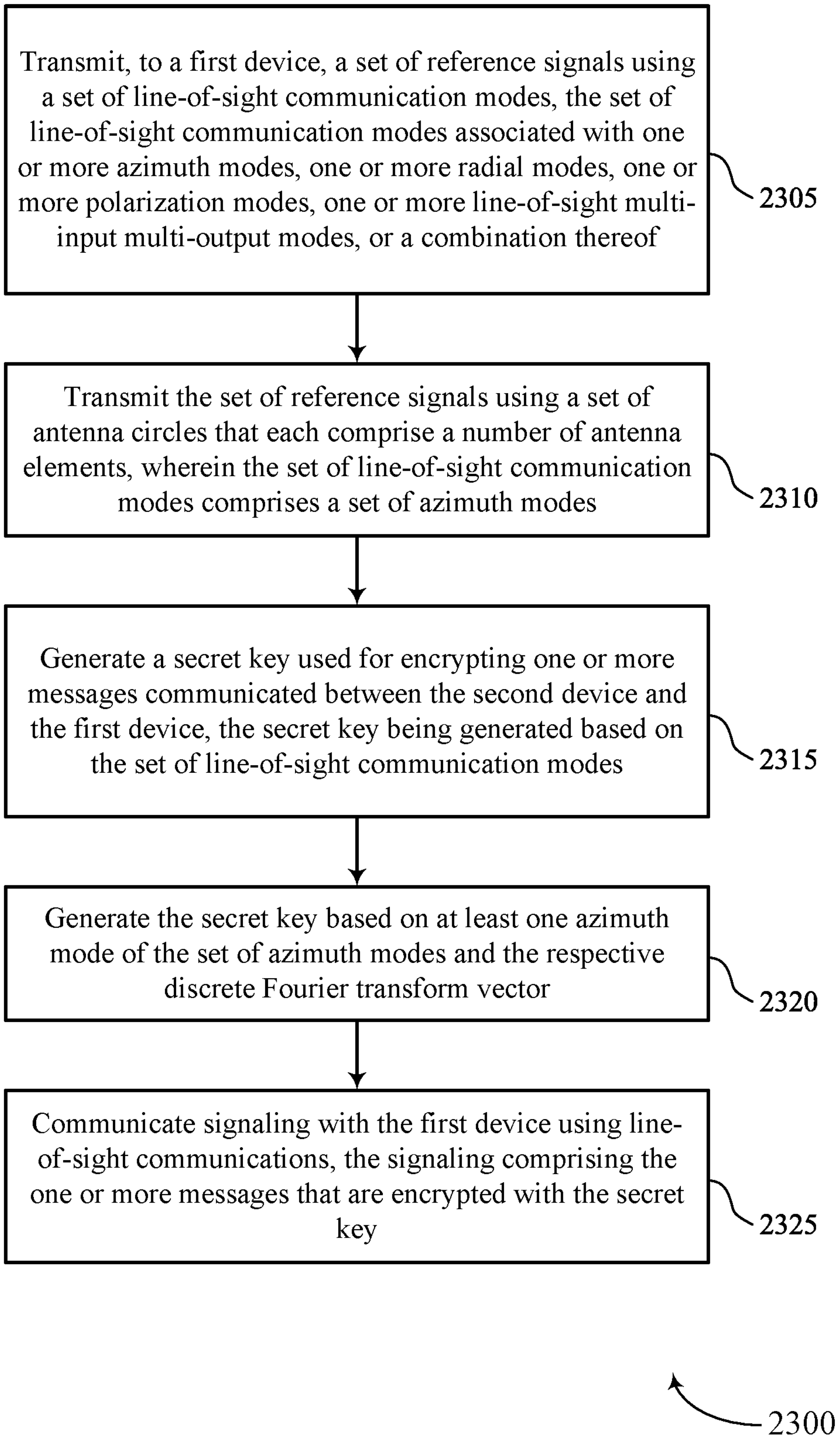

FIG. 23 shows a flowchart illustrating a method 2300 that supports secret-key extraction for LOS communications in accordance with one or more aspects of the present disclosure. The operations of the method 2300 may be implemented by a second device or its components as described herein. For example, the operations of the method 2300 may be performed by a base station 105, a UE 115, an IAB node, a device 205, a device 505 as described with reference to FIGS. 1 through 5 and 16 through 19. In some examples, a second device may execute a set of instructions to control the functional elements of the second device to perform the described functions. Additionally, or alternatively, the second device may perform aspects of the described functions using special-purpose hardware.

At 2305, the method may include transmitting, to a first device, a set of reference signals using a set of LOS communication modes, the set of LOS communication modes associated with one or more azimuth modes, one or more radial modes, one or more polarization modes, one or more LOS-MIMO modes, or a combination thereof. The operations of 2305 may be performed in accordance with examples as disclosed herein. In some examples, aspects of the operations of 2305 may be performed by a LOS component 1225 as described with reference to FIG. 12.

At 2310, the method may include transmitting the set of reference signals using a set of antenna circles that each include a number of antenna elements, where the set of LOS communication modes includes a set of multiple azimuth modes. The operations of 2310 may be performed in accordance with examples as disclosed herein. In some examples, aspects of the operations of 2310 may be performed by a communication component 1235 as described with reference to FIG. 12.

At 2315, the method may include generating a secret key used for encrypting one or more messages communicated between the second device and the first device, the secret key being generated based on the set of LOS communication modes. The operations of 2315 may be performed in accordance with examples as disclosed herein. In some examples, aspects of the operations of 2315 may be performed by a key component 1230 as described with reference to FIG. 12.

At 2320, the method may include generating the secret key based on at least one azimuth mode of the set of multiple azimuth modes and the respective DFT vector. The operations of 2320 may be performed in accordance with examples as disclosed herein. In some examples, aspects of the operations of 2320 may be performed by a key component 1230 as described with reference to FIG. 12.

At 2325, the method may include communicating signaling with the first device using LOS communications, the signaling including the one or more messages that are encrypted with the secret key. The operations of 2325 may be performed in accordance with examples as disclosed herein. In some examples, aspects of the operations of 2325 may be performed by a communication component 1235 as described with reference to FIG. 12.

The following provides an overview of aspects of the present disclosure:

Aspect 1: A method for wireless communication at a first device, comprising: receiving, from a second device, a set of reference signals in accordance with a set of LOS communication modes; generating a secret key used for encrypting one or more messages communicated between the first device and the second device, the secret key being generated based at least in part on the set of LOS communication modes; and communicating signaling with the second device using LOS communications, the signaling comprising the one or more messages that are encrypted with the secret key.

Aspect 2: The method of aspect 1, further comprising: receiving, from the second device, a secured control message that indicates a configuration of the set of reference signals and a quantity of LOS communication modes included in the set of LOS communication modes, wherein the set of reference signals are received in accordance with the set of LOS communication modes based at least in part on the secured control message.

Aspect 3: The method of aspect 2, further comprising: receiving, from the second device, a control message that updates the configuration of the set of reference signals and the quantity of LOS communication modes, wherein the set of reference signals are received in accordance with the set of LOS communication modes based at least in part on the control message.

Aspect 4: The method of any of aspects 1 through 3, wherein generating the secret key comprises: computing the secret key based at least in part on information associated with the set of LOS communication modes, wherein the secret key is computed using a key derivation function that outputs the secret key.

Aspect 5: The method of aspect 4, wherein the information associated with the set of LOS communication modes comprises indexes corresponding to respective LOS communication modes included in the set of LOS communication modes or a key obtained using the indexes corresponding to the respective LOS communication modes.

Aspect 6: The method of any of aspects 1 through 5, further comprising: receiving, from the second device, a second set of reference signals in accordance with the set of LOS communication modes, wherein a first number of the set of LOS communication modes for receiving the second set of reference signals is different from a second number of the set of LOS communication modes for receiving the set of reference signals, the secret key being generated based at least in part on the first number and the second number of the set of LOS communication modes.

Aspect 7: The method of any of aspects 1 through 6, wherein the set of LOS communication modes are based at least in part on a non-LOS portion of a channel estimate for a channel between the first device and the second device.

Aspect 8: The method of aspect 7, wherein the non-LOS portion of the channel estimate is quantized and mapped to respective modes of the set of LOS communication modes, and the set of LOS communication modes are based at least in part on the quantized and mapped non-LOS portion of the channel estimate.

Aspect 9: The method of any of aspects 1 through 8, further comprising: transmitting, to the second device, a second set of reference signals in accordance with a second set of LOS communication modes comprising the set of LOS communication modes, wherein the set of LOS communication modes is based at least in part on a respective channel measurement associated with each reference signal of the second set of reference signals.

Aspect 10: The method of any of aspects 1 through 9, further comprising: transmitting, to the second device, a message that is indicative of the set of LOS communication modes used to receive the set of reference signals.

Aspect 11: The method of aspect 10, wherein transmitting the message that is indicative of the set of LOS communication modes comprises: transmitting one or more reference signals using one or more LOS communication modes of the set of LOS communication modes, the one or more LOS communication modes selected based at least in part on a mapping between the set of LOS communication modes and the one or more LOS communication modes.

Aspect 12: The method of any of aspects 1 through 11, further comprising: communicating, with the second device and using a LOS communication mode of the set of LOS communication modes, a message indicating a seed for input into a key derivation function, wherein the secret key is generated using the indicated seed.

Aspect 13: The method of aspect 12, further comprising: communicating, with the second device, artificial noise using one or more LOS communication modes of the set of LOS communication modes that are unused for communicating the message indicating the seed.

Aspect 14: The method of any of aspects 1 through 13, wherein the set of LOS communication modes is based at least in part on a distance between the first device and the second device.

Aspect 15: The method of any of aspects 1 through 14, wherein the set of LOS communication modes comprises a set of OAM communication modes.

Aspect 16: A method for wireless communication at a second device, comprising: transmitting, to a first device, a set of reference signals using a set of LOS communication modes; generating a secret key used for encrypting one or more messages communicated between the second device and the first device, the secret key being generated based at least in part on the set of LOS communication modes; and communicating signaling with the first device using LOS communications, the signaling comprising the one or more messages that are encrypted with the secret key.

Aspect 17: The method of aspect 16, further comprising: transmitting, to the first device, a secured control message that indicates a configuration of the set of reference signals and a quantity of LOS communication modes included in the set of LOS communication modes, wherein the set of reference signals are transmitted using the set of LOS communication modes based at least in part on the secured control message.

Aspect 18: The method of aspect 17, further comprising: transmitting, to the first device, a control message that updates the configuration of the set of reference signals and the quantity of LOS communication modes, wherein the set of reference signals are transmitted using the set of LOS communication modes based at least in part on the control message.

Aspect 19: The method of any of aspects 16 through 18, wherein generating the secret key comprises: computing the secret key based at least in part on information associated with the set of LOS communication modes, wherein the secret key is computed using a key derivation function that outputs the secret key.

Aspect 20: The method of aspect 19, wherein the information associated with the set of LOS communication modes comprises indexes corresponding to respective LOS communication modes included in the set of LOS communication modes or a key obtained using the indexes corresponding to the respective LOS communication modes.

Aspect 21: The method of any of aspects 16 through 20, further comprising: transmitting, to the first device, a second set of reference signals in accordance with the set of LOS communication modes, wherein a first number of the set of LOS communication modes for receiving the second set of reference signals is different from a second number of the set of LOS communication modes for receiving the set of reference signals, the secret key being generated based at least in part on the first number and the second number of the set of LOS communication modes.

Aspect 22: The method of any of aspects 16 through 21, wherein the set of LOS communication modes are based at least in part on a non-LOS portion of a channel estimate for a channel between the first device and the second device.

Aspect 23: The method of aspect 22, wherein the non-LOS portion of the channel estimate is quantized and mapped to respective modes of the set of LOS communication modes, and the set of LOS communication modes are based at least in part on the quantized and mapped non-LOS portion of the channel estimate.

Aspect 24: The method of any of aspects 16 through 23, further comprising: receiving, from the first device, a second set of reference signals in accordance with a second set of LOS communication modes comprising the set of LOS communication modes; and selecting the set of LOS communication modes from the second set of LOS communication modes for transmitting the set of reference signals based at least in part on a respective channel measurement associated with each reference signal of the second set of reference signals.

Aspect 25: The method of any of aspects 16 through 24, further comprising: receiving, from the first device, a message that is indicative of the set of LOS communication modes used to receive the set of reference signals.

Aspect 26: The method of aspect 25, wherein receiving the message that is indicative of the set of LOS communication modes comprises: receiving one or more reference signals using one or more LOS communication modes of the set of LOS communication modes, the one or more LOS communication modes selected based at least in part on a mapping between the set of LOS communication modes and the one or more LOS communication modes.

Aspect 27: The method of any of aspects 16 through 26, further comprising: communicating, with the second device and in accordance with a LOS communication mode of the set of LOS communication modes, a message indicating a seed for input into a key derivation function, wherein the secret key is generated using the indicated seed.

Aspect 28: The method of aspect 27, further comprising: communicating, with the first device, artificial noise using one or more LOS communication modes of the set of LOS communication modes that are unused in communicating the message indicating the seed.

Aspect 29: The method of any of aspects 16 through 28, wherein the set of LOS communication modes is based at least in part on a distance between the first device and the second device.

Aspect 30: The method of any of aspects 16 through 29, wherein the set of LOS communication modes comprises a set of OAM communication modes.

Aspect 31: An apparatus for wireless communication at a first device, comprising a memory and a processor coupled to the memory and configured to perform a method of any of aspects 1 through 15.

Aspect 32: An apparatus for wireless communication at a first device, comprising at least one means for performing a method of any of aspects 1 through 15.

Aspect 33: A non-transitory computer-readable medium storing code for wireless communication at a first device, the code comprising instructions executable by a processor to perform a method of any of aspects 1 through 15.

Aspect 34: An apparatus for wireless communication at a second device, comprising a memory and a processor coupled to the memory and configured to perform a method of any of aspects 16 through 30.

Aspect 35: An apparatus for wireless communication at a second device, comprising at least one means for performing a method of any of aspects 16 through 30.

Aspect 36: A non-transitory computer-readable medium storing code for wireless communication at a second device, the code comprising instructions executable by a processor to perform a method of any of aspects 16 through 30.

Aspect 37: A method for wireless communication at a first device, comprising: receiving, from a second device, a set of reference signals in accordance with a set of LOS communication modes, the LOS communication modes associated with one or more azimuth modes, one or more radial modes, one or more polarization modes, one or more LOS MIMO, or a combination thereof; generating, based at least in part on the set of LOS communication modes, a secret key for encrypting one or more messages communicated between the first device and the second device; and communicating signaling with the second device using LOS communications, the signaling comprising the one or more messages that are encrypted with the secret key.

Aspect 38: The method of aspect 37, further comprising: receiving the set of reference signals using a set of antenna circles that each comprise a number of antenna elements, wherein the set of LOS communication modes comprises a plurality of azimuth modes.

Aspect 39: The method of aspect 38, wherein each azimuth mode of the plurality of azimuth modes is associated with a respective discrete Fourier transform vector of a size less than or equal to the number of antenna elements for an antenna circle of the set of antenna circles, wherein generating the secret key comprises: generating the secret key based at least in part on at least one azimuth mode of the plurality of azimuth modes and the respective discrete Fourier transform vector.

Aspect 40: The method of any of aspects 38 through 39, wherein each azimuth mode of the plurality of azimuth modes is associated with a plurality of radial modes comprising at least a first radial mode associated with a first beamforming vector and a second radial mode associated with a second beamforming vector, wherein generating the secret key comprises: generating the secret key based at least in part on at least one radial mode of the plurality of radial modes.

Aspect 41: The method of aspect 40, wherein each of the first beamforming vector and the second beamforming vector are orthogonal.

Aspect 42: The method of any of aspects 40 through 41, wherein each radial mode of the plurality of radial modes is associated with at least a first polarization mode and a second polarization mode orthogonal to the first polarization mode, wherein generating the secret key comprises: generating the secret key based at least in part on at least the first polarization mode, the second polarization mode, or both.

Aspect 43: The method of any of aspects 37 through 42, further comprising: receiving the set of reference signals using a two-dimensional antenna array comprising a number of antenna elements, wherein the set of LOS communication modes comprise a plurality LOS MIMO.

Aspect 44: The method of aspect 43, further comprising: decomposing a LOS multi-input multi-output mode of the plurality LOS MIMO into a first set of components associated with a first directional dimension and a second set of components associated with a second directional dimension different than the first directional dimension; generating a first channel matrix associated with the first set of components and a second channel matrix associated with the second set of components; and generating the secret key used for encrypting the one or more messages based at least in part on the first channel matrix and the second channel matrix.

Aspect 45: The method of any of aspects 37 through 44, further comprising: transmitting, to the second device, a message that is indicative of the set of LOS communication modes used to receive the set of reference signals.

Aspect 46: The method of aspect 45, wherein transmitting the message that is indicative of the set of LOS communication modes comprises: transmitting one or more reference signals using one or more LOS communication modes of the set of LOS communication modes, the one or more LOS communication modes selected based at least in part on a pseudorandom mapping between the set of LOS communication modes and the one or more LOS communication modes.

Aspect 47: The method of aspect 46, further comprising: receiving a radio resource control signal indicating the pseudorandom mapping between the set of LOS communication modes and the one or more LOS communication modes.

Aspect 48: A method for wireless communication at a second device, comprising: transmitting, to a first device, a set of reference signals using a set of LOS communication modes, the LOS communication modes associated with one or more azimuth modes, one or more radial modes, one or more polarization modes, one or more LOS MIMO, or a combination thereof; generating a secret key used for encrypting one or more messages communicated between the second device and the first device, the secret key being generated based at least in part on the set of LOS communication modes; and communicating signaling with the first device using LOS communications, the signaling comprising the one or more messages that are encrypted with the secret key.

Aspect 49: The method of aspect 48, further comprising: transmitting the set of reference signals using a set of antenna circles that each comprise a number of antenna elements, wherein the set of LOS communication modes comprises a plurality of azimuth modes.

Aspect 50: The method of aspect 49, wherein each azimuth mode of the plurality of azimuth modes is associated with a respective discrete Fourier transform vector of a size less than or equal to the number of antenna elements for an antenna circle of the set of antenna circles, wherein generating the secret key comprises: generating the secret key based at least in part on at least one azimuth mode of the plurality of azimuth modes and the respective discrete Fourier transform vector.

Aspect 51: The method of any of aspects 49 through 50, wherein each azimuth mode of the plurality of azimuth modes is associated with a plurality of radial modes comprising at least a first radial mode associated with a first beamforming vector and a second radial mode associated with a second beamforming vector, wherein generating the secret key comprises: generating the secret key based at least in part on at least one radial mode of the plurality of radial modes.

Aspect 52: The method of aspect 51, wherein each of the first beamforming vector and the second beamforming vector are orthogonal.

Aspect 53: The method of any of aspects 51 through 52, wherein each radial mode of the plurality of radial modes is associated with at least a first polarization mode and a second polarization mode orthogonal to the first polarization mode, wherein generating the secret key comprises: generating the secret key based at least in part on at least the first polarization mode, the second polarization mode, or both.

Aspect 54: The method of any of aspects 48 through 53, further comprising: transmitting the set of reference signals using a two-dimensional antenna array comprising a number of antenna elements, wherein the set of LOS communication modes comprise a plurality LOS MIMO.

Aspect 55: The method of aspect 54, further comprising: decomposing a LOS multi-input multi-output mode of the plurality LOS MIMO into a first set of components associated with a first directional dimension and a second set of components associated with a second directional dimension different than the first directional dimension; generating a first channel matrix associated with the first set of components and a second channel matrix associated with the second set of components; and generating the secret key used for encrypting the one or more messages based at least in part on the first channel matrix and the second channel matrix.

Aspect 56: The method of any of aspects 48 through 55, further comprising: receiving, to the first device, a message that is indicative of the set of LOS communication modes used to receive the set of reference signals.

Aspect 57: The method of aspect 56, wherein receiving the message that is indicative of the set of LOS communication modes comprises: receiving one or more reference signals using one or more LOS communication modes of the set of LOS communication modes, the one or more LOS communication modes selected based at least in part on a pseudorandom mapping between the set of LOS communication modes and the one or more LOS communication modes.

Aspect 58: The method of aspect 57, further comprising: transmitting a radio resource control signal indicating the pseudorandom mapping between the set of LOS communication modes and the one or more LOS communication modes.

Aspect 59: An apparatus for wireless communication at a first device, comprising a processor; memory coupled with the processor; and instructions stored in the memory and executable by the processor to cause the apparatus to perform a method of any of aspects 37 through 47.

Aspect 60: An apparatus for wireless communication at a first device, comprising at least one means for performing a method of any of aspects 37 through 47.

Aspect 61: A non-transitory computer-readable medium storing code for wireless communication at a first device, the code comprising instructions executable by a processor to perform a method of any of aspects 37 through 47.

Aspect 62: An apparatus for wireless communication at a second device, comprising a processor; memory coupled with the processor; and instructions stored in the memory and executable by the processor to cause the apparatus to perform a method of any of aspects 48 through 58.

Aspect 63: An apparatus for wireless communication at a second device, comprising at least one means for performing a method of any of aspects 48 through 58.

Aspect 64: A non-transitory computer-readable medium storing code for wireless communication at a second device, the code comprising instructions executable by a processor to perform a method of any of aspects 48 through 58.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first device for wireless communications, comprising:

one or more memories storing processor-executable code; and one or more processors coupled with the one or more memories and individually or collectively operable to execute the code to cause the first device to:

receive, from a second device, a set of reference signals in accordance with a set of line-of-sight communication modes, the set of line-of-sight communication modes associated with one or more azimuth modes, one or more radial modes, one or more polarization modes, one or more line-of-sight multi-input multi-output modes, or a combination thereof, wherein an available quantity of the set of line-of-sight communication modes is based at least in part on a distance between the first device and the second device, an alignment of the first device and the second device, or both, wherein each line-of-sight communication mode corresponds to a different phase offset between radio antenna elements of a uniform circular array used for orbital angular momentum (OAM) communications;

generate a secret key using one or more indexes of the available quantity of the set of line-of-sight communication modes, the secret key for encrypting one or more messages communicated between the first device and the second device; and communicate signaling with the second device using line-of-sight communications, the signaling comprising the one or more messages that are encrypted with the secret key.

2. The first device of claim 1, wherein the set of line-of-sight communication modes comprises a plurality of azimuth modes.

3. The first device of claim 2, wherein each azimuth mode of the plurality of azimuth modes is associated with a respective discrete Fourier transform vector, wherein the one or more processors coupled with the one or more memories and configured to generate the secret key are further individually or collectively operable to execute the code to cause the first device to:

generate the secret key based at least in part on at least one azimuth mode of the plurality of azimuth modes and the respective discrete Fourier transform vector.

4. The first device of claim 2, wherein each azimuth mode of the plurality of azimuth modes is associated with a plurality of radial modes comprising at least a first radial mode associated with a first beamforming vector and a second radial mode associated with a second beamforming vector, wherein the one or more processors coupled with the one or more memories and configured to generate the secret key are further individually or collectively operable to execute the code to cause the first device to:

generate the secret key based at least in part on at least one radial mode of the plurality of radial modes.

5. The first device of claim 4, wherein each of the first beamforming vector and the second beamforming vector are orthogonal.

6. The first device of claim 4, wherein each radial mode of the plurality of radial modes is associated with at least a first polarization mode and a second polarization mode orthogonal to the first polarization mode, wherein the one or more processors coupled with the one or more memories and configured to generate the secret key are further individually or collectively operable to execute the code to cause the first device to:

generate the secret key based at least in part on the first polarization mode, the second polarization mode, or both.

7. The apparatus of claim 1, wherein the processor coupled to the memory is further configured to cause the apparatus to:

receive the set of reference signals using a two-dimensional antenna array comprising a number of antenna elements, wherein the set of line-of-sight communication modes comprise a plurality of line-of-sight multi-input multi-output modes.

8. The apparatus of claim 7, wherein the processor coupled to the memory is further configured to cause the apparatus to:

decompose a line-of-sight multi-input multi-output mode of the plurality line-of-sight multi-input multi-output modes into a first set of components associated with a first directional dimension and a second set of components associated with a second directional dimension different than the first directional dimension;

generate a first channel matrix associated with the first set of components and a second channel matrix associated with the second set of components; and generate the secret key used for encrypting the one or more messages based at least in part on the first channel matrix and the second channel matrix.

9. The apparatus of claim 1, wherein the processor coupled to the memory is further configured to cause the apparatus to:

transmit, to the second device, a message that is indicative of the set of line-of-sight communication modes used to receive the set of reference signals.

10. The apparatus of claim 9, wherein the processor coupled to the memory and configured to transmit the message that is indicative of the set of line-of-sight communication modes is further configured to cause the apparatus to:

transmit one or more reference signals using one or more line-of-sight communication modes of the set of line-of-sight communication modes, the one or more line-of-sight communication modes selected based at least in part on a pseudorandom mapping between the set of line-of-sight communication modes and the one or more line-of-sight communication modes.

11. The apparatus of claim 10, wherein the processor coupled to the memory is further configured to cause the apparatus to:

receive a radio resource control signal indicating the pseudorandom mapping between the set of line-of-sight communication modes and the one or more line-of-sight communication modes.

12. A method for wireless communication at a first device, comprising:

receiving, from a second device, a set of reference signals in accordance with a set of line-of-sight communication modes, the set of line-of-sight communication modes associated with one or more azimuth modes, one or more radial modes, one or more polarization modes, one or more line-of-sight multi-input multi-output modes, or a combination thereof, wherein an available quantity of the set of line-of-sight communication modes is based at least in part on a distance between the first device and the second device, an alignment of the first device and the second device, or both, wherein each line-of-sight communication mode corresponds to a different phase offset between radio antenna elements of a uniform circular array used for orbital angular momentum (OAM) communications;

generating a secret key using one or more indexes of the available quantity of the set of line-of-sight communication modes, the secret key for encrypting one or more messages communicated between the first device and the second device; and communicating signaling with the second device using line-of-sight communications, the signaling comprising the one or more messages that are encrypted with the secret key.

13. The method of claim 12, wherein the set of line-of-sight communication modes comprises a plurality of azimuth modes.

14. The method of claim 13, wherein each azimuth mode of the plurality of azimuth modes is associated with a respective discrete Fourier transform vector, wherein generating the secret key comprises:

generating the secret key based at least in part on at least one azimuth mode of the plurality of azimuth modes and the respective discrete Fourier transform vector.

15. The method of claim 13, wherein each azimuth mode of the plurality of azimuth modes is associated with a plurality of radial modes comprising at least a first radial mode associated with a first beamforming vector and a second radial mode associated with a second beamforming vector, wherein generating the secret key comprises:

generating the secret key based at least in part on at least one radial mode of the plurality of radial modes.

16. The method of claim 15, wherein each of the first beamforming vector and the second beamforming vector are orthogonal.

17. The method of claim 15, wherein each radial mode of the plurality of radial modes is associated with at least a first polarization mode and a second polarization mode orthogonal to the first polarization mode, wherein generating the secret key comprises:

generating the secret key based at least in part on the first polarization mode, the second polarization mode, or both.

* * * * *